United States Patent [19]
Azibert

[11] Patent Number: 6,116,609
[45] Date of Patent: Sep. 12, 2000

[54] FLUIDIC FEEDBACK PRESSURE REGULATION SYSTEM FOR A MECHANICAL SEAL

[75] Inventor: Henri V. Azibert, Windham, N.H.

[73] Assignee: A. W. Chesterton Company, Stoneham, Mass.

[21] Appl. No.: 09/033,538

[22] Filed: Mar. 2, 1998

Related U.S. Application Data

[63] Continuation-in-part of application No. 08/992,753, Dec. 17, 1997, which is a continuation-in-part of application No. 08/992,751, Dec. 17, 1997, Pat. No. 6,068,264, which is a continuation-in-part of application No. 08/992,611, Dec. 17, 1997, Pat. No. 6,059,293, which is a continuation-in-part of application No. 08/992,613, Dec. 17, 1997, Pat. No. 6,068,263, and a continuation-in-part of application No. 09/005,957, Jan. 9, 1998, abandoned, which is a continuation-in-part of application No. 09/013,698, Jan. 26, 1998, and a continuation-in-part of application No. 09/013,089, Jan. 26, 1998, Pat. No. 6,076,830.

[51] Int. Cl.[7] ...................................................... F16J 15/34
[52] U.S. Cl. .......................... 277/388; 277/400; 277/401; 277/408
[58] Field of Search .................................... 277/306, 304, 277/308, 388, 401, 408, 400; 137/102

[56] References Cited

U.S. PATENT DOCUMENTS

| | | | |
|---|---|---|---|
| 2,834,619 | 5/1958 | McNab | 286/9 |
| 2,928,685 | 3/1960 | Tracy | 277/395 |
| 3,034,797 | 5/1962 | Pike . | |
| 3,297,329 | 1/1967 | Smith et al. . | |
| 3,433,489 | 3/1969 | Wiese . | |
| 3,486,760 | 12/1969 | Tracy . | |
| 3,498,620 | 3/1970 | Wiese . | |
| 3,526,408 | 9/1970 | Tracy . | |
| 3,589,738 | 6/1971 | Tracy . | |
| 3,632,117 | 1/1972 | Villasor . | |
| 3,917,289 | 11/1975 | Ivanov et al. . | |
| 3,948,530 | 4/1976 | Gyory . | |
| 4,114,900 | 9/1978 | Wiese . | |
| 4,196,911 | 4/1980 | Matsushita . | |
| 4,447,063 | 5/1984 | Kotzur et al. . | |
| 4,576,384 | 3/1986 | Azibert . | |
| 4,643,437 | 2/1987 | Salant et al. . | |
| 4,691,276 | 9/1987 | Miller et al. | 364/148 |
| 4,722,534 | 2/1988 | Wentworth . | |
| 4,749,199 | 6/1988 | Gresh . | |
| 5,039,113 | 8/1991 | Gardner . | |
| 5,052,694 | 10/1991 | Lipschitz . | |
| 5,064,205 | 11/1991 | Whitford . | |
| 5,143,384 | 9/1992 | Lipschitz . | |
| 5,333,882 | 8/1994 | Azibert et al. . | |
| 5,370,401 | 12/1994 | Sandgren . | |
| 5,593,163 | 1/1997 | Daiber et al. . | |
| 5,725,220 | 3/1998 | Clark et al. . | |
| 5,762,342 | 6/1998 | Kakabaker et al. | 277/306 |
| 5,769,427 | 6/1998 | Ostrowski | 277/306 |
| 5,820,129 | 10/1998 | Reagan . | |

FOREIGN PATENT DOCUMENTS 0 658 714 A1   6/1995   European Pat. Off. .

*Primary Examiner*—Anthony Knight
*Assistant Examiner*—Alison K. Pickard
*Attorney, Agent, or Firm*—Lahive & Cockfield, LLP

[57] ABSTRACT

A fluidic feedback pressure regulation system employs one or more fluids within a mechanical seal to control one or more other fluids. The system includes a fluid manifold and a movable differential pressure valve, both of which are completely mounted within a bore in the seal gland. The valve is connected to several fluid distribution networks, so that the valve can establish fluid communication between a regulated fluid (such as barrier or process fluid) and either (1) a high pressure fluid supply to increase the pressure of one of the fluids, or (2) an exhaust vent in order to remove fluid from the fluid distribution, concomitantly reducing the fluid pressure in the seal. All the fluids utilized in the seal are regulated by the pressure system with respect to each other in order achieve, pressure-wise, optimal seal operating conditions. In particular, the fluids can be regulated during use to achieve certain leakage characteristics. The fluidic feedback pressure regulation system can be formed of multiple subsystems, which are combined into one integrated system substantially completely and solely mounted within the gland.

62 Claims, 27 Drawing Sheets

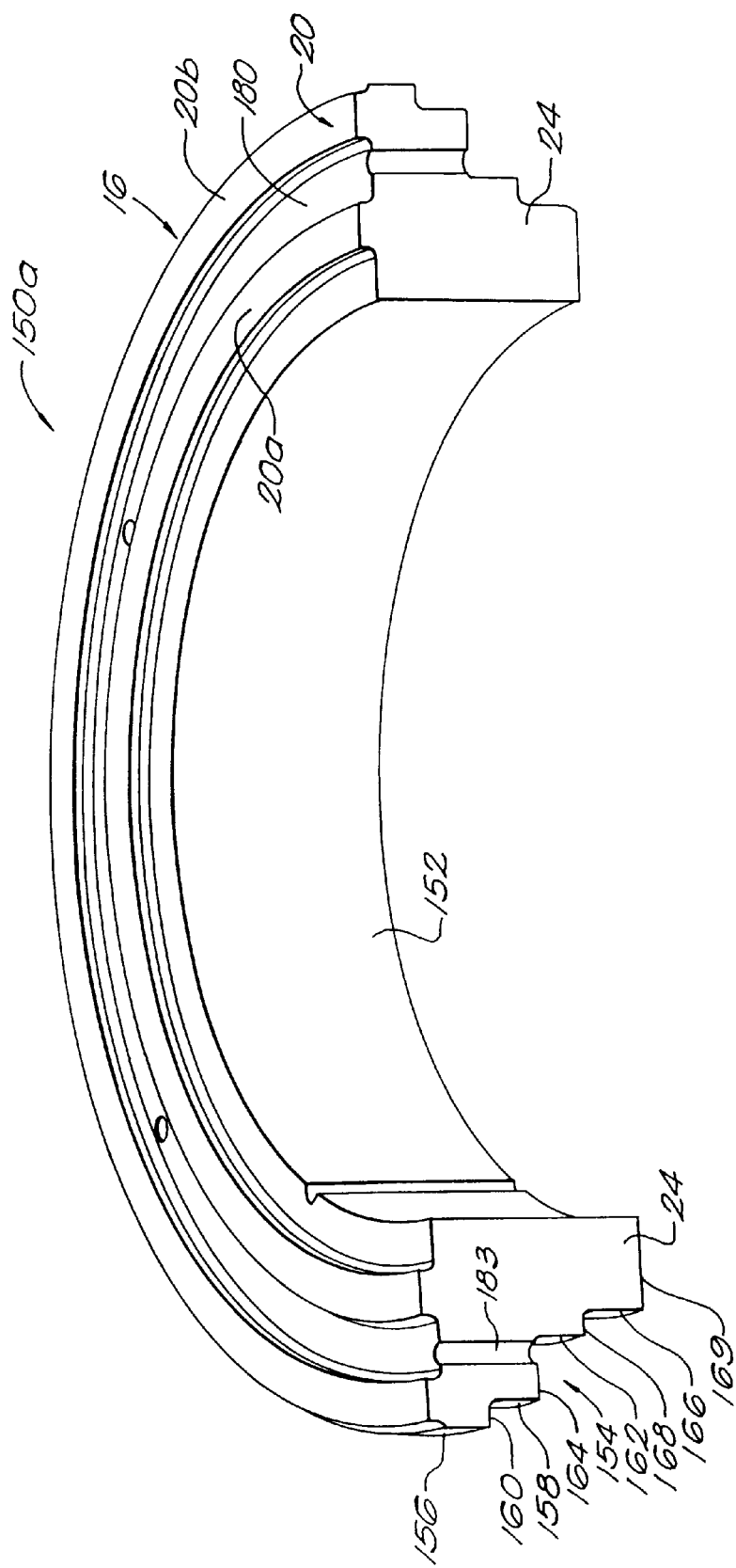

FLUIDIC FEEDBACK PRESSURE REGULATION SYSTEM FOR A MECHANICAL SEAL

REFERENCE TO RELATED APPLICATIONS

This application is a continuation in part of U.S. application Ser. No. 08/992,753, filed on Dec. 17, 1997 and entitled SPLIT MECHANICAL FACE SEAL, currently still pending; is a continuation in part of U.S. application Ser. No. 08/992,751, filed on Dec. 17, 1997, entitled SPLIT MECHANICAL FACE SEAL WITH NEGATIVE PRESSURE CONTROL SYSTEM now U.S. Pat. No. 6,068,264; a continuation in part of U.S. application Ser. No. 08/992,611, filed on Dec. 17, 1997, and entitled SPLIT MECHANICAL FACE SEAL WITH FLUID INTRODUCING STRUCTURE, now U.S. Pat. No. 6,059,293; a continuation in part of U.S. application Ser. No. 08/992,613 filed on Dec. 17, 1997 and entitled SPLIT MECHANICAL FACE SEAL WITH RESILIENT PIVOTING MEMBER now U.S. Pat. No. 6,068,263; and a continuation in part of U.S. application Ser. No. 09/005,957, filed Jan. 9, 1998, entitled DUAL NON-CONTACTING MECHANICAL FACE SEAL HAVING CONCENTRIC SEAL FACES, now abandoned; a continuation in part of U.S. application Ser. No. 09/013,698, filed Jan. 26, 1998, entitled NON-CONTACTING MECHANICAL FACE SEAL INCLUDING FLUID CONTROL SYSTEM, currently still pending; and a continuation in part of U.S. application Ser. No. 09/013,089, filed Jan. 26, 1998, entitled DUAL NON-CONTACTING MECHANICAL FACE SEAL HAVING CONCENTRIC SEAL FACES, now U.S. Pat. No. 6,076,830 all of which are incorporated herein by reference.

BACKGROUND OF THE INVENTION

The present invention relates generally to mechanical seals for providing fluid sealing between a housing and a rotating shaft. More particularly, the invention relates to a pressure regulation system used to regulate one or more fluids of the mechanical seal.

Conventional mechanical seals are employed in a wide variety of mechanical apparatuses to provide a pressure-tight and fluid-tight seal between a rotating shaft and a stationary housing. The seal is usually positioned about the rotating shaft, which is mounted in and protrudes from the stationary housing. The seal is typically bolted to the housing at the shaft exit, thus preventing loss of pressurized process fluid from the housing. Conventional mechanical seals include face-type mechanical seals, which include a pair of annular sealing rings that are concentrically disposed about the shaft, and axially spaced from each other. The sealing rings each have sealing faces that are biased into physical contact with each other. Typically, one seal ring remains stationary while the other ring contacts the shaft and rotates therewith. The mechanical seal prevents leakage of the pressurized process fluid to the external environment by biasing the seal ring sealing faces into physical contact with each other. As a result of the physical contact between the faces, abrasion of the seal faces occurs and the seals typically exhibit undesirable wear characteristics and leakage. This is particularly related to liquid type seal when operating dry or opened for servicing.

The poor wear characteristics of these conventional mechanical face seals necessitate the frequent monitoring and replacement of the seal components, particularly the seal rings. Replacement and repair of damaged seals have been facilitated by seal designs where a portion of the component parts of the mechanical seals are segmented or split. Installation of split or partially split seal components can be performed without necessitating the complete breakdown of the mechanical apparatus and without having to pass the annular seal over an end of the shaft. However, even in split seal designs, significant time is required to replace the seal components, resulting in frequent long periods of down time for the mechanical apparatus associated with the seal.

The prior art attempted to overcome the above difficulties by employing non-contact mechanical seals that utilize a fluid interposed between the seal ring faces to reduce frictional wear thereof. Conventional mechanical non-contact face seals typically employ spiral-type grooves formed in the face of the rotating seal ring to develop a hydrodynamic lifting force that separates the seal faces. The resultant gap allows fluid to be disposed within the gap to prevent abrasion of the seal faces. These types of seals are limited in application because the seals are designed to operate in a unidirectional manner. If the seals are driven in the opposite direction, the seal rings typically do not separate but are pulled or sucked toward each other, thereby increasing wear and ultimately destroying the seals. Other conventional designs employ specially designed grooves that can operate in both directions called, bi-directional grooves. These grooves, however, typically are expensive to manufacture since they require precise and intricate machining, and are inefficient in providing hydrodynamic lift to adequately separate the seal faces.

Even in mechanical non-contact seal designs a certain amount of seal face abrasion occurs, especially during start-up or during periods in which the shaft is rotating at relatively low speeds. This is due in part to a lack of regulation of the pressures of the various fluids used in the seal. For example, the barrier fluid pressure and the process fluid pressure need to be maintained relative to each other such that the seal faces are not forced apart so far that process fluid may escape, or that the seal faces may be forced into actual physical contact with little or no barrier fluid to protect their surfaces. Such abrasion causing wear of the seal components results in the eventual need to replace the seal components.

As the above described and other prior art seals have proved less than optimal, an object of the invention is to provide a pressure regulation system for regulating the pressures of various fluids within the seal in order to reduce wear, while concomitantly preventing or minimizing leakage at the other faces, without compromising seal performance or integrity, particularly when the various fluid pressures are changing during startup or during low speed operation.

Another object of the invention is to provide a pressure regulation system that is compact and easy to mount relative to the mechanical seal.

Still another object of the invention is to provide a split mechanical seal with a pressure regulation system with sufficient dynamic range so as to be operable under a wide range of operating conditions for a wide range of services.

Yet another object of the invention is to provide a mechanical seal that ensures sufficient hydrodynamic lift adequate for face seal separation during use.

Still yet another object of the invention is to provide a fluid regulation system that regulates the rate of face seal leakage during operation.

Other general and more specific objects of the invention will in part be obvious and will in part be evident from the drawings and the description which follow.

SUMMARY OF THE INVENTION

These and other objects are attained by the fluidic feedback pressure regulation system of the present invention in which a selected fluid pressure of the seal, such as barrier or process fluid pressure, is maintained at a selected pressure relative to another fluid pressure by the use of a differential pressure valve and a fluid supply or vent. The feedback system adjusts one of the system fluid pressures to correct for any imbalance in the system. The system therefore fluidly, dynamically monitors the seal during use to regulate gap width, and hence seal leakage.

The fluidic feedback pressure regulation system of the invention includes a series of passages and bores that are formed within the gland, and if desired the seal, to selectively communicate fluid between portions of the system. The regulation system can include multiple subsystems, each designed to perform a selected function. For example, one subsystem can establish a selected fluid pressure, such as an output fluid pressure, at a pressure above (or below) a process fluid pressure by an amount which is manually adjustable. This pressure defines the regulated input pressure for the system. Another subsystem can utilize the regulated input pressure to remove pressure from the system if the gap width at the seal faces is too small, or add pressure to the system to reduce the gap and thus reduce leakage at the seal faces if the gap width is too large.

According to one practice, the fluidic feedback pressure regulation system of the invention includes a movable valve that can be disposed between multiple positions, and a plurality of fluid bores. The system can also include a cylindrical fluid manifold which mounts within a chamber formed within the gland. The movable valve slidingly seats within the manifold. The manifold can include a number of bores for transferring a selected fluid to a portion of the chamber to perform selected functions, such as add or remove fluid pressure from the system to adjust or regulate the gap. According to an optional practice, the system can vent fluid, such as a closing fluid, from the system upon an increase in barrier fluid pressure, and can introduce closing fluid to the system upon a sensed decrease in barrier fluid pressure.

According to another aspect, the fluidic feedback pressure regulation system is sized for mounting solely and generally completely within the gland of the mechanical seal. This compactly dimensioned system thus avoids the use of elaborate external fluid conduit arrangements that connect the various fluids of the system to the seal.

A significant advantage of this compact gland mounted assembly is that it eliminates the need for expensive fluid coupling components, thus reducing the overall piece counts and thus the overall cost of the system. Another advantage of the invention is that it allows the system to regulate gap width and thus leakage fluidly and dynamically with a pressure regualtion syystem that is sized and dimensioned for mounting within the gland. The system achieves these advantages by fluidly monitoring the system pressures with a sliding movable valve that is responsive to certain fluid pressures.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principles of the invention and, although not to scale, show relative dimensions.

FIG. 1B is a perspective view of one-half of the rotary seal ring of the mechanical seal of FIG. 1A suitable for use with the present invention;

DESCRIPTION OF THE ILLUSTRATED EMBODIMENT

Figure 1A:
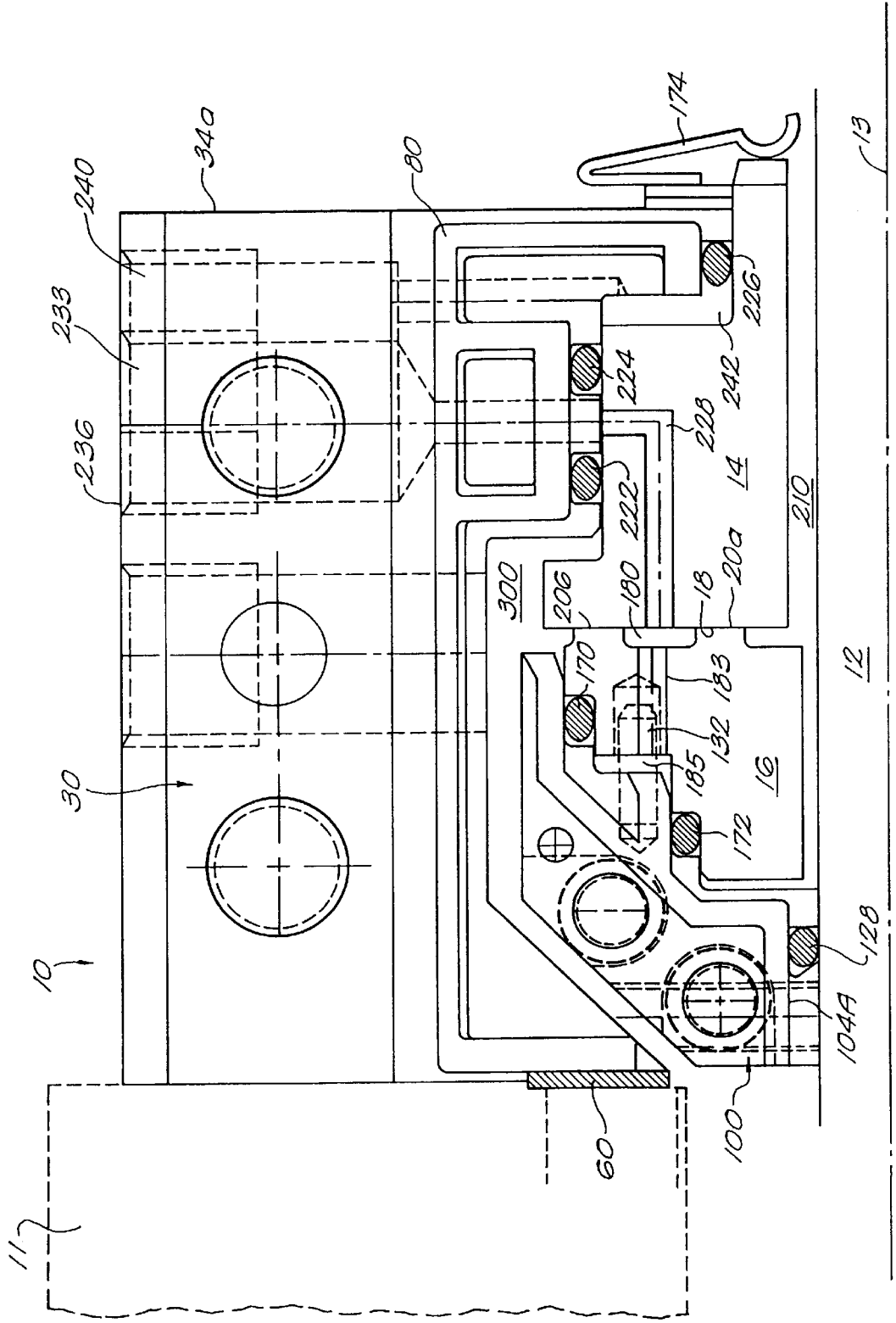
FIG. 1A is a fragmentary view in cross-section of a mechanical seal illustrating the structure for introducing a fluid to the seal faces and suitable for use with the present invention.
Figure 1C:
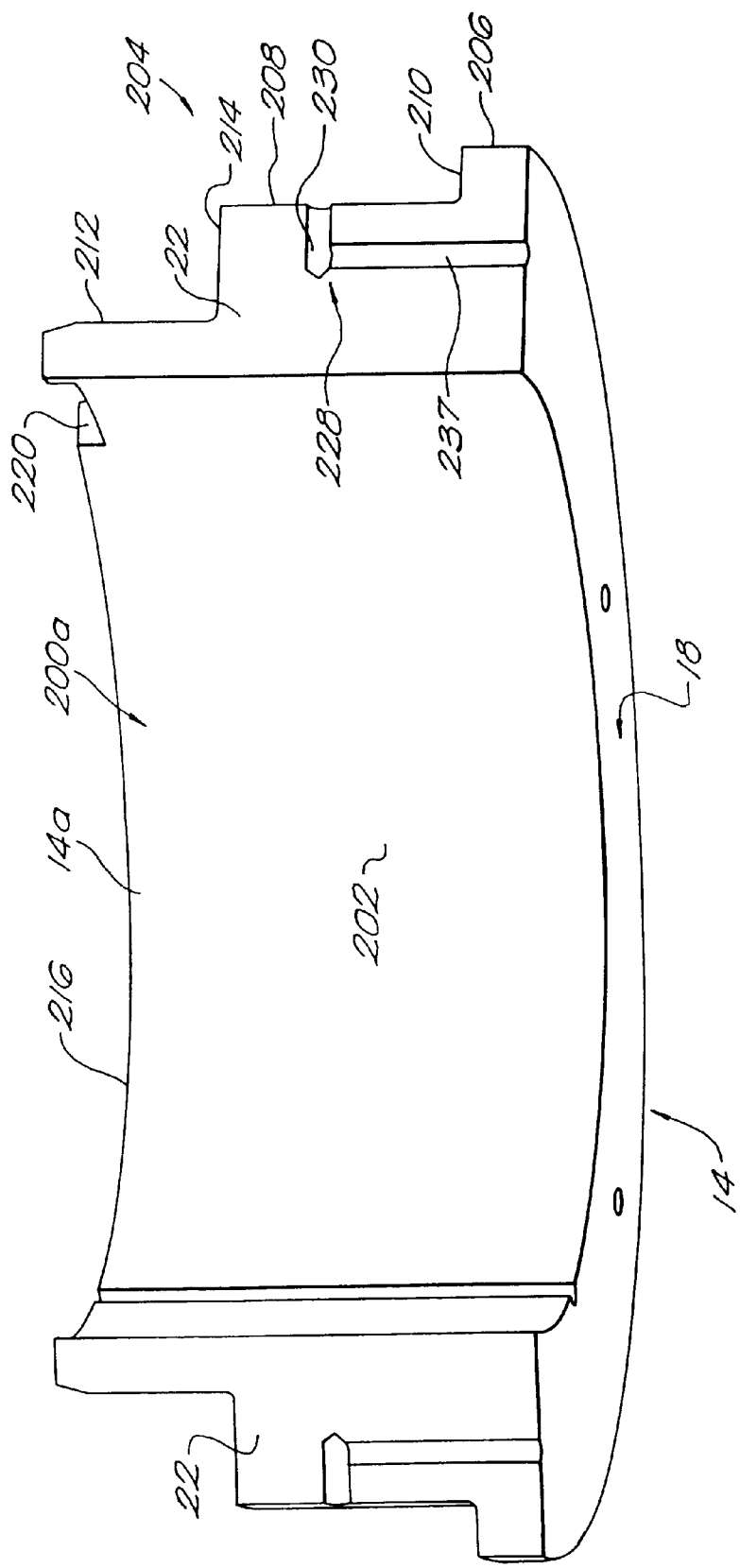
FIG. 1C is a perspective view of one-half of the stationary seal ring of the mechanical seal of FIG. 1A suitable for use with the present invention.

A mechanical seal 10 suitable for use with the pressure fluidic feedback system of the present invention is shown in FIG. 1A. The mechanical seal 10 is preferably concentrically disposed about a shaft 12 and is secured to an external wall of a housing 11, such as a pump or the like. The shaft 12 extends along an axis 13, and is mounted, at least partially, in the housing 11. The seal 10 is constructed to provide fluid sealing between housing 11 and shaft 12, thereby preventing a process medium from escaping the housing 11. Fluid sealing is achieved by a stationary seal ring 14 and a rotary seal ring 16, each having a radially extending arcuate seal surface 20,18, respectively, and a pair of segment sealing surfaces 22 and 24, as shown in FIGS. 1B and 1C. The seal face surface 18 of seal ring 14 is biased into a sealing relationship with the seal face surface 20 of seal ring 16, as described in greater detail below. In addition, the segment sealing surfaces 22, 24 of each seal ring are biased into sealing engagement with each other. Thus, these individual seal surfaces provide a fluid seal operable under a wide range of operating conditions and in a wide range of services.

The terms "axial" and "axially" used herein refer to a direction generally parallel to shaft axis 13. The terms "radial" and "radially" used herein refer to a direction generally perpendicular to shaft axis 13.

With reference to FIG. 1A, the mechanical seal 10 can be any suitable mechanical seal, including a dual seal, a cartridge seal, a tandem seal, a contacting face seal, and can be either of the solid or split seal design, and is preferably a split mechanical non-contacting-type face seal in which a barrier fluid is introduced between the seal faces 18, 20 of the first and second seal rings 14, 16, respectively. In a non-contacting-type face seal the barrier fluid acts to minimize, inhibit, or prevent contact between substantial radial portions of the seal face 18 and radial portions of the seal face 20, thereby reducing the frictional engagement and the resulting wear of the seal faces 18, 20. Accordingly, a non-contacting-type face seal includes seal designs in which there is total separation of the seal faces at all times, total separation of the seal faces under certain conditions, i.e., during periods of shaft rotation, and occasional or partial separation of the seal faces. In contrast, a contacting-type face seal includes seal designs in which partial or complete contact of the seal faces is maintained. In both type of seals, the barrier fluid functions as a heat transfer medium to transfer heat away from the seal faces to reduce the effects of thermal stress on the seal faces.

The barrier fluid used with the present seal can be a gas or a liquid or a combination of both. Typically, the area of the seal surfaces that remains in frictional contact is greater in barrier liquid applications than in barrier gas applications. Accordingly, the use of a barrier gas can result in less frictional wear on the seal surfaces 18, 20 relative to the use of barrier liquid due to the reduction in the frictional contact area. A gas barrier fluid, however, is not suitable for all applications due to the possibility of a minimal amount of leakage of the process fluid through the barrier gas. The use of barrier liquid in the seal can provide for increased reduction of the effects of thermal stress due to the typically better heat transfer properties of a liquid compared to gas. One skilled in the art will appreciate that the choice of one fluid medium over another is dependent on the type of service for which the seal is used For example, in applications in which a minimal amount of process fluid leakage is acceptable, a barrier gas may be preferred to reduce wear at the seal surfaces and to increase the life of the seal. In services in which the process fluid is flammable or environmentally dangerous, a liquid seal may be preferable.

Figure 1D:
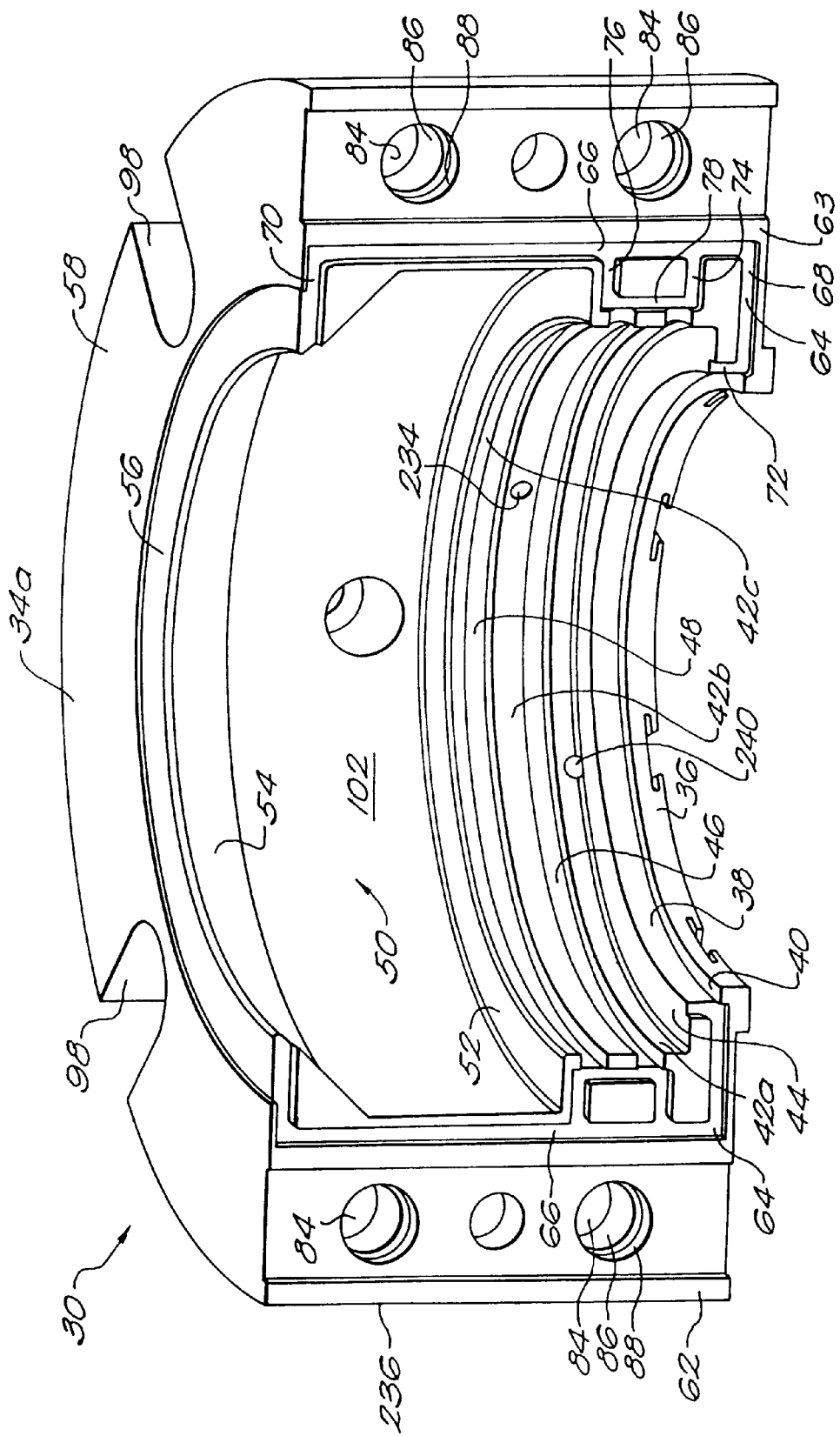
FIG. 1D is a perspective view of one-half of the gland-assembly of the mechanical seal of FIG. 1A suitable for use with the present invention.

With reference to FIGS. 1A through 1F, the illustrated split mechanical seal 10 includes, in addition to the stationary seal ring 14 and the rotary seal ring 16, a seal gland assembly 30 and a rotary seal ring holder assembly 100. The seal gland assembly 30 includes a pair of identical gland segments or halves 34a and 34b, one of which is shown in FIG. 1D. The gland segment 34a has, starting from the axial outermost end (the bottom of FIG. 1D), an inner surface that includes an axially extending first surface 36 and an integrally formed and axially extending second surface 38 that is radially stepped from the first surface 36. The first surface 36 and the second surface 38 form in combination therewith a first annular connecting wall 40. An axially extending third surface 42 is radially stepped from the second surface 38 and forms, in combination therewith, a second annular connection wall 44. The third surface 42 is axially segmented into three sections 42a, 42b, and 42c by elastomeric receiving channels 46 and 48, each of which is radially stepped from the third surface 42. An axially extending fourth surface 50 is radially stepped from the third surface 42 by a third annular connection wall 52. A sloped fifth surface 54 extends radially inward and axially outwardly from the gland segment fourth surface 50.

The gland assembly 30 has a housing gasket groove 56 formed along a bottom 58 of the gland assembly 30. The groove 56 seats a flat, annular elastomeric gasket 60 that preferably has an axial dimension greater than the depth of the groove 56, thereby providing a pressure-tight and fluid-tight seal between the mechanical seal 10 and the housing 11. In a preferred embodiment, the housing gasket 60 is pre-cut into two arcuate segments for mounting in each gland segment 34a, 34b. The housing gasket segments are preferably mounted in the groove 56 and secured thereto by an adhesive. This arrangement helps to prevent leakage of the process medium along the mating portions of the mechanical seal 10 and the housing 11 when mounted together.

Figure 1E:
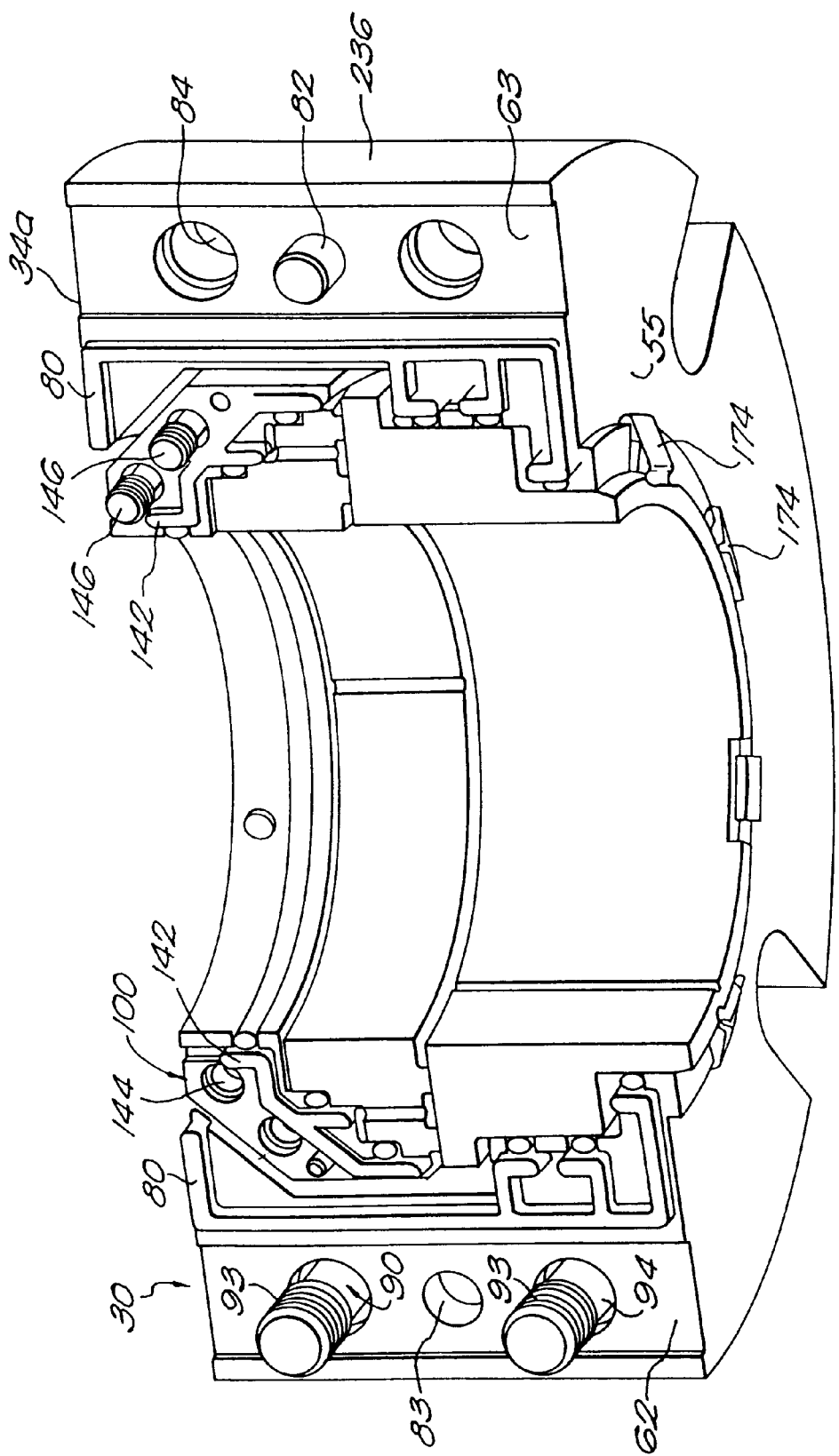
FIG. 1E is a perspective view of one-half of the assembled mechanical seal of FIG. 1A suitable for use with the present invention.
Figure 1F:
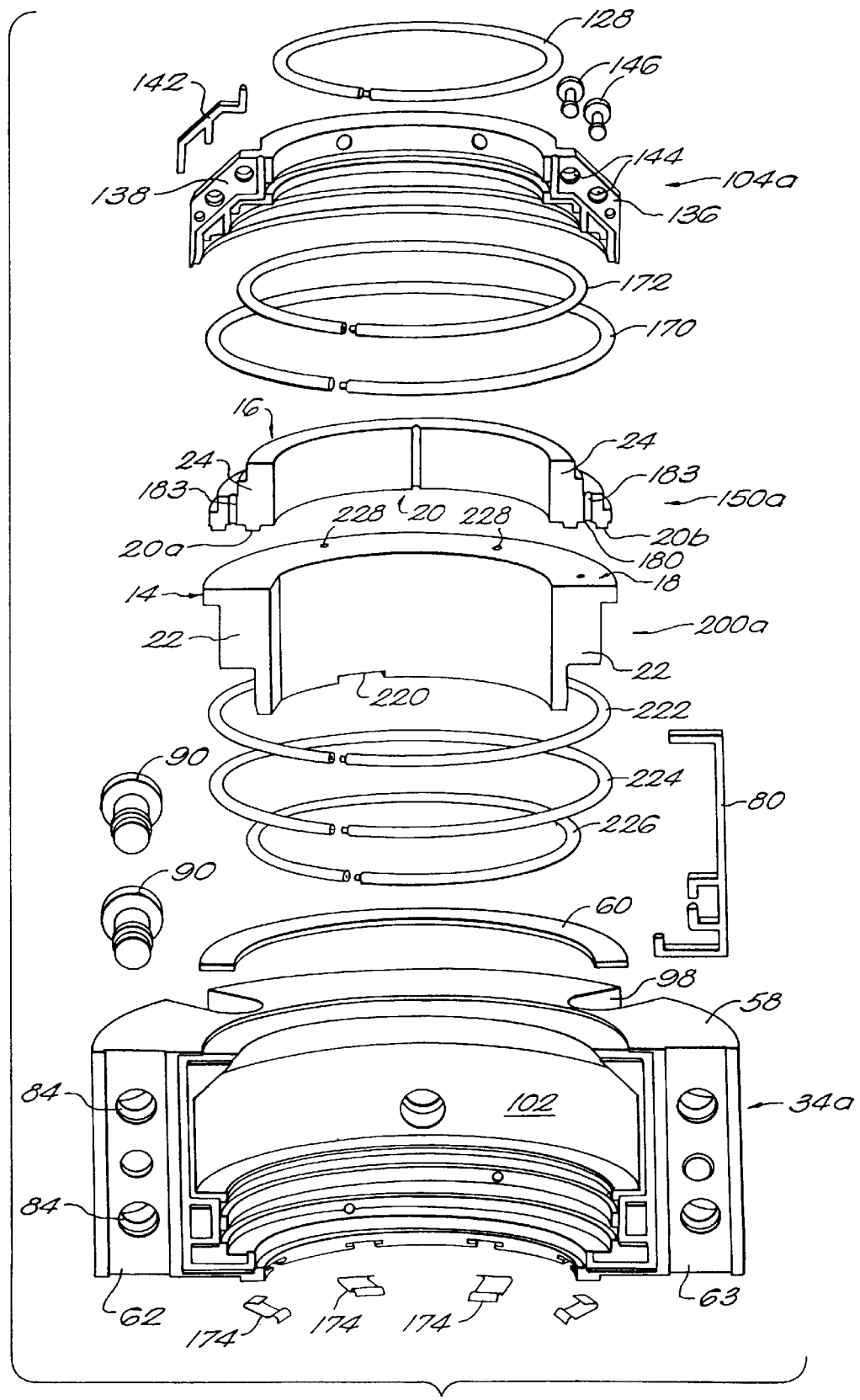
FIG. 1F is an exploded unassembled view of the seal components of FIG. 1D suitable for use with the present invention.
Figure 1G:
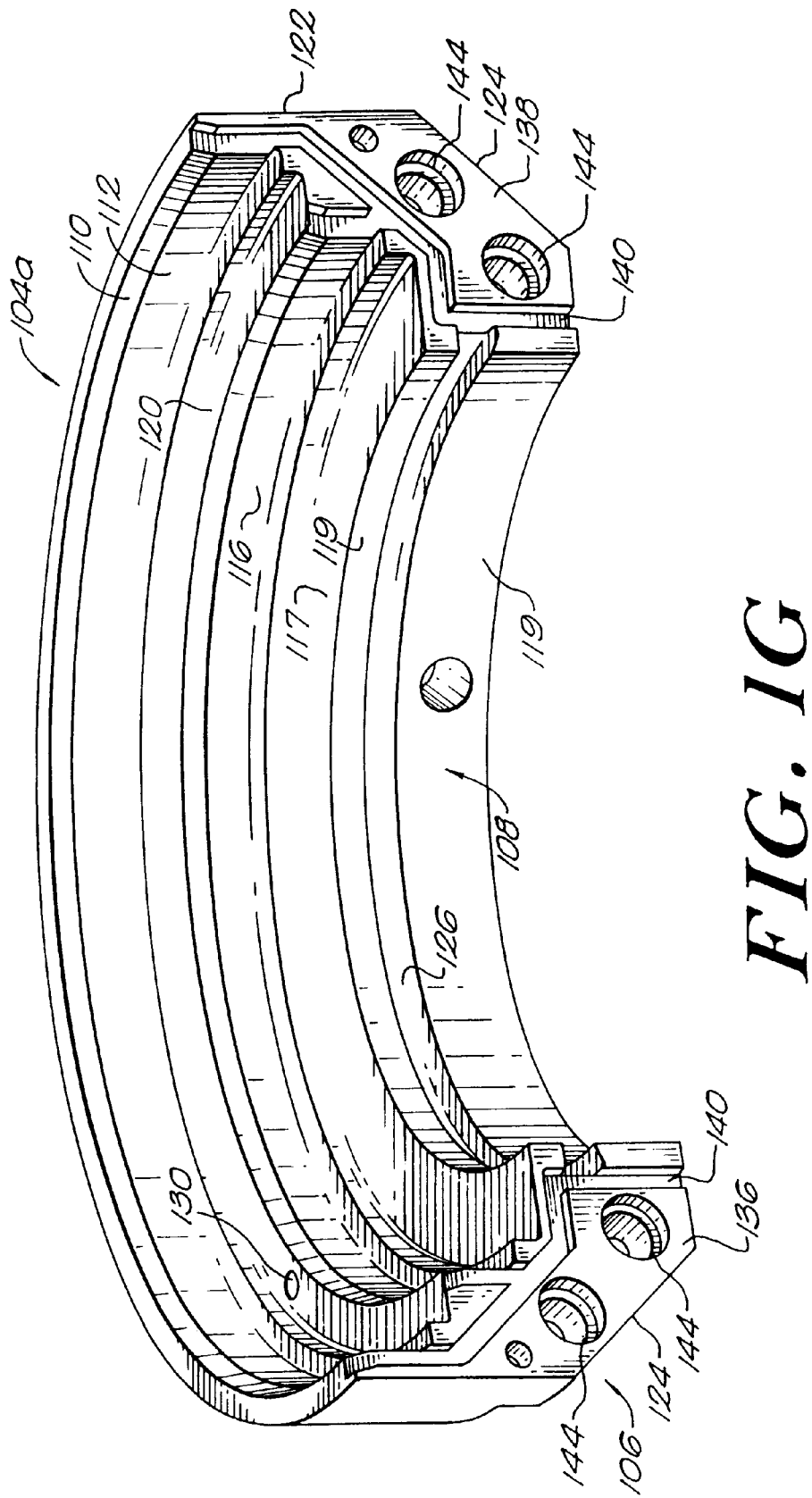
FIG. 1G is a perspective view of one-half of the rotary seal ring holder assembly of FIG. 1A suitable for use with the present invention.
Figure 1H:
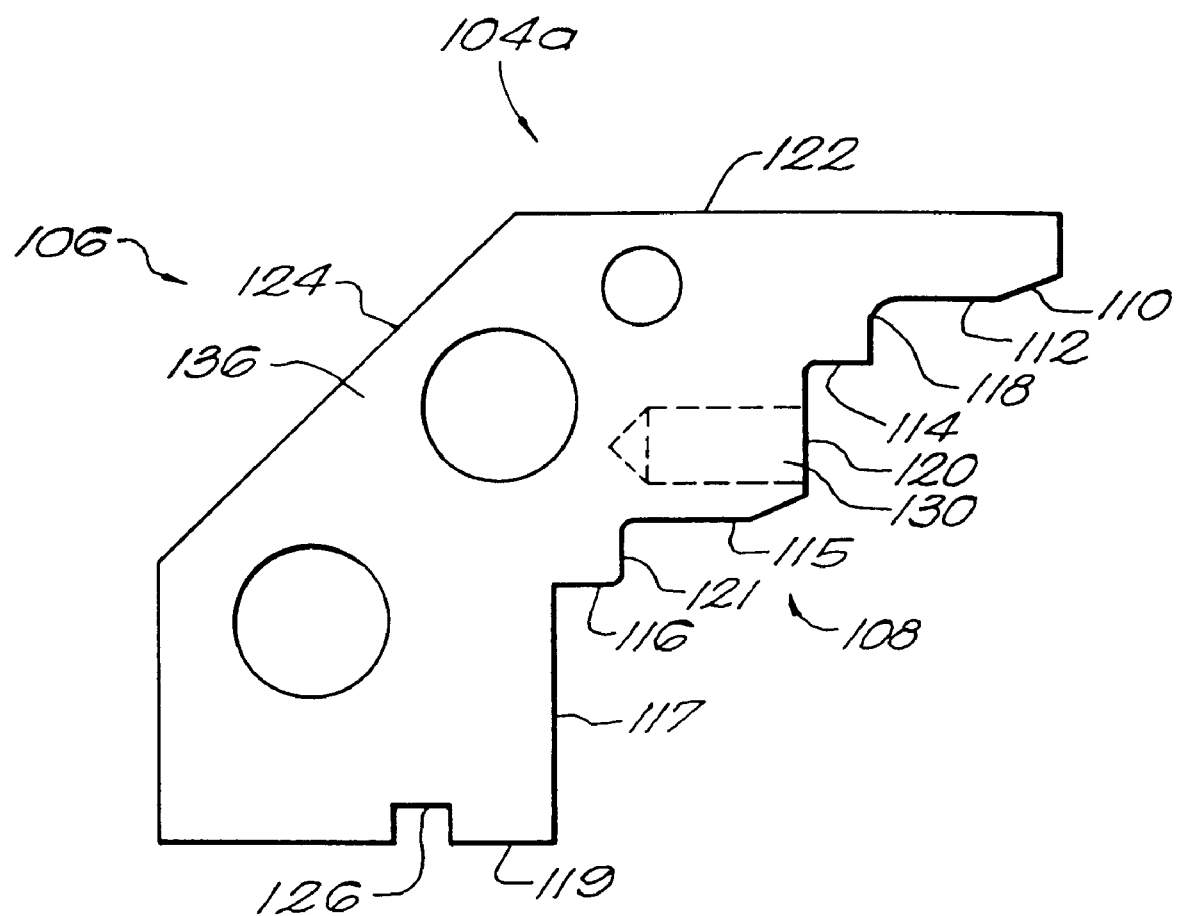
FIG. 1H is a side elevational view of a face of the rotary seal ring holder segment of FIG. 1A suitable for use with the present invention.

As illustrated in FIGS. 1A, 1E, 1G, and 1H, a holder assembly 100 is disposed in a chamber 102, FIG. 1D, formed by gland assembly 30 and is spaced radially inward therefrom. It should be understood, however, that the holder assembly 100 need not be disposed within the gland assembly 30. The holder assembly 100 has a pair of identical arcuate holder segments 104a and 104b, one of which is shown in FIG. 1G. As shown in FIGS. 1G and 1H, each holder segment includes an outer surface 106 and an inner surface 108. The holder segment inner surface 108 has a radially inward sloping first face 110 that terminates in an axially extending second face 112. A pair of successive radially inwardly stepped surfaces form a third face 114 and a fourth face 15, respectively. The second face 112 and the third face 114 have a radially inward extending first wall 118 integrally formed therebetween, and the third face 114 and the fourth face 115 have a radially inward extending second wall 120 integrally formed therebetween. A further pair of successive radially inwardly stepped surfaces form a fifth face 116 and a sixth face 119, respectively. The fourth face 115 and the fifth face 116 have a radially inward extending third wall 121 integrally formed therebetween, and the fifth face 116 and the sixth face 119 have a radially inward extending fourth wall 117 integrally formed therebetween. The diameter of the sixth face 119 is preferably equal to or slightly greater than the diameter of the shaft 12, to which the holder assembly 100 is to be attached.

The holder segment outer surface 106 has a first axially extending outer surface 122 and a radially inward sloping second outer surface 124. In a preferred embodiment, the outer diameter of the holder segment first outer surface 124 is less than the diameter of the gland segment fourth surface 50. This clearance allows the holder assembly 100 to seat within the gland assembly 30 for unobstructed rotational movement therein. The outer diameter of the second outer surface 124 is preferably less than the inner diameter of the gland segment fifth surface 54.

The sixth face 119 of the holder segment 104a has formed thereon an annular channel 126 for mounting a split shaft gasket 128, FIG. 1A. When mounted in the channel 126, the gasket 128 sealingly mates with the shaft 12, providing a fluid-tight seal along the holder and shaft interface. The illustrated second radially extending wall 120 preferably has formed therein a cylindrical alignment bore 130 for receiving one end of an alignment pin 132, FIG. 1A. The other end of the alignment pin 132 is received in a corresponding bore 134 formed in the rotary seal ring 16, FIG. 1I. The protrusion 132 operates as a mechanical rotary means by biasing the rotary seal ring 16 into rotational movement, as described in further detail below.

The illustrated holder segments 104a, 104b have a holder gasket groove 140, having the configuration illustrated in FIG. 1F and 1G, formed on each split holder seal face 136, 138. A holder gasket 142, complementary in shape to the groove 140, seats in groove 140. The holder gasket 142, when seated in the groove 140, extends beyond the holder seal faces 136, 138, as best shown in FIG. 1E. The exposed portion of the gasket 142 seats in a complementary groove formed in the opposite holder segment seal face. This arrangement provides for a fluid-tight seal. The gasket can be composed of any suitable deformable material, such as elastomeric rubber.

Figure 1I:
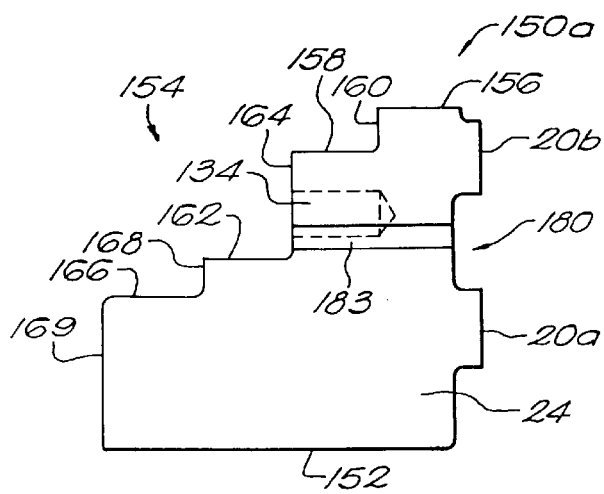
FIG. 1I is a side elevational view of a face of the rotary seal ring segment of FIG. 1A suitable for use with the present invention.

With reference to FIGS. 1B and 1I, the rotary seal ring assembly 16 includes a pair of arcuate rotary seal ring segments 150a and 150b, one of which is shown in FIG. 1B. The rotary seal ring segments have a substantially smooth arcuate inner surface 152. The inner diameter of the inner surface 152 of the rotary seal segments is greater than the diameter of the shaft 12 to permit mounting thereon.

The rotary seal segments outer surface 154 has a series of axially extending outer surfaces each of which is stepped radially inward from the other. An axially extending second outer surface 158 is stepped radially inwardly from a first axial extending outer surface 156. The first outer surface 156 and the second outer surface 158 form in combination therewith a first annular connecting wall 160 that extends radially between the first and second outer surfaces. A third axial extending outer surface 162 is stepped radially inward from the second outer surface 158 by a second annular connecting wall 164 that extends radially between the second and third outer surfaces. A fourth axially extending outer surface 166 is stepped radially inward from the third outer surface 162. The third outer surface 162 and the fourth outer surface 166 form in combination therewith a third annular connecting wall 168 that extends radially between the third and fourth outer surfaces. A fourth annular connecting wall 169 extends radially from the fourth outer surface 166 to the inner surface 152.

The stepped outer surface 154 of the rotary seal segments are complementary to the stepped inner surface 108 of the holder segments 104a, 104b to permit mounting of the rotary seal segments into the holder segments. The diameter of the rotary seal segment fourth outer surface 166 is less than the diameter of the holder segment fifth face 116. Likewise, the diameters of the rotary seal segment second outer surface 158 and the third outer surface 162 are less than the diameters of the holder segment third face 114 and fourth face 115, respectively.

Elastomeric members, such as split O-rings 170 and 172, can be concentrically disposed about the rotary seal ring 16. In a preferred embodiment, the O-ring 170 seats along holder segment second face 112 and abuts rotary seal segment second outer surface 158 and first connecting wall 160, as shown in FIGS. 1A, 1H, and 1I. The O-ring 172 seats along the holder segment fourth face 115 and third wall 121 and abuts rotary seal segment fourth outer surface 166 and third connecting wall 168. The O-rings 170 and 172 are sufficiently resilient to place each of the rotary segment sealing surfaces 24 into sealing contact with the corresponding seal ring segment, thereby forming a fluid-tight and pressure-tight seal. The O-rings 170 and 172 function to apply, in combination with the process fluid, a radially inward force that resiliently biases the axial seal faces 24 of the rotor segments together thereby preventing or minimizing leakage through the seal faces.

To inhibit seal surface misalignment, the O-ring 172 is seated along the outer surface 154 of the rotary seal ring segments 150a and 150b to act as a resilient pivoting member about which the rotary seal ring 16 can pivot relative to the rotary holder assembly 100. The pivoting action permitted by the O-ring 172 acts to maintain alignment and a sealing relationship between the rotary seal ring seal surface 18 and the stationary seal ring seal surface 20. Furthermore, the O-ring 172 spaces the surface 154 of the rotary seal ring 16 from the inner surface 108 of the holder assembly 100.

With reference to FIG. 1A, the pivoting action of the O-ring 172 provides for a resilient pivoting of the seal rings 18, 20 during full operation of the split mechanical seal 10 in both non-contacting and contacting face seal modes, while concomitantly ensuring either consistent contact between the opposed seal faces or maintenance of a predetermined gap size between these faces.

The illustrated seal faces 18 and 20 of the rotary seal ring segments each have a continuous, arcuate radial groove 180 formed therein, as is best shown in FIG. 1B. In a preferred embodiment, the radial groove 180 is radially disposed between the inner surface 152 and the first outer surface 156 of the rotary seal ring 16. The groove 180 accordingly splits the rotary seal ring seal face 20 into two concentric seal surfaces or land portions 20a and 20b. In this manner a dual seal is formed between the stationary seal ring 14 and the rotary seal ring 16.

With reference to FIGS. 1A, 1E, 1J and 2, the radial groove 180 communicates with the seal face 18 of the stator seal ring 14. A barrier fluid at a specified regulated pressure, generally greater than the process pressure, is introduced to the radial groove 180 through a barrier fluid biasing system comprising barrier fluid conduits 228 formed in the stator seal ring 14, as is described in further detail below. The barrier fluid acts to provide a separation force to the seal faces 18 and 20, as indicated by the arrows labeled $F_A$ in FIGS. 1J and 2. The separation force is a primarily or generally hydrostatic force that operates to minimize, inhibit, or prevent contact between radial portions of the seal surface 18 and radial portions of the seal surfaces 20a and 20b, thereby reducing the frictional engagement and the resulting wearing of the seal surfaces 18, 20a, 20b. The magnitude of the separation force is dependent on a number of factors such as the dimensions of the radial groove, e.g., radial width, the configuration of the seal faces, as well as the pressure of the barrier fluid. The choice of barrier fluid is also a factor when selecting the magnitude of the separation force and the degree of seal face separation. The relationship between the barrier fluid pressure and the closing fluid pressure is adjusted to select the degree of opening force and thus seal face separation. In applications in which the barrier fluid is a gas, less seal surface contact is desirable and, thus, a greater degree of seal surface separation is preferred. In barrier liquid applications, a smaller degree of seal surface separation is required due to the increased heat transfer properties of a liquid compared to a gas. A significant advantage of the seal of the present invention is that the seal can operate with either a gas or liquid barrier fluid by adjusting the degree of seal surface contact, as well as the size of the gap formed between the seal faces 18 and 20.

Figure 1J:
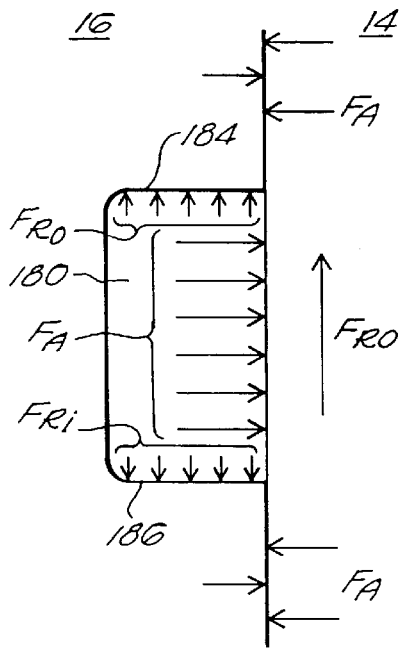
FIG. 1J is a fragmentary side elevational view of the seal ring faces of FIG. 1D further illustrating the forces within the groove.
Figure 2:
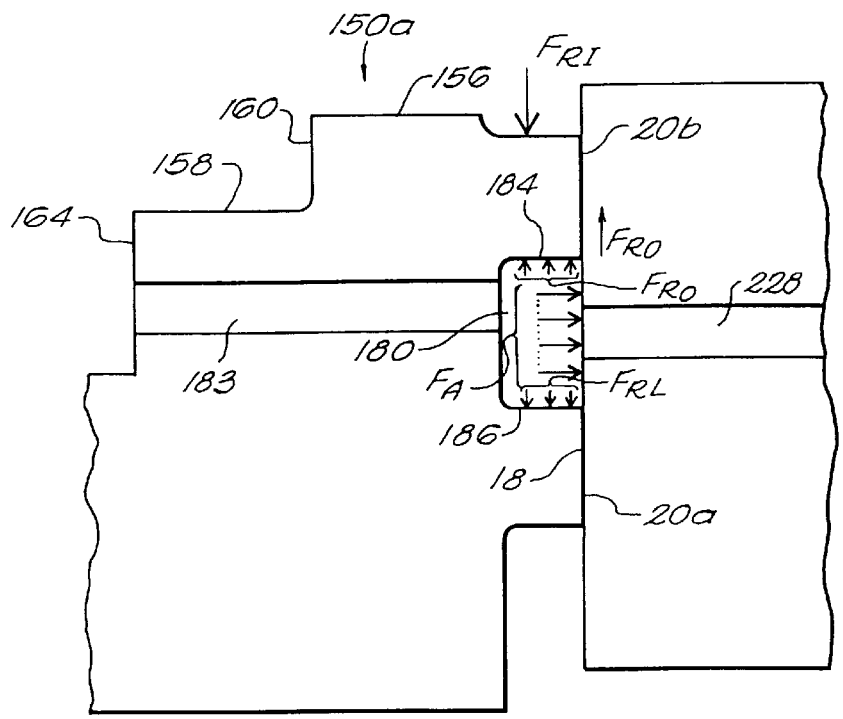
FIG. 2 is a side elevational view of the stationary and rotary seal ring segments of the mechanical seal of FIG. 1A illustrating the separate force that develops within the seal ring groove according to the teachings of the present invention.

The barrier fluid within the radial groove 180 exerts a radially outward force $F_{RO}$ and a radially inward force $F_{Ri}$ on the rotary seal ring 16, as illustrated in FIGS. 1J and 2. Because the surface area at the outer wall 184 is greater than the surface area at the inner wall 186 of the groove 180, these forces result in a net radially outward force $F_{RO}$ on the rotary seal ring 16. The groove 180 is dimensioned such that the radially outward force $F_{RO}$ created by the barrier fluid within the groove does not generally exceed the radially inward force $F_{RI}$ on the rotary seal ring 16 from the O-rings 170, 172 and from the process medium acting on at least seal ring outer surface 156. Thus, the radially outward force $F_{RO}$ due to the barrier fluid does not separate or "blow apart" the rotary seal ring segments 150a, 150b of the rotary seal ring 16.

A significant advantage of the illustrated mechanical seal 10 is that it allows for the introduction of a cooling or barrier fluid to the seal faces 18, 20 of the seal rings 14, 16. The combination of the radial groove 180 and the axial bores 228 allow convenient operation of the mechanical seal in both non-contacting and contacting modes of operation, without regard to promoting leakage through the axial seal surfaces of the seal ring segments. Those of ordinary skill will recognize that this also relates to liquid type mechanical seals.

Figure 3:
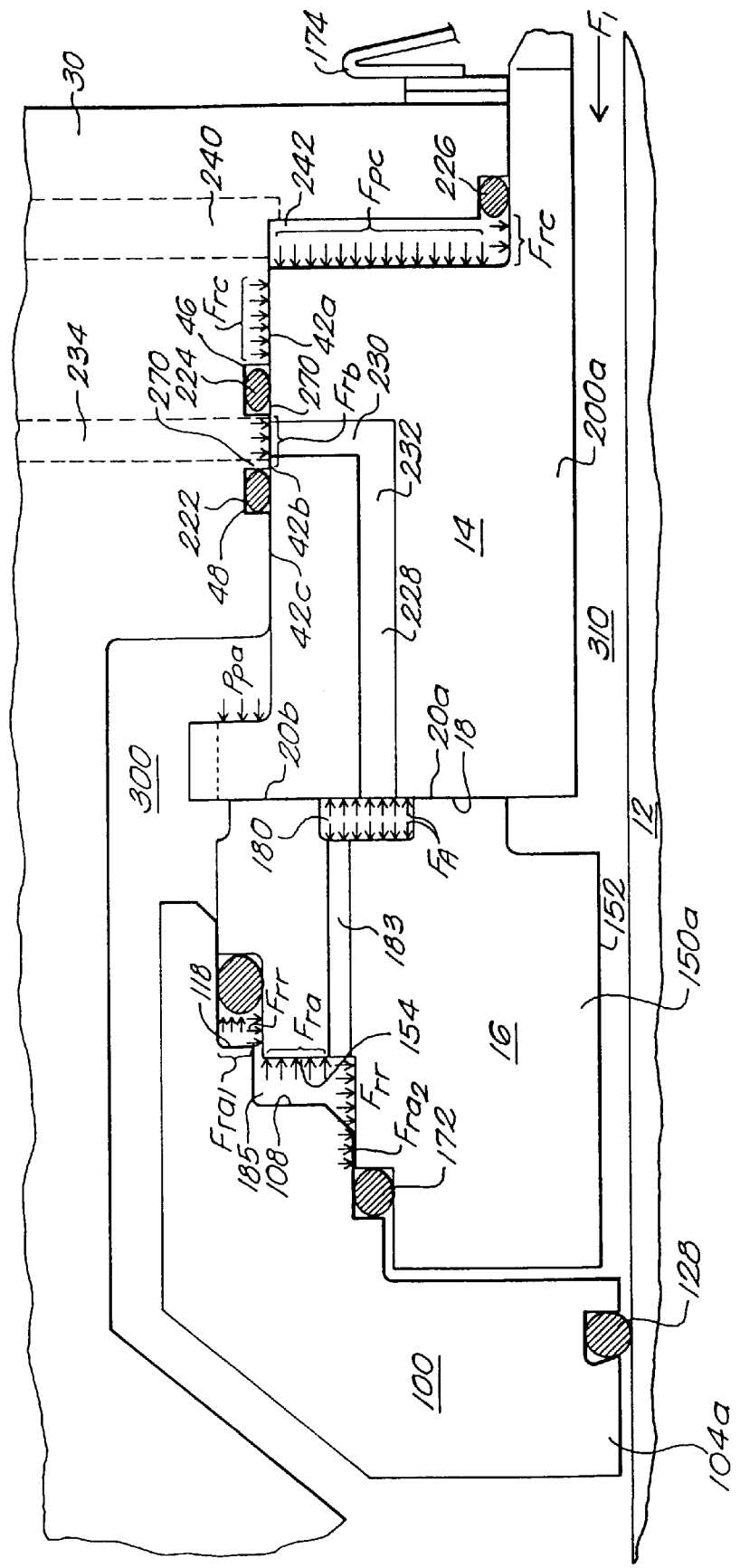
FIG. 3 is a fragmentary view in cross-section of the mechanical seal of FIG. 1A according to the present invention.

With reference to FIGS. 1A, 1B, 1H, 2 and 3, a plurality of axial bores 183 extend through the rotary seal ring segments from the radial groove 180 to the second annular connecting wall 164. The bores are preferably evenly spaced apart along the circumference of the seal ring 14. Those of ordinary skill will recognize that any number and manner of spacing can be utilized. Barrier fluid can be introduced to outer surface 154 of the rotary seal ring segments through the axial bores 183. As best illustrated in FIG. 3, the O-rings 170 and 172, the outer surface 154 of the rotary seal ring segments, and the inner surface 108 of the holder segments form, in combination therewith, a fluid-tight, pressure-tight annular chamber 185. Barrier fluid introduced to the chamber 185 through the bore 228, the groove 180, and the axial bore 183 exerts a radially inward fluid force $F_{rr}$ on the outer surface 154 of the rotary seal ring segments. The radially inward fluid force $F_{rr}$ acts in combination with the radial inward force provided by O-rings 170 and 172 and the process medium to place each of the rotary segment sealing surfaces 24 into sealing contact with another segment, thereby maintaining a fluid-tight and pressure-tight seal.

The radially inward fluid force $F_{rr}$ can be varied or adjusted by controlling and/or regulating the pressure of the barrier fluid in the chamber 185. In this manner, the radially inward force on the rotary seal ring segments can be adjusted to compensate for changes in operating conditions within the seal. For example, a negative pressure condition, in which the pressure of the fluid at the outer surface 154 of the rotary seal ring segments drops below the pressure of the fluid at the inner surface 152 of the rotary seal ring segments, can result in separation of the rotary seal ring segments, as is described in more detail below. The phrase "negative pressure condition" is defined herein to mean any condition in which the pressure of the fluid at the outer surfaces (e.g., surfaces exposed to the process fluid) of the seal rings and holder assembly is less than the pressure of the fluid at the inner surfaces of the seal rings and holder assembly. In such a condition, the radially inward force $F_{rr}$ can be increased to inhibit separation of the seal ring segments and thereby maintain the seal between the seal ring segment surfaces 24.

In addition to the radially inward fluid force, the barrier fluid within chamber 185 exerts an axial fluid force $F_{ra}$ on the rotary seal segments. Components of the axial fluid force $F_{ra}$, $F_{ra1}$, and $F_{ra2}$ aid in maintaining O-rings 172 in their seated positions, as well as urge the seal faces of the rings toward each other. Axial fluid force component $F_{ra1}$ biases O-ring 170 into sealing engagement with the outer surface 154 of the rotary seal ring segments and inner surface 108 of the holder segments. Likewise, axial fluid force component $F_{ra2}$ biases O-ring 172 into sealing engagement with the outer surface 154 of the rotary seal ring segments and inner surface 108 of the holder segments.

A significant advantage of the negative pressure control feature of the illustrated seal is that it allows for a single mechanical seal to operate in multiple environments. Thus, it is not necessary for the end user to stock multiple different seal types for employment in various, specific operating conditions. This reduces overall cost to the end user because they need only purchase and stock a single seal type, the split mechanical seal of the present invention, which can be adjusted to provide a fluid seal under multiple operating conditions.

As shown in FIGS. 1C and 1I, the stationary seal ring 14 includes a pair of arcuate seal ring segments 200a, 200b each identical to the other, one of which is shown. The stationary seal ring arcuate segments 200a, 200b have a substantially smooth arcuate inner surface 202 extending parallel to the first axis 13 and an outer surface 204. The stationary seal ring segment outer surface 204 includes seal face 18 and first outer surface 206 that extends axially therefrom, as well as a further axially extending second outer surface 208 that is stepped radially inward from the first outer surface 206. The first outer surface 206 and the second outer surface 208 form in combination therewith a first annular connecting wall 210 that extends radially between the first and second outer surfaces. An axially extending third outer surface 212 is stepped radially inwardly from the second outer surface 208 by a second annular connecting wall 214 that extends radially between the second and third outer surfaces. The stationary seal ring 14 has a substantially smooth arcuate bottom surface 216 opposed to seal face 18. The stationary seal rings segments 200a, 200b have a recess 220 formed along the bottom surface 216. The mechanical spring clip 174, mechanically coupled to a bottom surface 55 of the gland assembly 30, seats in the recess 220, FIGS. 1E and 1F. This arrangement helps align and seat the stationary seal ring 14 in the chamber 102, as well as provide a mechanical impedance for preventing the stationary seal ring segment 14 from rotating with shaft 12 and the rotary seal ring 16.

The inside diameter of the stationary segment inner surface 202 is greater than the shaft 12 diameter, and is greater than the diameter of the inner surface 152 of the rotary seal ring 16, thereby allowing motion of both the shaft 12 and the rotary seal 16 relative to the stationary seal ring 14. A plurality of elastomeric members, i.e. split O-rings 222, 224, and 226, provides a radially inward biasing force sufficient to place the segment sealing faces 22 of the stationary seal ring segment 14 in sealing contact with the other stationary seal ring segment. Additionally, the O-rings 222, 224, and 226 form fluid-tight and pressure-tight seals between the gland assembly 30 and the stationary seal ring 14. The O-rings 222, 224 seat in the channels 48, 46 formed in the third surface 42 of the gland assembly 30. The O-ring 226 seats against the second surface 38 and the first annular connecting wall 40 of the gland assembly 30. The stationary seal ring is preferably composed of a ceramic material, such as alumina or silicon carbide and the like.

With reference to FIGS. 1A, 1C and 1E, a plurality of barrier fluid bores 228 are formed in the stationary seal ring segments 200a and 200b. The bores 228 include a radially extending section 230 that extends radially inwardly from the second outer surface 208 of the stationary seal ring segments and an axial section 232 that communicates with and extends from the radial section 230 to the seal surface 18 of the seal ring segments. Barrier fluid from a barrier fluid reservoir, as described in detail below, is introduced to the seal surfaces 18, 20 of the seal rings and the radial groove 180 formed in the seal surface 20 through the bores 228.

One skilled in the art will recognize that the number of barrier fluid bores is not limited to the number or shape of the illustrated herein. For example, a single barrier fluid bore can be provided. Alternatively, it is possible to provide barrier fluid to the seal surfaces 18, 20 by means other than a bore formed in the seal rings 14 and 16. For example, the barrier fluid can be introduced to the seal surfaces from the outer and/or inner diameter of the seal ring segments through spiral pumping grooves or the like. In this manner, the barrier fluid does not necessarily need to be a separate fluid supply but can be the process medium itself.

Likewise, the position and arrangement of the barrier fluid bores is not limited to those specifically disclosed herein, as alternative positions and arrangements are possible to achieve the same results. For example, the barrier fluid bores can be formed in rotary seal ring 16, as well as the stationary seal ring 14, and can extend from the seal surfaces to any outer surface of the seal rings. In addition, the barrier fluid bore can extend linearly from the seal surfaces 18, 20 to an outer surface of the seal ring.

As best shown in FIGS. 1A, 1C and 1E, each radial section 230 of the barrier fluid bores 228 opens at the second outer surface 208 of the stationary seal ring to provide fluid communication between the bores 228 and a similar axial barrier fluid bore 233 formed in the gland assembly 30.

The bore 233 formed in the gland assembly 30 opens at one end at the outer surface 236 of the gland assembly and at the other end at a section 42b of the third surface 42 of the gland assembly 30. The O-rings 222 and 224 are positioned in grooves 48 and 46 on either side of section 42b and provide fluid-tight and pressure-tight seals between the stationary seal ring segments 220a, 200b and the gland assembly 30. In this manner, a fluid-tight, pressure-tight annular chamber is formed between the O-rings 222, 224, section 42b of the gland assembly 30, and the second outer surface 208 of the stationary seal ring 14, to retain the barrier fluid within this channel as well as to conduct the fluid into the axial bore 228. Barrier fluid from a barrier fluid reservoir (not shown) is supplied through the gland bore 233 and the annular chamber to each of the stationary seal ring segment bores 228.

With reference to FIG. 1A, the mechanical spring clip 174, in combination with O-ring 172, functions to provide an axial force for resiliently supporting the stationary and rotary seal rings 14 and 16 to bias the seal rings such that the stationary and rotating seal surfaces 18 and 20 are biased towards each other. As illustrated in FIGS. 1A and 3, the seal rings 14 and 16 are floatingly and non-rigidly supported in spaced floating relation relative to the rigid walls and faces of the gland and holder assemblies 30, 100. This floating and non-rigid support and spaced relationship permits small radial and axial floating movements of the rotary seal segments 150a, 150b and the stationary seal ring segments 200a, 200b with respect to each other, while still allowing the rotating seal face 20 to follow and to be placed into a sealing relationship with stationary seal ring face 18. Thus, the rotary and stationary seal segments 150a, 150b and 200a, 200b are self-aligning as a result of this floating action.

In addition to the mechanical biasing provided by clip springs 174, an additional closing fluid biasing system can be provided in the seal 10 of the present invention. With reference to FIGS. 1A and 3, according to one embodiment, the closing fluid biasing system includes a radially extending closing fluid bore 240 that is formed radially through the gland assembly 30 for introducing a closing fluid which is introduced to the outer surface 204 of the stationary seal ring segments 200a, 200b to provide a closing force on the stationary and rotary seal rings 14, 16. The radially extending closing fluid bore 240 is disposed adjacent and parallel to the barrier fluid bore 233. The closing fluid bore 240 opens at one end at the outer surface 236 of the gland assembly and at the other end onto section 42a of the third inner gland surface 42 and the second annular connecting wall 44 of the gland assembly 30, FIG. 1D. A fluid-tight and pressure-tight annular closing fluid chamber 242 is formed between O-rings 224 and 226, the outer surface 204 of the stationary seal ring segments 200a and 200b, and the inner surface of the gland assembly.

As best illustrated in FIG. 3, closing fluid at a regulated pressure is provided from a closing fluid reservoir (not shown) to the closing fluid chamber 242 through closing fluid bore 240. The closing fluid exerts a fluid closing force $F_{fc}$ on the stationary and rotary seal rings segments. The fluid closing force $F_{fc}$ operates in combination with a mechanical spring closing force $F_{sc}$ to bias the seal faces 18 and 20 towards one another into a sealing relationship. Preferably, the sum of the fluid closing force $F_{fc}$ and the mechanical spring closing force $F_{sc}$ is greater than the barrier fluid separation force $F_A$ to inhibit over separation of the seal surfaces 18 and 20 and the potential loss of the seal, e.g., excessive fluid leakage, between seal surfaces 18 and 20.

The magnitude of the fluid closing force $F_{fc}$ can be adjusted or regulated by controlling the pressure of the closing fluid within the closing fluid chamber 242, in accord with one practice of the invention as set forth below. The ability to adjust the closing force on the stationary and rotary seal rings segments provides for significant advantages. For instance, the magnitude of the closing force can be varied to maintain a sealing relationship between the seal surfaces 18 and 20 in the event of a change in operating conditions. Also, the magnitude of the fluid closing force can be adjusted to compensate for a reduction in the mechanical spring force due to mechanical spring clip fatigue. Consequently, the split mechanical seal 10 in combination with a fluid feedback system can dynamically regulate the fluid seal and/or the gap formed between the seal faces 18, 20 to control the amount of leakage during operation.

A significant advantage of the fluid biasing system is that it provides a simple integrated structure, such as fluid conduits, for externally controlling the amount of separation of the seal faces and regulating the fluid seal formed between the seal faces. Accordingly, this system can operate in combination with the separation force provided by barrier fluid introduced to the seal faces 18, 20 or independent of pressurized fluid contained within the seal 10, to adjust the degree of seal face contact. Hence, the mechanical seal 10 can regulate or adjust the seal face separation, as well as the fluid seal formed therebetween, over a wide range of operating conditions. This increases the flexibility of the seal and allows the seal to be used in multiple environments.

One skilled in the art will recognize that the seal is not limited to the specific fluid biasing systems described herein and that alternative fluid biasing systems arrangements are possible. For example, a single fluid reservoir can be used to supply barrier fluid to the radial groove through the barrier fluid biasing system and to supply either or both of the closing pressure and the pressure of the barrier fluid supplied to the seal to maintain the desired conditions at the seal faces 18, 20 of the seal rings 14, 16. One example of an integrated dynamic pressure feedback system suitable for use with the mechanical seal 10 is illustrated in FIGS. 4 through 15B. The pressure feedback system employs one of the system fluids, such as the barrier, the process or the closing fluid, as a regulated fluid input and regulates either the barrier fluid pressure or the closing force based on this regulated input. In doing this, the pressure feedback system senses a change in pressure between selected fluid pressures and corrects any imbalance. The pressure feedback system accomplishes this correction by connecting the system to a high pressure fluid supply to add fluid to the system to raise the pressure therein or to vent pressure from the system when internal pressure is above, or below, a selected value.

After the seal 10 is assembled and mounted to the pump housing 11, the process medium is sealed within a process fluid chamber 300, as shown in FIGS. 1 and 15. The process fluid chamber is defined by the gland inner fourth surface 50 and fifth surface 54, the gland third wall 52, O-rings 170 and 222, the outer surface 106 and the first and second inner surfaces 110, 112 of the holder assembly, first outer surface 156 of the rotary seal ring 16, and the first and second outer surfaces 206, 208 and first connecting wall 210 of the stationary seal ring 14. The ambient medium, typically air, fills an ambient fluid chamber 310, typically sealed from the process chamber 300, that is defined by the stationary and rotary seal ring inner surfaces 152, 202, the fourth wall 169 of the rotary seal ring 16, the O-ring 128, and the shaft 12. The terms "ambient" and "ambient medium" are intended to include any external environment or medium other than the process environment or process medium.

In operation, barrier fluid is introduced to the radial groove 180 and the seal surfaces 18, 20a, 20b through the barrier fluid biasing system, such as through barrier fluid bores 228 in the stationary seal ring 14. The barrier fluid exerts a primarily hydrostatic lifting force on the seal surface 18, 20a, and 20b that operates to separate at least a portion of the stationary seal ring face 18 from at least a portion of the rotary seal ring surfaces 20a and 20b to form a gap therebetween. The barrier fluid fills the gap formed between the seal surfaces, thereby separating the seal faces 18 and 20 to form a fluid seal between the process medium in the process chamber 300 and the ambient fluid in the ambient fluid chamber 310. The gap is maintained at a predetermined width, or is adjustable, to minimize leakage across the seal faces while concomitantly separating the seal faces to reduce wear.

The effects of the barrier fluid on the seal 10 are twofold. First, the barrier fluid reduces wear on the seal surfaces by reducing the amount of direct, frictional contact between the seal surface 18 and the seal surfaces 20a and 20b, thus resulting in a longer life for the seal components. Second, the barrier fluid operates to transfer heat generated by the direct, frictional contact between the seal surfaces away from the seal faces, resulting in a more even temperature distribution throughout the seal 10 and thus prolonging the useful life of the seal components by reducing thermal stress that the components are subjected to.

Additionally, the split mechanical seal 10 of the present invention provides the requisite flexibility of being operable with different types of barrier fluids, including gases, liquids or combinations thereof. This flexibility is possible because the area of direct, frictional contact between the seal surfaces can be controlled by adjusting the barrier fluid pressure, and thus the magnitude of the hydrostatic lifting force, to produce the desired separation gap. Generally, it is desirable for the separation gap to be greater in barrier gas applications than in barrier liquid applications, because of the typically better heat transfer properties of liquids compared with gases. Accordingly, in applications in which a barrier gas is preferred, the separation gap can be adjusted to the appropriate width for the selected barrier gas which will inhibit wear on the seal surfaces. Similarly, in applications in which a barrier liquid is preferred, the separation gap can be adjusted to the appropriate width for the selected barrier liquid which will inhibit wear on the seal surfaces.

During normal operation, the pressure of the process medium in the process fluid chamber 300 is greater than the pressure of the ambient fluid in the ambient fluid chamber 310 (the positive pressure condition), and the process fluid exerts a radially inward force on the outer surfaces 204, 154 of the stationary and rotary seal rings, respectively, and the outer surface 106 of the holder assembly 100. The radially inward force exerted by the process medium assists in holding together the segments of the seal rings and the holder assembly in a fluid sealed relationship.

When the pressure of the process medium in the process fluid chamber 300 falls below the pressure of the ambient fluid in the ambient fluid chamber 310 (the negative pressure condition), the ambient fluid exerts a radially outward force on the inner surfaces 202, 152 of the stationary and rotary seal rings, respectively, and the inner surface 108 of the holder assembly 100. If the pressure differential created during this condition is such that the radially outward force is greater the radially inward force applied by the O-rings, the seal ring segments can separate, resulting in leakage across the seal faces.

To prevent leakage across the seal faces 18 and 20 in the negative pressure condition, the radially outward force on the seal rings from the ambient fluid pressure is counter balanced by the radial inward force provided by the O-rings 222, 224, and 226 on the stationary seal ring segments 200a and 200b and by O-rings 170 and 172 on the rotary seal ring segments 150a and 150b, in combination with the radially inward force exerted by the barrier fluid disposed within the chamber 185 on the outer surface 154 of the rotary seal ring segments. The radially inward fluid force $F_{rr}$ acts in combination with the radial inward force provided by O-rings 170 and 172 to maintain each of the rotary segment sealing surfaces 24 into sealing contact with the other segment during this condition, thereby maintaining a fluid-tight and pressure-tight seal.

During operation, the O-ring 172 acts a pivoting resilient member about which the rotary seal ring 16 can pivot relative to the rotary holder assembly. The pivoting action permitted by the O-ring 172 acts to maintain alignment and a sealing relationship between the rotary seal ring seal surface 18 and the stationary seal ring seal surface 20. This avoids excessive coning of the seal faces which would otherwise disposed the seal faces in contact with each other. Thus, conditions such as shaft eccentricity or shaft run-out, which can cause misalignment of the seal surfaces 18 and 20 relative to one another, can be compensated for and loss of the fluid seal between the seal surfaces inhibited. Accordingly, the pivoting action of the O-ring 172 provides for a resilient pivoting of the seal rings 18, 20 during full operation of the split mechanical seal 10 in both non-contacting and contacting face seal modes, while concomitantly ensuring either consistent contact between the opposed seal faces or maintenance of a predetermined gap size between these faces.

The closing fluid biasing system introduces a closing fluid to the outer surface 204 of the stationary seal ring segments 200a, 200b to provide a closing force on the stationary and rotary seal rings 14, 16. Specifically, closing fluid at a regulated pressure is provided to the closing fluid chamber 242 through closing fluid bore 240. The closing fluid exerts a fluid closing force $F_{fc}$ on the stationary and rotary seal ring segments. The fluid closing force $F_{fc}$ operates in combination with a mechanical spring closing force $F_{sc}$ to bias the seal faces 18 and 20 towards one another into a sealing relationship. During operation, the fluid closing force $F_{fc}$, the mechanical spring closing force $F_{sc}$ and the barrier fluid separation force $F_A$ operate to inhibit over separation of the seal surfaces 18 and 20 and the potential loss of the seal, e.g., excessive fluid leakage, between seal surfaces 18 and 20.

The fluid biasing systems employed by the mechanical seal 10 increases the flexibility of the seal and allows it to be used in multiple environments by providing a simple integrated structure, i.e., fluid conduits, for externally controlling the amount of separation of the seal faces and regulating the fluid seal formed between the seal faces. The system can operate in combination with the separation force provided by barrier fluid on the seal faces 18, 20 or independent of pressurized fluid contained within the seal 10 to adjust the degree of seal face contact. Thus, the split mechanical seal 10 can regulate or adjust the seal face separation, as well as the fluid seal formed therebetween, over a wide range of operating conditions.

As will be explained in greater detail below, the ability to regulate pressure of a fluid in the seal with respect to one another enables the fluidic feedback pressure regulation system to be fully integrated within the seal 10. The pressure regulation system can include, in one embodiment, a number of subsystems that are integrated completely and/or solely into the gland 30 of the mechanical seal. The gland 30 includes bores that are sized to hold the various subsystems and with a sufficient number of bores to provide fluid communication not only between the various subsystems of the fluidic feedback pressure regulation system, but also between the various subsystems and the various fluid biasing systems of the mechanical seal. In this way, the entire feedback pressure regulation system is generally self-contained within the seal.

The fluidic feedback pressure regulation system is dynamic in nature since it responds to changes in fluid pressure in real time. As input fluid pressure changes, the various subsystems of the regulation system responds to these changes without operator input. In addition, the fluidic feedback pressure regulation system operates continuously so long as there is fluid pressure in the fluid biasing and feedback pressure regulation systems.

The above-described mechanical seals are merely illustrative of the type of mechanical seals with which the pressure regulation feedback system can be used. FIGS. 4 through 15B illustrate yet another type of seal that the system can be employed with. Those of ordinary skill will be readily able to determine the operation of the seal without further description herein. However, a more complete description of a similar seal is described in U.S. application Ser. No. 09/005,957, filed Jan. 9, 1998, and entitled DUAL NON-CONTACTING MECHANICAL FACE SEAL HAVING CONCENTRIC SEAL FACES, the contents of which are herein incorporated by reference.

FIGS. 4 through 8 illustrate one embodiment of a fluidic feedback pressure regulation system 500 suitable for use with the mechanical seal 10. The feedback system 500 is preferably employed to regulate a system fluid based on the pressure of another system fluid. According to one practice, the system initially sets the barrier fluid pressure at a selected level relative to the process fluid pressure by a selected amount. The barrier pressure is then employed as a system output regulated fluid that operates as a system fluid sensor to either add a closing fluid to or vent the closing fluid from the seal based upon this barrier pressure. The regulated closing fluid corresponds at least to the closing fluid contained in the closing fluid biasing system discussed above. The system can include one or more subsystems, each of which performs a selected function. According to a preferred embodiment, the fluidic feedback pressure regulation system comprises three subsystems 501, 510, and 520.

Figure 4:
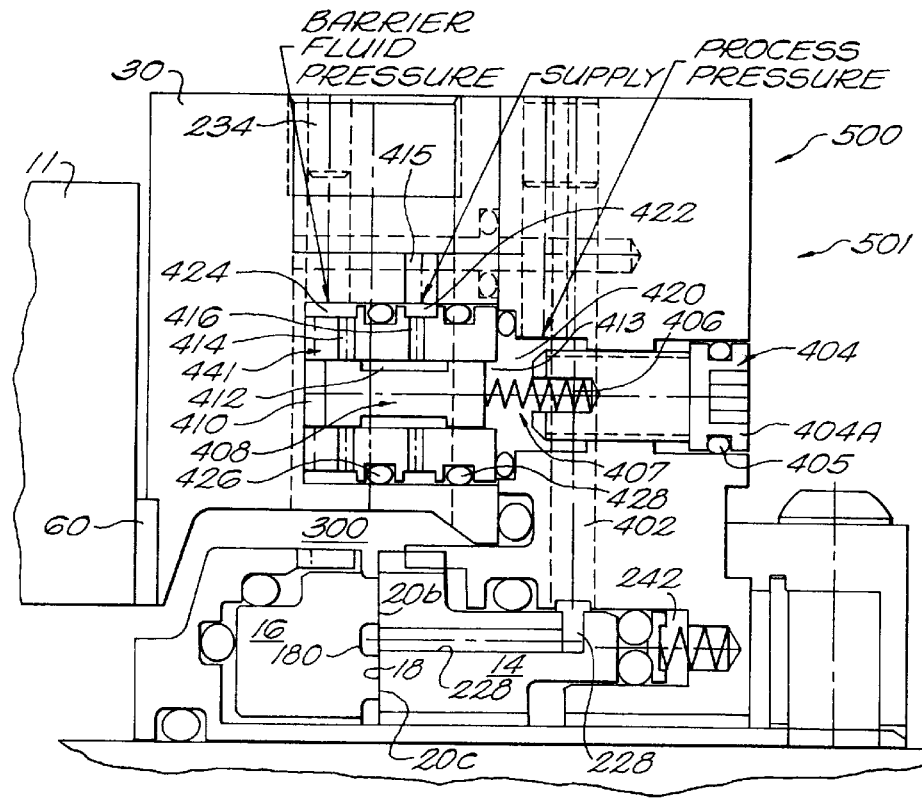
FIG. 4 is a schematic view of one of the subsystems of the fluidic feedback pressure regulation system of the invention for maintaining the barrier fluid at a selected pressure relative to the process pressure used in connection with a split seal, although other seal designs including non-split seals are contemplated by the present invention.

The illustrated feedback system 500 is preferably sized and dimensioned for mounting completely within the gland 30 of the mechanical seal. The system 500 is coupled to any suitable mechanical seal, such as seal 10 as well as other types of seals. One example of a seal to which the system can be coupled is shown in FIG. 4, and like reference numerals designate like parts throughout the different views. The stationary seal ring 14 includes axial bore 228 that communicates at one end with stationary seal face 18 and at the other end with a barrier fluid source. The rotary seal ring 16 has a pumping groove 180 formed therein and which is positioned to directly fluidly communicate with the axial bore 228. The groove and axial bore operate to channel a barrier fluid directly to the seal faces, between which a hydrodynamic lifting force is created that separates the faces to form a gap therebetween. Those of ordinary skill will also recognize that hydrostatic seal designs can also be employed with the pressure feedback system 500 of the invention.

Figure 7:
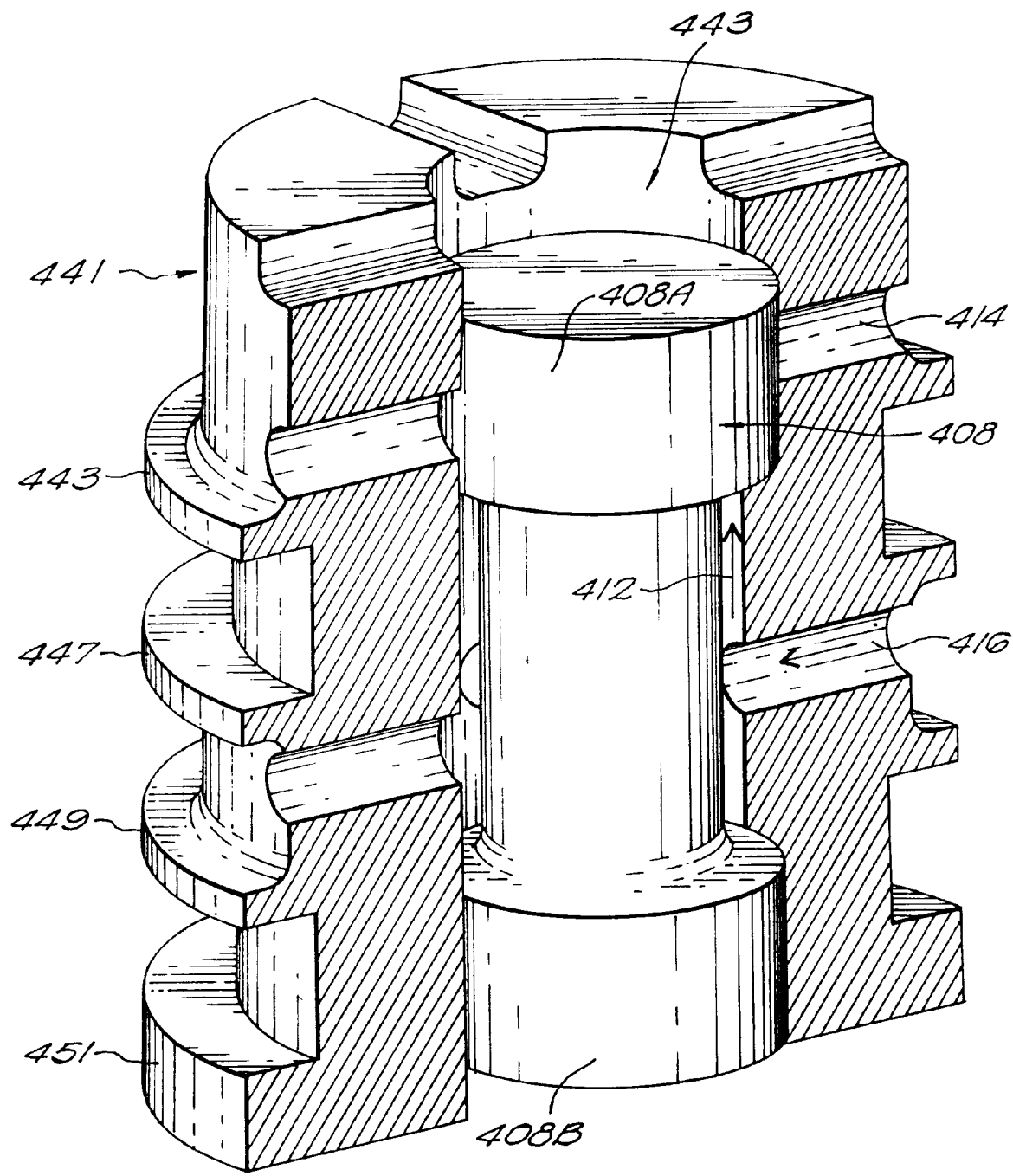
FIG. 7 is a partial cross-sectional view of the differential pressure valve of FIG. 4 disposed in a closed position.

The fluidic feedback pressure regulation system 500 includes a first subsystem 501, FIG. 4, adapted for establishing the barrier fluid pressure at a selected level relative to the process fluid pressure. The illustrated subsystem 501 includes a movable differential pressure valve 408 disposed within an appropriately sized chamber 407 formed within the gland 30. The movable valve 408 can include a number of different valves including, but not limited to, spool or shuttle valves, poppet valves, needle valves, diaphragms, bellows, and other like movable valves that are capable of conveying, transferring or being acted upon by a pressurized fluid. The chamber 407 mounts an annular fluid manifold 441 that is bored in a selected manner to allow communication between the various pressure passages and bores of the fluidic feedback pressure regulation system. The illustrated fluid manifold 441 has a central bore that seats the movable valve 408. The bore is sized slightly larger than the outermost diameter of the movable valve to allow relatively free sliding axial movement of the valve within the bore between open and closed positions, as described in further detail below. Referring to FIG. 7, the fluid manifold 441 further includes a number of radially extending fluid bores 414 and 416 to allow the manifold to selectively communicate a particular pressurized fluid to portions of the subsystem, as described in greater detail below. Sealing structures such as O-rings 426 and 428 are mounted within corresponding grooves formed by flanges 443 through 451 provided on a main cylindrical housing 455. The O-rings preferably seat in grooves formed between flanges 443–447 and 449–451, as shown, to form a pressure and fluid seal between the inner walls of the chamber 407 and selected portions of the fluid manifold 441.

The movable valve 408 divides the chamber 407 into an input fluid chamber 420 and an output fluid chamber 410, with an intermediate chamber formed between the flanged end portions 408A, 408B of the valve. The valve 408 is coupled to an adjustable spring 406, one end of which is attached to a manually adjustable screw 404. The illustrated screw 404 includes a head portion 404A which is mounted along the exposed outer portion of the gland so as to be easily accessible by a system operator. An annular O-ring 405 mounts about the head 404A in a groove to provide a fluid seal between the external environment and the chamber 407. The system operator can adjust the tension applied by the spring by turning the screw in a selected manner. The screw 404 and the spring 406 thus act in combination to define the initial or set point pressure for the illustrated pressure regulation subsystem 501. Those of ordinary skill will recognize that the spring exerts a force on the valve over a selected area corresponding to the size of the valve end. This results in an equivalent pressure. For purposes of clarity, spring pressure will primarily be used to describe the force applied by the spring on the valve. Those of ordinary skill will also realize that the illustrated adjustable screw 406 can be mounted in a limited access location along the inner axial surface of the gland to prevent or inhibit personnel from tampering with or adjusting the spring tension from a factory pre-set setting. If necessary, the system operator can adjust the spring tension by accessing and then turning the screw in a selected manner.

The screw 404 and spring 406 extend into the input fluid chamber 420 from the exterior surface of the gland 30. The input fluid chamber 420 communicates with a process fluid distribution network to allow the process fluid of the seal to communicate with the input regulation chamber 420, as designated. The process fluid distribution network of the fluidic feedback pressure regulation system 500 can include, among other structure, appropriate process fluid chambers formed within or about the mechanical seal, such as process fluid chamber 300, and an appropriate process fluid bore that communicates the process fluid from the chamber 300 to the input fluid chamber 420. One example of a suitable process fluid bore is bore 421 shown in FIG. 9A Those of ordinary skill will recognize that the process fluid distribution network can include any suitable collection of internal bores and passages formed within the gland to enable the process fluid of the housing to communicate, if desired, with the chamber 407 and thus the movable valve 408 in a selected manner. The regulation system can also employ couplings external of the gland to communicate system fluids with particular portions or components of the system 500. For example, external fluid conduits can be connected to the gland 30 to transfer the process fluid from the fluid housing to the input process fluid bore 421. In an alternate embodiment, the gland can be internally bored to allow the process fluid to communicate with the process fluid bore completely within the gland without the use of external fluid couplers.

With further reference to FIG. 4, the subsystem 501 of the fluidic feedback pressure regulation system of the invention can also include a barrier fluid distribution network that communicates barrier fluid from a high pressure barrier fluid supply (not shown) to the fluid manifold 441. The barrier fluid distribution network can include appropriate barrier fluid passages that communicate the barrier fluid from the gland chamber 407 to a separate portion of the seal, including to the barrier fluid biasing system, i.e., axial bore 228 and groove 180, to other feedback systems that can be mounted within the gland, and to other fluid passages/bores such as barrier passage 234. In particular, the barrier distribution network preferably includes any suitable and appropriate bores and/or chambers formed within the gland, such as input barrier bore 415, input barrier passage 416 formed in the manifold 441, and barrier pressure chamber 422, which are adapted to carry barrier fluid from the fluid supply to the chamber 407. In an alternate embodiment, the barrier fluid distribution network can include other components, such as the output barrier pressure conduit 234, barrier pressure chamber 424, output barrier bore 414, as well as the components of the above-described barrier fluid biasing system of the mechanical seal. For example, the barrier fluid biasing system includes at least the axial fluid bore 228 formed in the stationary seal ring and the groove 180.

With reference again to FIG. 4, the movable valve 408 further defines an intermediate chamber or channel 412 which communicates with the barrier fluid supply via the manifold input fluid supply conduit 416 and the fluid supply chamber 422. The intermediate chamber is also selectively disposed in fluid communication with the barrier fluid distribution network, such as the output barrier bore 414, barrier chamber 424, and bores 234 and 402 by the sliding movement of the valve 408.

The fluidic feedback pressure regulation system 500 of the invention is preferably completely mounted within the gland and is a purely dynamic fluid system that adjusts selected system pressures as described further below. The fluidic feedback system is thus a compact regulation system that regulates one or more system pressures while concomitantly mounting within the gland of the mechanical seal. The fluidic feedback pressure regulation system is a compact regulation system in that one or more, and preferably all, the subsystems of the regulation system are sized and dimensioned for mounting substantially solely within the gland by boring appropriately sized gland bores for seating the fluid manifold and movable valve. Other fluid conduits are provided to allow the system fluids, such as the process and barrier fluids, to communicate with the movable valve 408. The term compact is used in its regular sense in that the feedback system is small relative to the elaborate prior art arrangements, and fits within the relatively small gland of conventional mechanical seals. According to a preferred embodiment, the various subsystems 501, 510, 520 are dimensioned to be about 1 inch by about 1.5 inches for the entire subsystem, and the movable valve 408 is sized about 0.188 inch by about 0.4 inch and seats within a chamber that is dimensioned to be about 0.49 inch by about 0.345 inch.

During operation, the process fluid from the fluid housing 11 communicates with the input chamber 420 through the process fluid distribution network. According to one practice, the process fluid is directed from the process chamber 300 to the input chamber 420 through the input process pressure bore 421 and any other appropriately formed passageway within the seal and/or gland that enables the process fluid to enter the input chamber 420. The process fluid is at a given operating pressure.

The process fluid in the input fluid chamber 420 exerts a pressure on the input or outboard side, e.g., the right side in FIG. 4, of the movable valve 408. In addition, the adjustable spring 406 exerts a pressure on the movable valve 408. The combination of these two forces or pressures forms the input pressure, which exerts an initial input axial force that biases the movable valve 408 towards the inboard side of the seal, e.g., to the left, and thus between the closed and open positions.

Figure 8:
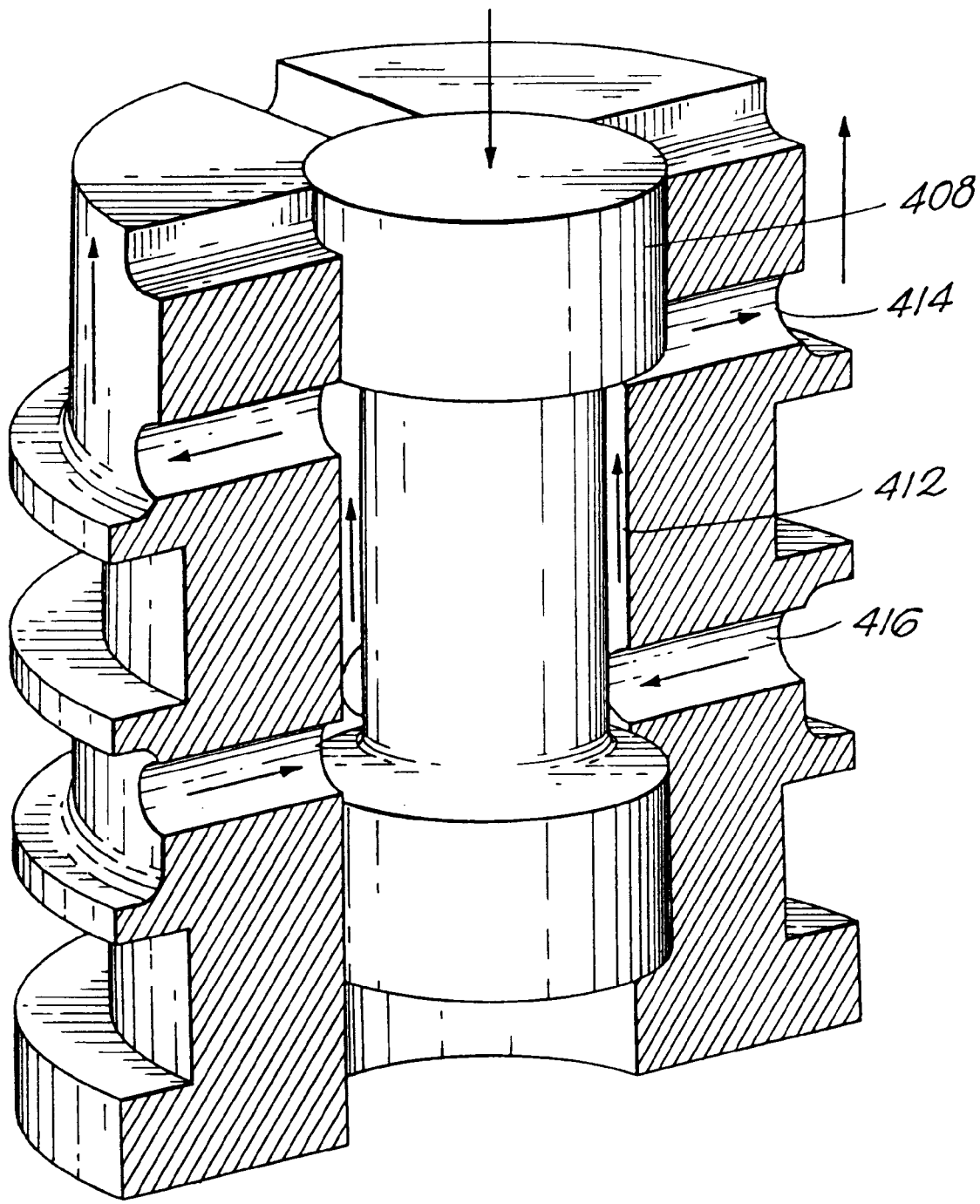
FIG. 8 is a partial cross sectional view of the gland housing mounting the differential pressure valve of FIG. 4 disposed in an open position to connect the fluid distribution network to the fluid supply.

With further reference to FIGS. 4, 7 and 8, the barrier fluid from the barrier fluid source (not shown) is introduced to the regulation subsystem 501 and to the mechanical seal by the barrier fluid distribution network. According to one practice, the barrier fluid from the barrier fluid source is selectively introduced through the input supply bore 415 and input supply chamber 422 to the input barrier bore 416, and into the intermediate chamber 412. This is illustrated in FIGS. 7 and 8 by the solid arrows. The barrier fluid is then selectively introduced to the output chamber 410 through the barrier fluid distribution network by selectively biasing the movable valve 408 between closed and open positions, as illustrated in FIGS. 7 and 8, respectively. The valve is illustrated in the closed position in FIG. 4. Specifically, the valve 408 is positioned so as to occlude the output barrier fluid conduit 414 and thus disconnecting the output barrier bore 234 from the barrier fluid supply.

Figure 5:
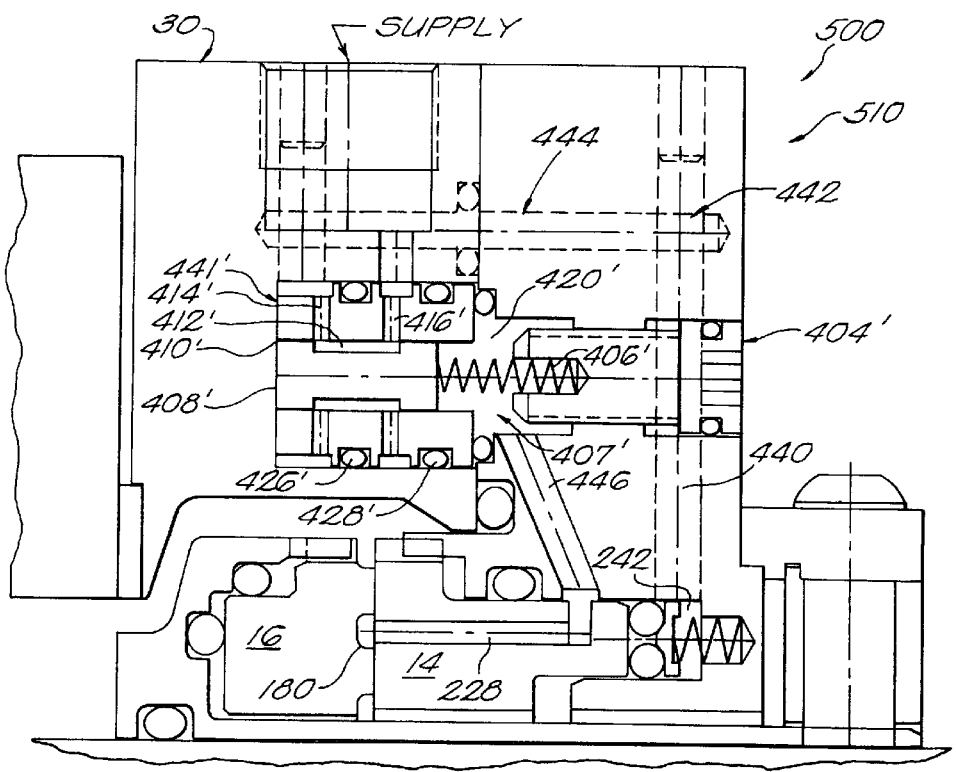
FIG. 5 is a schematic view of another subsystem of the pressure fluidic feedback system of the invention showing a differential pressure valve selectively connecting a closing force fluid distribution network to the fluid supply.

When the valve is disposed in the open position and barrier fluid enters the output chamber 410, the barrier fluid exerts an opposite or axially outward pressure against the left side of the differential pressure valve 408 to form an output pressure. As shown in FIGS. 5 and 8, when the output pressure exerted by the barrier fluid in the output chamber 410 is less than the sum of the process fluid pressure and the adjustable spring pressure in the input chamber 420, the differential pressure valve 408 moves to the left into an open position, FIG. 8. This enables the intermediate chamber 412 to communicate with the output barrier bore 414 to provide a fluid pathway from the barrier fluid supply through the fluid supply conduit 416 to the output fluid conduit 414. The barrier fluid then passes through the output barrier passage 234 to the remainder of the barrier fluid distribution network.

FIGS. 7 and 8 show the differential pressure valve 408 in a partial cross-sectional perspective view. FIG. 7 shows the differential pressure valve in a neutral or closed position to inhibit or prevent barrier fluid from flowing directly from the barrier fluid supply to the output barrier passage 234. FIG. 8 shows the differential pressure valve 408 in the operative or open position where the arrows show the flow of barrier fluid from the fluid supply passage 415, through input barrier bore 412 and out through output barrier fluid bore 414.

As the barrier fluid distribution network fills with barrier fluid from the supply source, the barrier fluid pressure in the output fluid chamber 410 increases until the pressure equals or exceeds the sum of the pressures exerted by the process fluid and the adjustable spring 404. When this occurs, the valve 408 is biased into the illustrated closed position to disconnect the barrier fluid supply from the output barrier fluid chamber 424 and barrier fluid bore 234. The barrier fluid within the fluidic feedback pressure regulation system is thus pressurized to a level equal to about the sum of the pressures exerted by the process pressure and the variable pressure of the spring 406. Those of ordinary skill will readily recognize that other pressure arrangements can be used including pressurizing the barrier fluid distribution network to a pressure less than the process fluid pressure and/or spring pressure.

The fluidic pressure feedback system 500 can further include subsystems for introducing a closing fluid to or venting a closing fluid from a closing fluid distribution network. These subsystem include most of the same components as the illustrated subsystem 501, except for the process fluid bore 421 and the barrier fluid bore 415. The three subsystems can thus be utilized together or in any combination to control a particular fluid pressure that acts upon, either directly or indirectly, the seal faces 18 and 20.

FIG. 5 shows a second pressure subsystem 510 of the fluidic feedback pressure regulation system 500 of the present invention. Like numbers represent like elements throughout the Figure plus a superscript prime. The illustrated subsystem 510 selectively connects a closing fluid supply (not shown) to the closing force biasing system of the seal. The biasing system applies a closing force to the backside of the stationary seal as a function of the pressure within the barrier fluid distribution network and/or the barrier fluid biasing system, e.g., the axial bore 228 and groove 180. The illustrated subsystem 510 includes a movable differential pressure valve 408' disposed within an appropriately sized chamber 407' formed within the gland 30. The chamber 407' mounts an annular fluid manifold 441' that is bored in a selected manner to allow communication between the pressure passages and bores of the pressure regulation subsystem 510.

The illustrated fluid manifold 441' is configured identical to that described above in relation to FIGS. 4, 7 and 8. O-rings 426' and 428' are mounted within corresponding grooves formed in the outer surface of the manifold to form a pressure and fluid seal between the inner walls of the chamber 407' and selected portions of the fluid manifold 441'.

The movable valve 408' divides the chamber 407' into an input fluid chamber 420' and an output fluid chamber 410', with an intermediate chamber 412' formed between the flanged end portions of the valve. The valve 408' is coupled to an adjustable spring 406', one end of which is attached to a manually adjustable screw 404'. The illustrated screw 404' and spring 406' are identical to those described above in relation to FIG. 4. The screw 404' and spring 406' extend into the input fluid chamber 420' from the exterior surface of the gland 30. The input fluid chamber 420' communicates with selected components of the barrier fluid distribution network to allow the barrier fluid of the seal to communicate with the input regulation chamber 420'.

In this subsystem, the barrier fluid distribution network includes any appropriate bores and/or chambers formed within the gland, and preferably includes at least the input chamber 420', the barrier connecting passage 446, and the barrier fluid biasing system. The illustrated subsystem 510 further includes a closing fluid distribution network that connects a source of closing fluid, which can be a barrier or closing fluid, or some other fluid, to the stationary seal ring 14. The closing fluid distribution system exerts a closing axial biasing force on the stationary seal ring to adjust or regulate the separation between the stationary and rotary seal rings 14 and 16. The closing force distribution network can include any suitable arrangement and number of fluid conduits and bores that introduces the closing fluid to at least one of the seal rings to adjust the separation therebetween. In particular, the illustrated network can include one or more of the input closing force passage 460, the input closing fluid bore 416', the intermediate chamber 412', the output closing fluid bore 414', the transverse closing force bore 444, the closing force passage connector 442, the closing force passage 440, and the closing force chamber 242.

With reference again to FIG. 5, the movable valve 408' is alternately disposable between open and closed positions by the fluids within the input and output chambers 420' and 410'. For example, upon operation of the seal, the barrier fluid is pressurized from the previous subsystem 501 and fills the input chamber 420' through any appropriately formed bore within the gland. The barrier fluid in combination with the spring 406' exert a pressure on one side of the movable valve 408' to force the valve into one of the positions, e.g., either to the inboard or outboard side of the seal. This force is offset by the pressure exerted by the closing fluid introduced to the output chamber 410' when the valve is disposed in the open position, as shown.

When the pressure within the input chamber 420' exceeds the pressure within the output chamber 410', the pressure differential biases the valve 408' to the left into the illustrated open position. The closing fluid from the supply passes through the closing fluid input passage 460 and input closing fluid bore 416' and into the intermediate chamber 412', and eventually into the output chamber 410'. From there, the closing fluid passes through the output closing fluid bore 414' into the transverse passage 444, the passage junction 442, and into the closing fluid output passage 440 and the closing fluid chamber 242. The closing fluid chamber is disposed on the backside of the stationary seal ring 14 to act upon the stationary seal ring in a selected manner.

During operation, the barrier fluid distribution network fills with pressurized barrier fluid, such as from the subsystem 501. The barrier fluid in the input fluid chamber 420' and the adjustable spring 406' exert a pressure on the right side of the differential pressure valve 408'. The sum of these two pressures acts upon one side, e.g., the right side, of the differential pressure valve 408' to provide the input pressure to the differential pressure valve 408' and hence move the valve from the closed position into the open position. When disposed in this position, the movable valve 408' fluidly connects the closing fluid supply with the intermediate chamber 412' and the closing force output bore 414'. This closing fluid is conveyed through the closing fluid distribution network to the closing fluid chamber 242.

Concomitantly, the closing fluid in the intermediate chamber 412' fills the output closing fluid chamber 410' and exerts a pressure against the other side, e.g., the left side, of the movable valve 408. The force applied by the closing force counteracts the forces applied by the barrier fluid and the spring 406', and when closely matched, biases the movable valve 408 into the closed position, thereby disconnecting the closing fluid supply from the intermediate chamber 412'. Specifically, the flanged end of the valve 408' is positioned by the subsystem 510 to occlude the output closing fluid bore 414' thereby preventing or inhibiting the passage of closing fluid from the intermediate chamber 412' to the transverse passage 444. Consequently, the illustrated subsystem 510 establishes a closing fluid pressure or force at the backside of the stationary seal ring and within the output chamber 410 that is a function of the combined spring and barrier fluid pressures.

The foregoing closing fluid subsystem 510 is preferably employed to adjust, i.e., increase, the closing fluid pressure as a function of the barrier fluid pressure. The fluidic feedback pressure regulation system 500 thereby regulates the gap thickness and therefore leakage at the seal faces based on the regulated closing fluid pressure. This subsystem can be used in connection with the first subsystem 501 to form a fluidic, dynamic pressure regulating system that regulates the closing force pressure as a function of the barrier fluid pressure. The initial subsystem sets the barrier fluid pressure at a selected level dependent upon the process pressure and the spring pressure, which is manually adjustable, and this subsystem adjusts the closing fluid pressure to regulate leakage at the seal faces.

The disposition of the movable valve 408' between the open and closed positions as described above is identical to the movement of the valve between positions as illustrated in FIGS. 7 and 8. FIG. 8 shows the movable valve 408 disposed in the open position and the solid arrows identify the fluid flowing into the fluid supply conduit 416, through the valve channel 412 and out through the output fluid conduit 414. As the closing fluid distribution network houses more fluid, the closing fluid increases in the output fluid chamber 410' thereby increasing the pressure in that chamber. When the closing fluid pressure generally equals the sum of the barrier fluid pressure and the pressure of the adjustable spring 406', the differential pressure valve moves to the right, to the closed position, to discontinue fluid communication between the closing fluid supply and the closing fluid distribution system. FIG. 7 shows the movable valve 408 in a closed position to inhibit or prevent fluid flow between the fluid supply conduit 416 and the output fluid conduit 414.

Figure 6A:
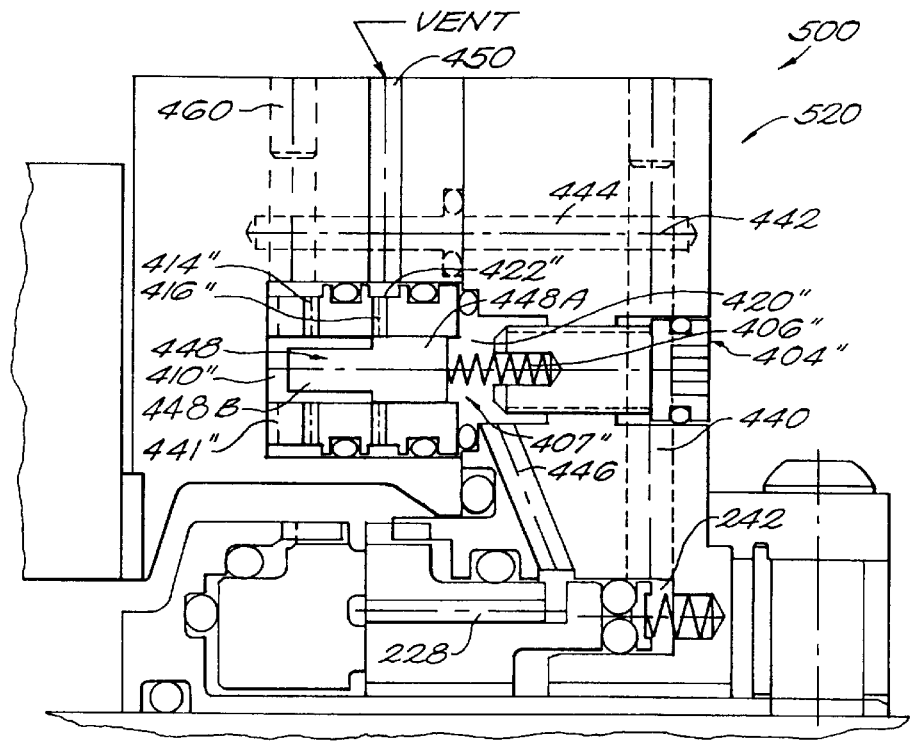
FIG. 6A is a schematic view of another embodiment of the pressure fluidic feedback system of the invention for maintaining the closing force fluid at a selected pressure relative to the barrier fluid pressure by lowering the closing force fluid pressure by way of an exhaust vent.
Figure 6B:
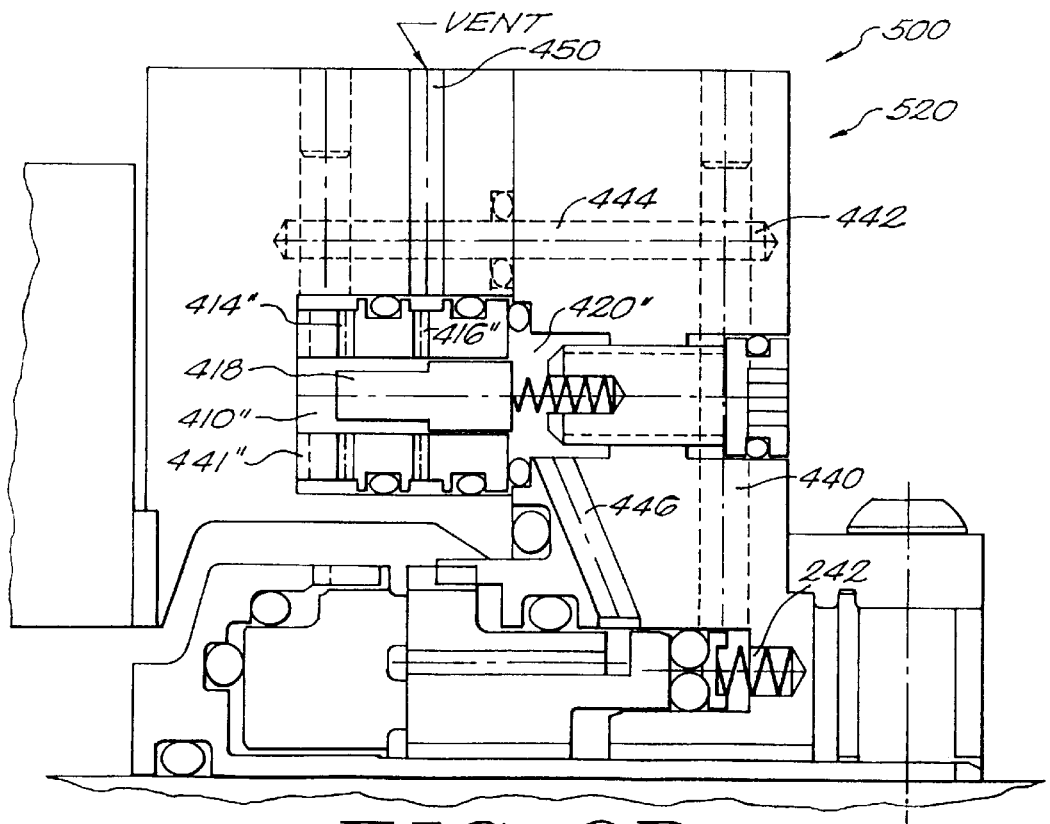
FIG. 6B is a schematic view of another embodiment of the pressure fluidic feedback system of the invention showing the differential pressure valve connecting the closing force fluid distribution network to the exhaust vent.

With reference to FIGS. 6A and 6B, the fluidic feedback pressure regulation system 500 can further include a venting subsystem 520 adapted to vent closing fluid pressure from the regulation system as a function of the barrier fluid pressure. Like reference numerals correspond to like parts throughout the Figures plus a superscript double prime. Similar to above, the illustrated subsystem 520 includes a movable valve 448 sized for mounting within the gland chamber 407". The chamber mounts an annular fluid manifold 441" that is bored in a selected manner to allow communication between the pressure passages and bores of the fluidic feedback pressure regulation system and the mechanical seal. The movable valve 448 is a substantially T-shaped valve with the larger diameter portion 448A of the valve being disposed adjacent the input fluid chamber 420" and the smaller diameter portion 448B extending into the output chamber 410". The valve 448 is coupled to an adjustable spring 406", one end of which is attached to a manually adjustable screw 404". The illustrated screw 404" and spring 406" are identical to those described above in relation to FIGS. 4 and 5. The screw 404" and the spring 406" extend into the input barrier fluid chamber 420" from the exterior surface of the gland 30.

The illustrated subsystem 520 also includes the barrier fluid distribution network which communicates with the input chamber 420", and the closing fluid distribution network which is disposed in fluid communication with the output fluid chamber 410". The barrier fluid distribution network and the closing fluid distribution network operates in a manner similar to that described in relation to FIG. 5. The closing fluid distribution network further includes a vent passage 450 that is disposed in fluid communication with the fluid chamber 422" and the output conduit 416". The vent aperture allows the illustrated feedback subsystem 520 to vent closing fluid pressure there from the as a function of barrier fluid pressure.

The illustrated movable valve 448 is alternately disposable between open and closed positions by the barrier fluid within the input chamber 420" and the closing fluid within the output chamber 410". For example, upon operation of the seal, the barrier fluid is pressurized by the first subsystem 501 and fills the input barrier chamber 420". The barrier fluid and the spring 406" exert a pressure on one side of the movable valve 448 to force the valve in a particular direction, e.g., either to the inboard or outboard side of the seal, and hence between open and closed positions. The sum of these two pressures forms the input pressure on the valve 448. Concomitantly, the closing fluid distribution network houses closing fluid at a given pressure. The closing fluid from the closing fluid supply enters the output closing fluid chamber 410" and exerts a pressure on the other side, e.g., the left side, of the valve 448 to form the output pressure on the valve 448. When the pressure of the closing fluid is less than the pressure of the barrier fluid in the input fluid chamber 410", the input pressure biases the movable valve into the closed position, as shown. This pressure arrangement maintains the axial biasing force on the stationary seal ring. Consequently, the regulation system does not reduce the amount of closing force pressure by venting it through the vent passage 450.

When the pressure exerted by the closing fluid in the output chamber 410" is greater than the input pressure, the pressure differential biases the valve 448 into the open position, FIG. 6B. This connects the closing force fluid distribution system with the venting passage 450 to vent closing fluid from the system. Specifically, the subsystem 520 transfers the closing fluid disposed in the closing fluid chamber 242, closing fluid passage 440, transverse passage 444, and input bore 414" to the output chamber 410". From there, the closing fluid is conveyed from the output closing fluid bore 416" to the vent passage 450. The placement of the movable valve 448 into the open position allows the closing fluid housed within the output chamber 410" to pass through the venting passage 450.

As the system 520 removes closing fluid from the seal, the closing fluid pressure within the output chamber 410" decreases until it generally equals the sum of the barrier fluid pressure and the adjustable spring pressure. When this occurs, the system pressures biases the movable valve 448 back into the closed position to discontinue fluid communication between the vent passage 450 and the remainder of the closing fluid distribution network.

The venting of closing fluid from the feedback system 520 enables the overall fluidic feedback pressure regulation system 500 to adjust the separation between the seal faces 18, 20 to control seal leakage. In particular, the system responds to a decrease in process pressure by decreasing or venting closing fluid from the system. This decreased closing fluid pressure allows the seal faces to separate thereby avoiding unwanted seal face contact.

The foregoing subsystems 501, 510, and 520 are preferably utilized together and mounted within the gland 30 of the mechanical seal. In combination, the subsystems form a completely fluidic pressure feedback system that regulates one or more pressures of the mechanical seal as a function of one or more other seal pressures. According to a preferred practice, the subsystems 501, 510 and 520 constitute nearly the entire fluidic feedback pressure regulating system 500 of the present invention.

The fluidic feedback pressure regulation system 500 functions as a differential pressure regulator. The general logic of the system is that as pressure conditions change within the mechanical seal, the system regulates either or both of the closing pressure and the pressure of the barrier fluid supplied to the seal to maintain certain conditions at the seal faces of the seal rings. The fluidic regulating system employs one of the system fluids, such as barrier, process or closing fluid, as a dynamic feedback fluid input and regulates either the barrier fluid pressure or closing force based on this regulated input. In doing this, the feedback system senses a change in pressure between selected fluid pressures and corrects any imbalance. The fluidic feedback system accomplishes this correction by connecting the system to a high pressure fluid supply to add closing fluid to the system to raise the pressure therein or to vent closing fluid pressure from the system when internal pressures are above or below a selected level. The feedback system further has the ability to regulate or adjust the barrier or closing fluid to an arbitrary set point which is higher or lower than the regulated pressure input.

As shown in FIGS. 4 through 8, the feedback system 500 employs the process fluid pressure as the dynamic feedback input while maintaining the barrier pressure at a pressure greater than the process fluid pressure. The process fluid is housed, in addition to other locations, in the process fluid chamber 300 disposed along the outer diameters of the seal rings of the mechanical seal. The process fluid communicates with the input feedback chamber 420 of the feedback system through appropriate process fluid bores formed in the gland. The process fluid in combination with the spring 406 mounted within the chamber 420 establishes a pressure at one side of the movable valve 408. The barrier fluid supply is introduced through barrier fluid input passage 415 to the intermediate chamber 412, as previously described. The force applied by the process fluid and spring 406 within the input chamber 420 is counterbalanced by the barrier fluid pressure within the output chamber 410 on the opposite side of the valve 408. Consequently, the feedback system raises the barrier fluid pressure (e.g., regulated output) in the barrier fluid chamber 424 of the barrier fluid distribution network to a pressure above that of the process pressure by an amount corresponding to the adjustable force of the spring 406.

When changes in the pressure applied by the process fluid and the spring occur, for example, when the pressure applied by the process fluid pressure and spring is greater than the barrier fluid pressure, the valve is biased to a selected position to connect an input barrier fluid supply with the barrier fluid distribution network. The barrier fluid then flows into the barrier fluid distribution network to pressurize the output chamber 410. As the barrier fluid distribution network become sufficiently pressurized, the barrier fluid fills the chamber 410 and offsets or counteracts the combined forces applied by the process pressure and the spring 406 formed in the input chamber 420.

As the barrier fluid fills the output chamber 410, the pressure on the barrier fluid side of the movable valve (e.g., on the left) increases until the barrier fluid pressure sufficiently moves the valve to the right to an intermediate closed position, as illustrated, to disconnect the supply of barrier fluid to the system.

The barrier fluid introduced to the mechanical seal from the barrier fluid supply is conveyed to the axial bore 228 and radial groove 180. The barrier feedback passageway 446, FIG. 5, connects the axial bore 228 and groove 180 with the input feedback chamber 420'. The barrier fluid is hence utilized as the pressure feedback input and the closing fluid of the closing fluid network is the regulated feedback output, and is regulated to a pressure greater than the barrier fluid pressure by a selected amount corresponding to the force applied by the spring 406'. The spring 406' thus adds a selected level of pressure to the input feedback side (e.g., chamber 420') of the fluidic feedback pressure regulation system. The closing fluid pressure is then either increased, by adding additional closing fluid, or decreased by venting closing fluid from the closing fluid distribution network.

The amount of seal leakage is related to regulation of particular seal fluids in the following manner. An increase in process fluid pressure increases the amount of barrier fluid introduced to the seal. The increased barrier fluid pressurizes the barrier fluid distribution network so that the seal faces are separated further, thereby increasing seal face leakage. In response to this, the fluidic feedback pressure regulation system increases the amount of closing fluid introduced to pressurize the closing fluid network. This corresponds to an increase in closing fluid pressure in the closing fluid chamber 242, thus biasing the seal faces towards each other to decreases the amount of seal leakage.

Conversely, when the process fluid pressure decreases, the introduction of barrier fluid to the seal is terminated. The decreased amount of barrier fluid is manifested by the seal faces of the seal rings being biased closer together, which can result in face seal contact. The system automatically and fluidly compensates for this by connecting the closing fluid distribution network to a vent to release a selected amount of closing fluid pressure from the system. The reduction in closing fluid pressure in the closing fluid chamber 242 allows the seal faces to separate a selected amount to inhibit face seal contact.

Furthermore, those of ordinary skill will recognize that the subsystem 501 of FIG. 4 establishes a set or reference pressure level for the barrier fluid that is a combination of the process fluid pressure and the force applied by spring 406. The adjustable screw 404 adjusts the tension of the spring 406, thereby adjusting the reference pressure point of the barrier fluid. This system thereby allows appropriate service personnel to change selected system parameters in real time and on-the-fly.

Figure 11:
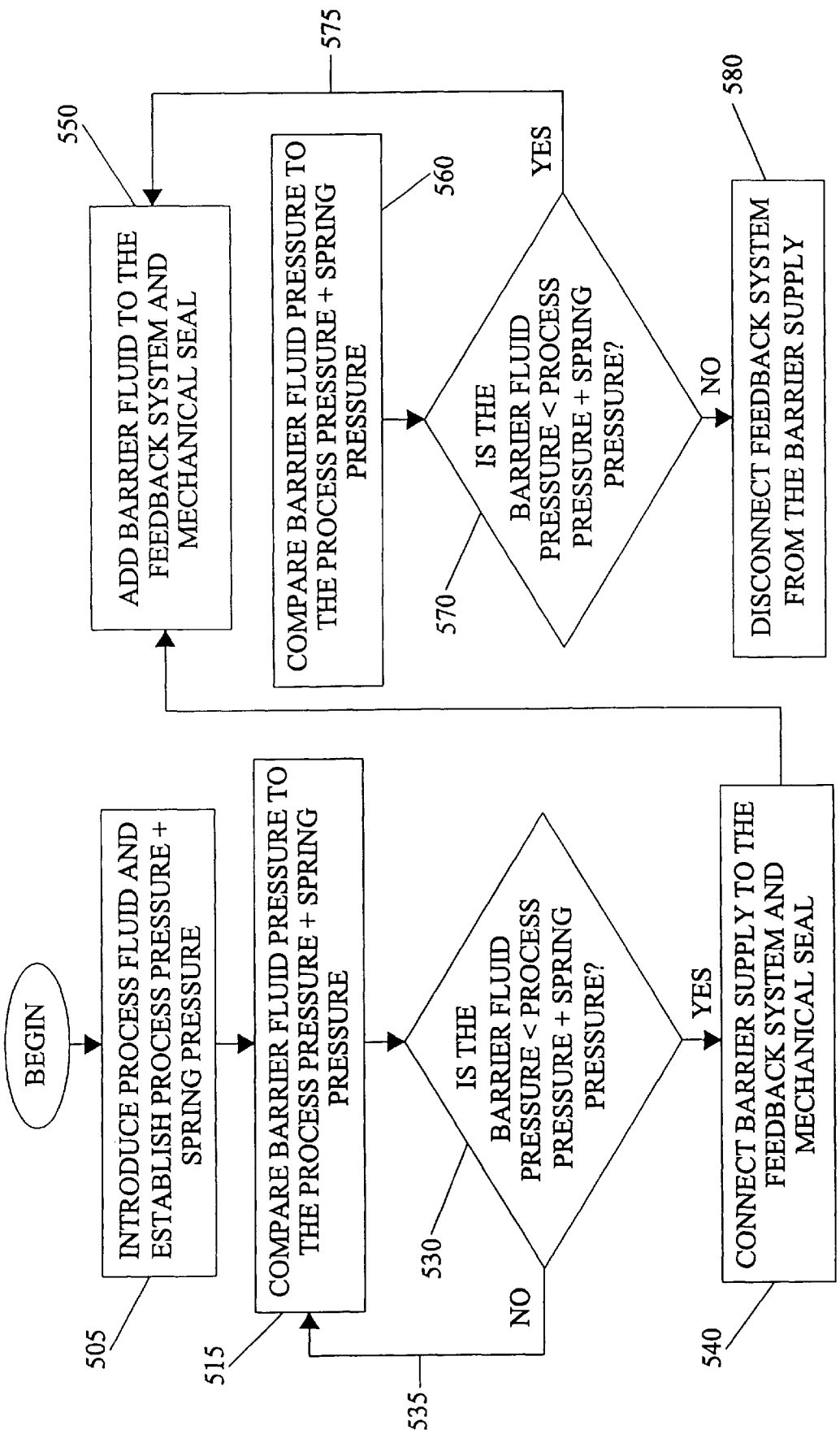
FIG. 11 is a schematic flow chart diagram of the method for maintaining the barrier fluid at a selected pressure relative to the process fluid.
Figure 12:
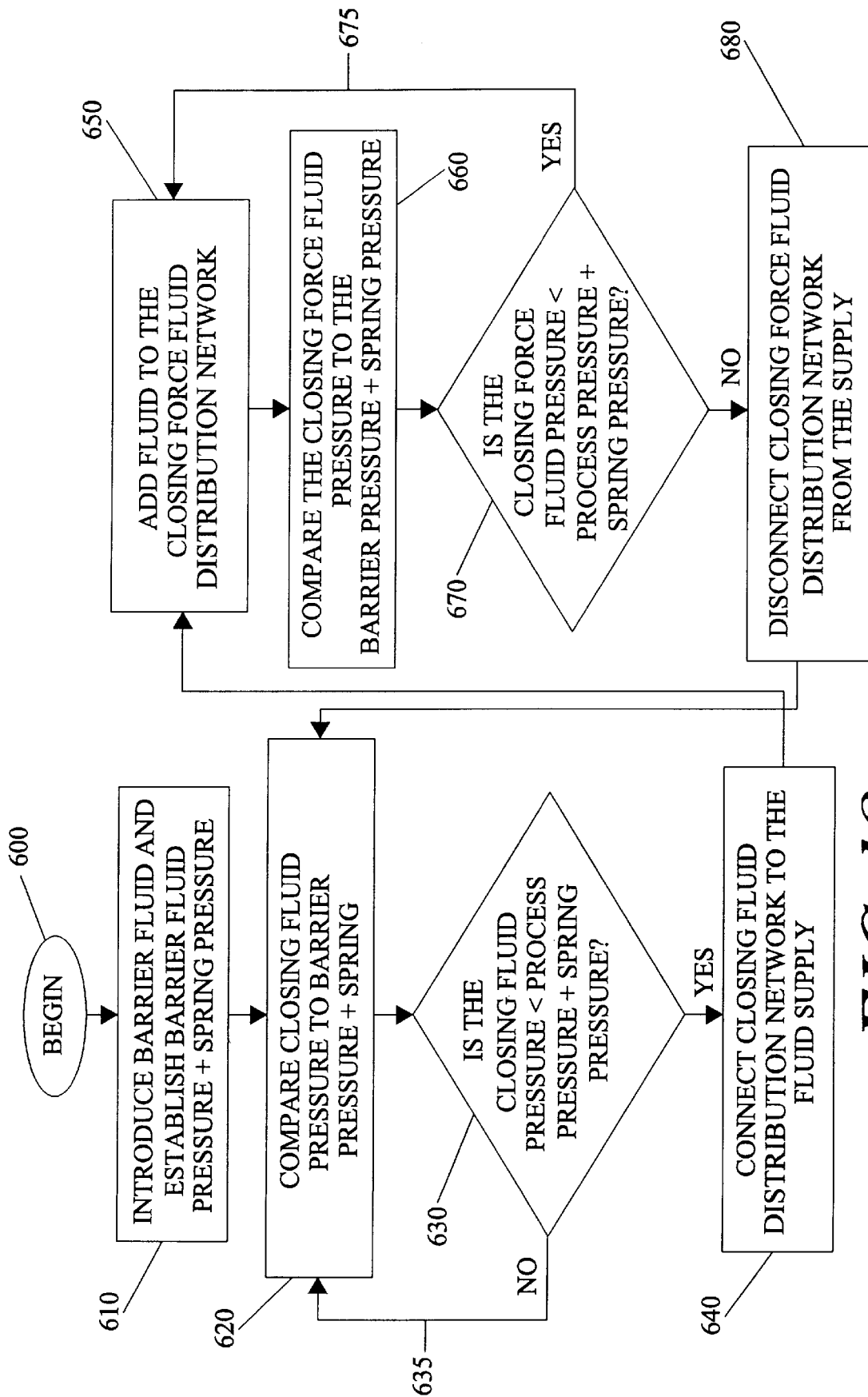
FIG. 12 is a schematic flow chart diagram of the method for maintaining the closing force fluid pressure at a selected pressure relative to the barrier fluid pressure by increasing the closing force fluid pressure.
Figure 13:
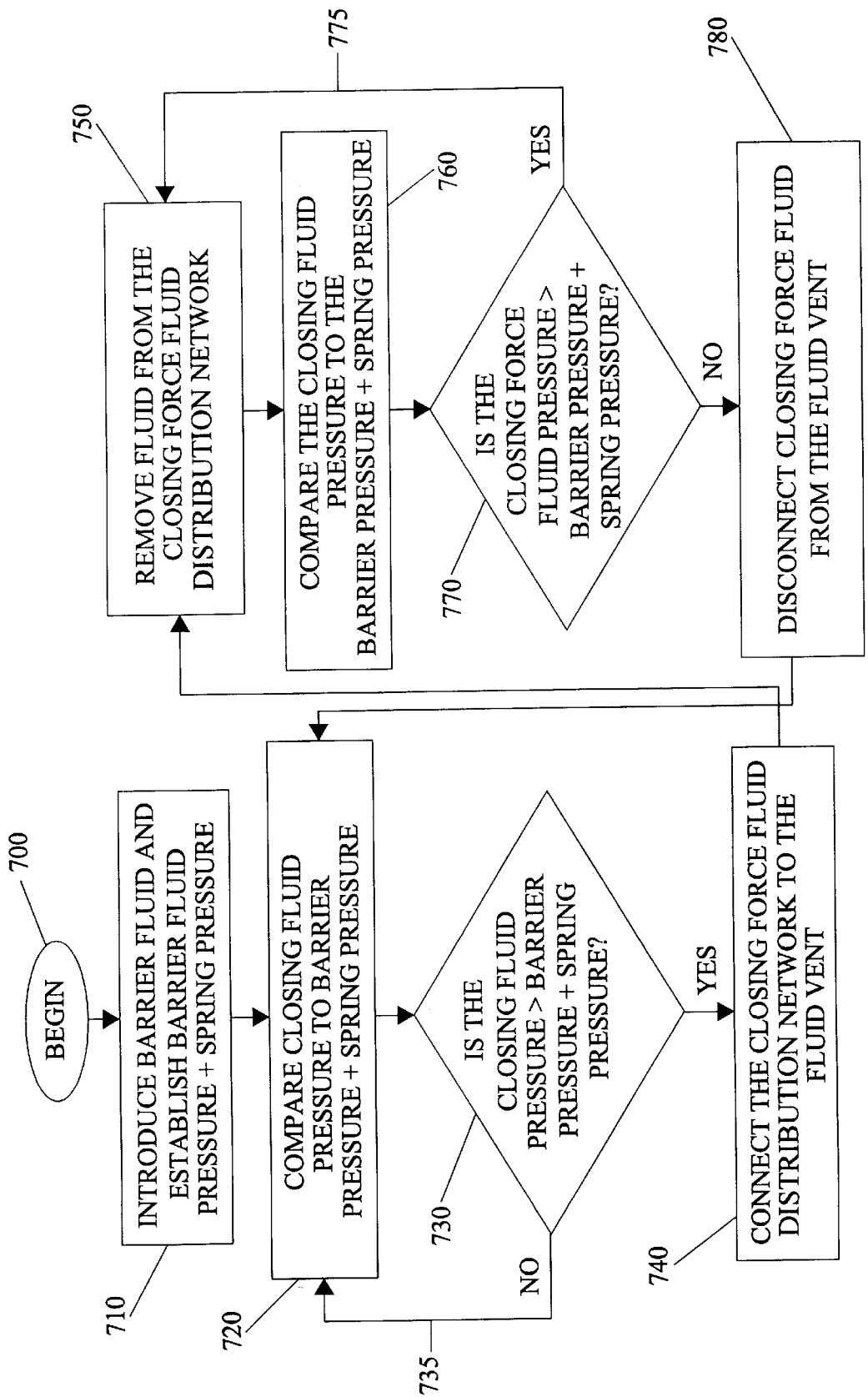
FIG. 13 is a schematic flow chart diagram of the method for maintaining the closing force fluid pressure at a selected pressure relative to the barrier fluid pressure by decreasing the closing force fluid pressure.

FIGS. 11 through 13 are schematic flow chart diagrams illustrating the operation methodology of the fluidic feedback pressure regulation system 500 of the invention, as depicted by subsystems 501, 510 and 520. FIG. 11 describes the method of setting the barrier fluid pressure to a level relative to the process pressure, as shown by the subsystem 501 of FIG. 4; FIG. 12 describes the method of introducing closing fluid to the system as a function of barrier fluid pressure; and FIG. 13 describes the method of venting closing fluid from the system as a function of barrier fluid pressure. The three processes described in these Figures are all continuous processes and can be performed in parallel, contemporaneously or simultaneously with each other.

In step 505, the process fluid is introduced from the fluid housing to the input chamber 420 via the process fluid input passage. The process fluid establishes a process fluid pressure within the input chamber 420. This pressure in combination with the force or pressure generated by the adjustable spring 406 defines the input pressure of the subsystem. The barrier fluid source introduces barrier fluid to the regulation system through the barrier fluid passage 415, for subsequent transfer to the barrier fluid distribution network, including the bore 228 and the groove 180. The output chamber 410 eventually fills with barrier fluid to counterbalance, at least in part, the combined pressure of the spring and process fluid.

In step 515, the pressure in the input chamber 420 is compared to the barrier fluid pressure in the output fluid chamber 410. If the barrier fluid pressure is below the sum of the process fluid pressure and the adjustable spring 406 pressure, then the movable valve 408 is disposed in the open position to connect the barrier fluid distribution network to a barrier fluid supply, as shown in steps 530 and 540. The barrier source introduces fluid to the barrier fluid distribution network, as described in step 550. If the barrier fluid is not sufficiently less than the process pressure and spring force to move the valve appreciably, the valve is maintained in the closed position. This is illustrated by the feedback loop 535.

In step 560, the barrier fluid pressure in the output chamber 410 is again compared to the sum of the process fluid pressure and the adjustable spring pressure. In step 570, if the barrier fluid pressure is below the sum of the process fluid pressure and the adjustable spring 406 pressure, the movable valve 408 is maintained in the open positioned to connect the barrier fluid distribution network to the barrier fluid supply, as illustrated by the feedback loop 575. As set forth in step 580, if the barrier fluid pressure is greater than the sum of the process fluid pressure and the adjustable spring pressure, then the movable valve 408 is moved to the closed position to disconnect the barrier fluid distribution network from the barrier fluid supply.

An increase in process fluid pressure results an increase in barrier fluid pressure, which is indicative of the seal faces of the seal rings being forced apart and can result in excessive seal leakage. The fluidic feedback pressure regulating system compensates for this condition by increasing the closing fluid pressure in the system. Conversely, if the barrier fluid pressure decreases, which is indicative of the relative close position of the seal faces to each other, the pressure regulation system decreases the closing fluid pressure to allow the seal faces to separate a selected amount.

With particular reference to FIGS. 5 through 6B, an increase in barrier fluid pressure pressurizes the input chamber 420', FIG. 5, and connects the closing fluid distribution network with the closing fluid supply. The supply pressurizes the closing fluid network and transfers closing fluid to the backside of the stationary seal ring by way of the closing fluid bores 414' and 416' and the intermediate chamber 416', the transverse passage 444, the passage junction 442, the radial closing fluid passage 440 and the closing fluid chamber 242. The increased closing fluid pressure counteracts the increased barrier fluid pressure and therefore operates to minimize leakage at the seal face.

FIG. 12 describes the method of setting the closing fluid pressure to a level relative to the barrier fluid pressure. In steps 600 and 610, the barrier fluid is introduced into the barrier fluid distribution network, including the bore 228 and groove 180 as well as the input fluid chamber 420, to establish a barrier fluid pressure in the input fluid chamber 420. This pressure plus the pressure of adjustable spring 406 defines the input pressure of the subsystem. The closing force fluid is introduced into the closing force fluid distribution network, including closing fluid chamber 242 and closing fluid passage 440, to create the output pressure in the output chamber 410.

In step 620, the input pressure in input chamber 420 is compared to the output pressure in the output fluid chamber 410. In step 630, if the output or barrier fluid pressure (which corresponds to a change in process fluid pressure) falls below the input pressure, which may be indicative of excessive or undesired seal leakage, then in step 640, the movable valve 408' is disposed in the open position to connect the closing force fluid distribution network to the closing fluid supply introduced to the input passage 460. Specifically, the closing fluid from the closing fluid source passes through the input closing fluid passage 460, into the input closing fluid bore 416', and into the intermediate chamber 412'. The closing fluid then passes from this chamber through the output closing fluid bore 414', the transverse passage 444, the junction 442, and the closing fluid output passage 440 to the closing fluid chamber 242 surrounding the illustrated secondary sealing structure. The additional closing fluid introduced to the closing force side of the seal increases the pressure within the closing fluid chamber 242, and axially biases the stator towards the rotor. This is illustrated in steps 640 and 650. Conversely, as shown by feedback loop 635, if the output pressure (i.e., the closing fluid pressure) is not less than the input pressure (i.e., the barrier pressure) then the valve is disposed or maintained in the closed position.

As shown in steps 660, 670 and 675, the output pressure in the output chamber 410' is again compared to the input pressure, and if the closing force fluid pressure is below the sum of the barrier fluid pressure and the adjustable spring 406 pressure, closing fluid is added to the closing fluid distribution network by the closing fluid supply. If the output closing fluid pressure is greater than the input pressure, then the movable valve 408' is positioned to disconnect the closing fluid distribution network from the closing fluid supply. Thus, in this illustrated embodiment, when the barrier fluid pressure increases, the closing fluid pressure increases.

FIG. 13 also describes the method of setting the closing fluid pressure to a level relative to the barrier fluid pressure, and in particular, vents closing fluid from the regulation system 500 as a function of barrier fluid pressure. This flow chart methodology corresponds, at least in part, to the subsystem 520 illustrated in FIGS. 6A and 6B. In steps 700 and 710, the barrier fluid is introduced into the barrier fluid distribution network to establish a barrier fluid pressure within the input fluid chamber 420". This pressure operates in combination with the pressure of adjustable spring 406" to define the input pressure of the subsystem 520. The closing fluid is introduced into the closing fluid distribution network, as described above, to create the output pressure in the output chamber 410".

In steps 720 and 730, the pressure in input chamber 420' is compared to the pressure in the output fluid chamber 410". In feedback step 735, if the output pressure is less than the input pressure which is the barrier fluid pressure plus the adjustable spring 406" pressure, the movable valve 448 is disposed or maintained in the closed position, FIG. 6A, to prevent the closing fluid distribution network from purging closing fluid from the regulation system 500. If the output pressure is greater than the input pressure, then in step 740, the movable valve is disposed in the open position to connect the closing fluid distribution network to the fluid exhaust vent 450. The vent removes closing fluid from the closing fluid distribution network, as described in step 750. In step 760, the output pressure in the output chamber 410" is again compared to the input pressure which is the sum of the process fluid pressure and adjustable spring pressure. In step 770, if the barrier fluid pressure is greater than the sum of the process fluid pressure and the adjustable spring 406" pressure, then in feedback step 755, the movable valve is positioned to maintain connection of the closing fluid distribution network with the fluid exhaust vent. If the output pressure is less than the input pressure, then the movable valve 448 is biased into a closed position to disconnect the closing fluid distribution network from the fluid exhaust vent. Hence, if the barrier fluid pressure decreases or there occurs a sensed increase in the closing fluid pressure, which may be indicative of lower than expected seal leakage, or a change in process or change in barrier fluid pressure, the feedback regulation system 520 vents or decreases the closing fluid pressure from the seal.

The illustrated fluidic feedback pressure regulation system 500 thus increases the closing pressure with a sensed increase in barrier supply pressure, and decreases the closing pressure with a sensed decrease in barrier fluid pressure.

Figure 9A:
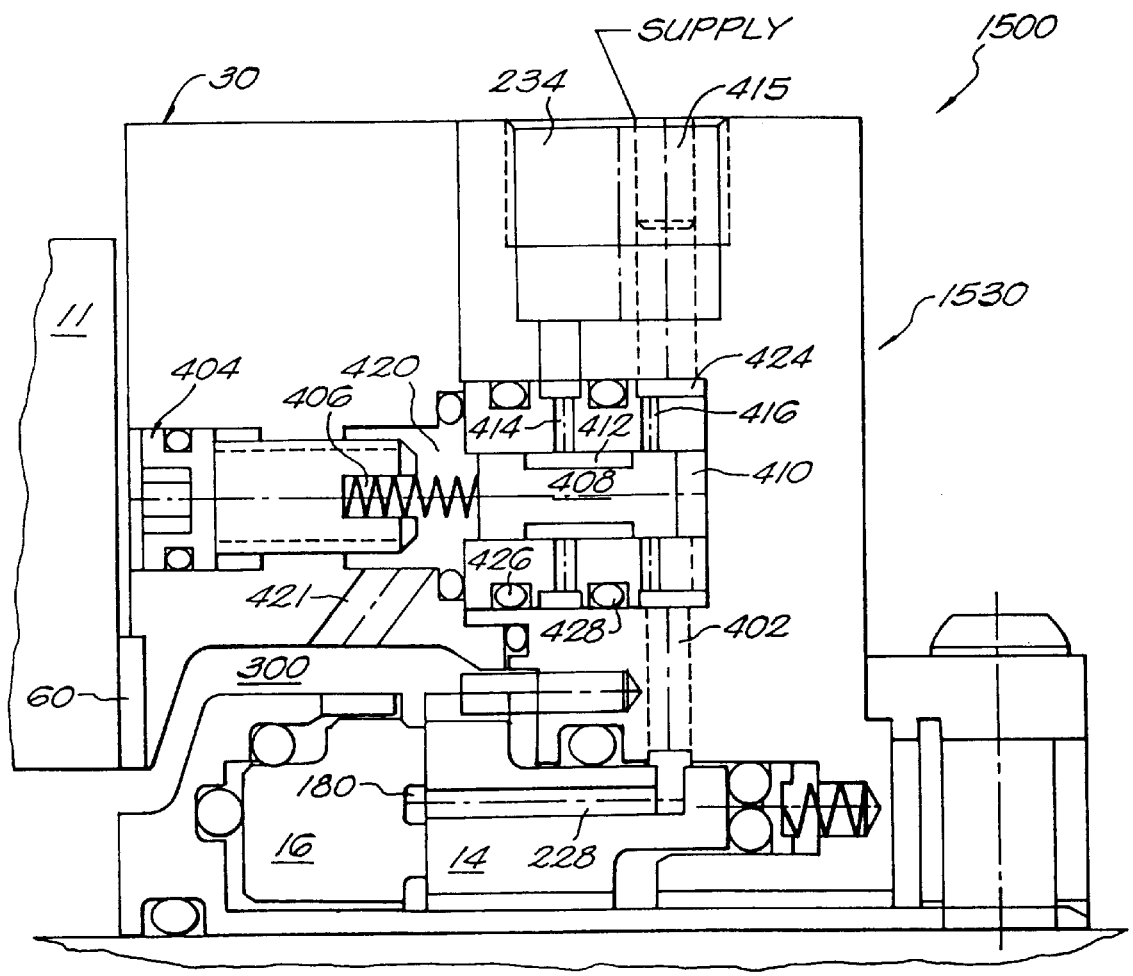
FIG. 9A is a schematic view of one subsystem of another embodiment of pressure fluidic feedback system for maintaining the barrier fluid at a selected pressure relative to the process pressure.
Figure 9B:
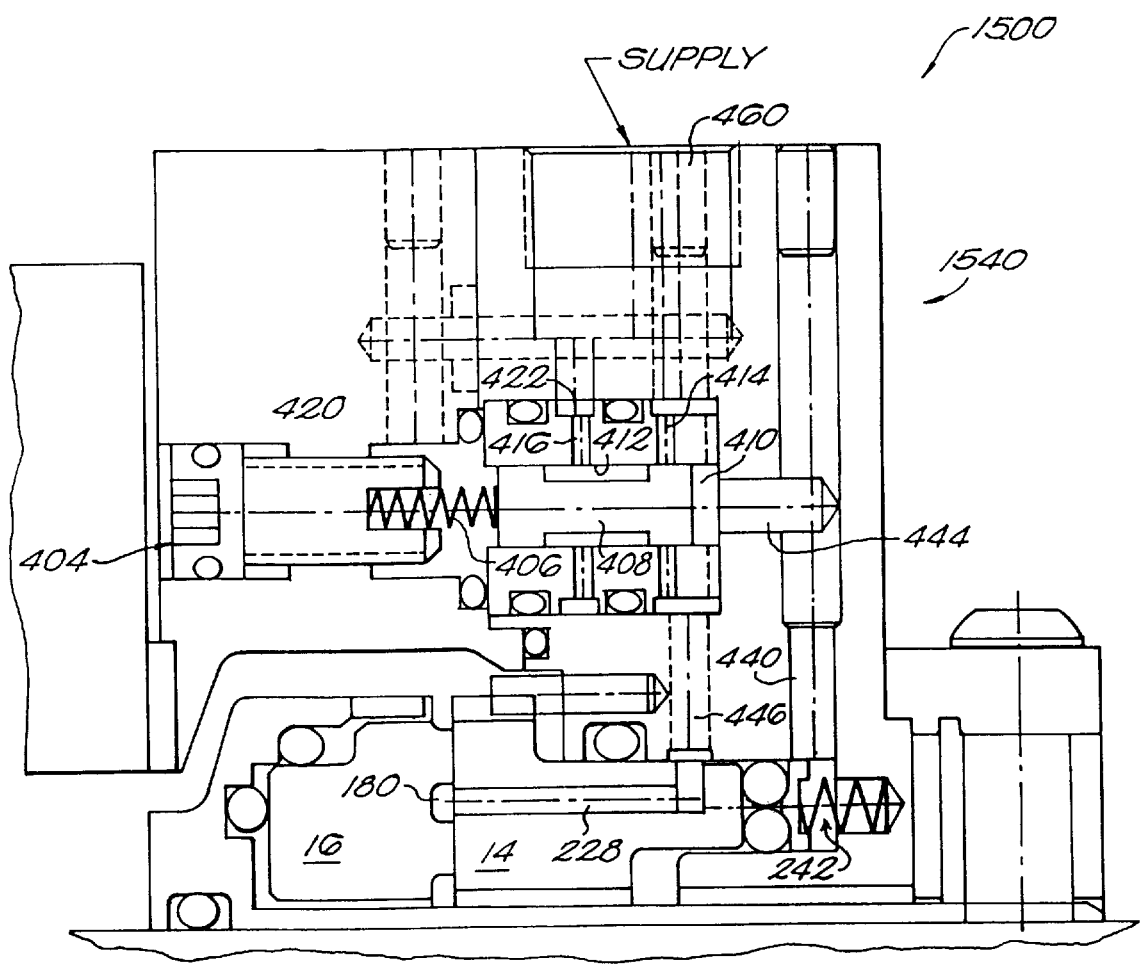
FIG. 9B is a schematic view of one subsystem of another embodiment of the pressure fluidic feedback system of the invention for maintaining the closing force fluid at a selected pressure relative to the barrier fluid pressure, in a high pressure fluid supply.
Figure 9C:
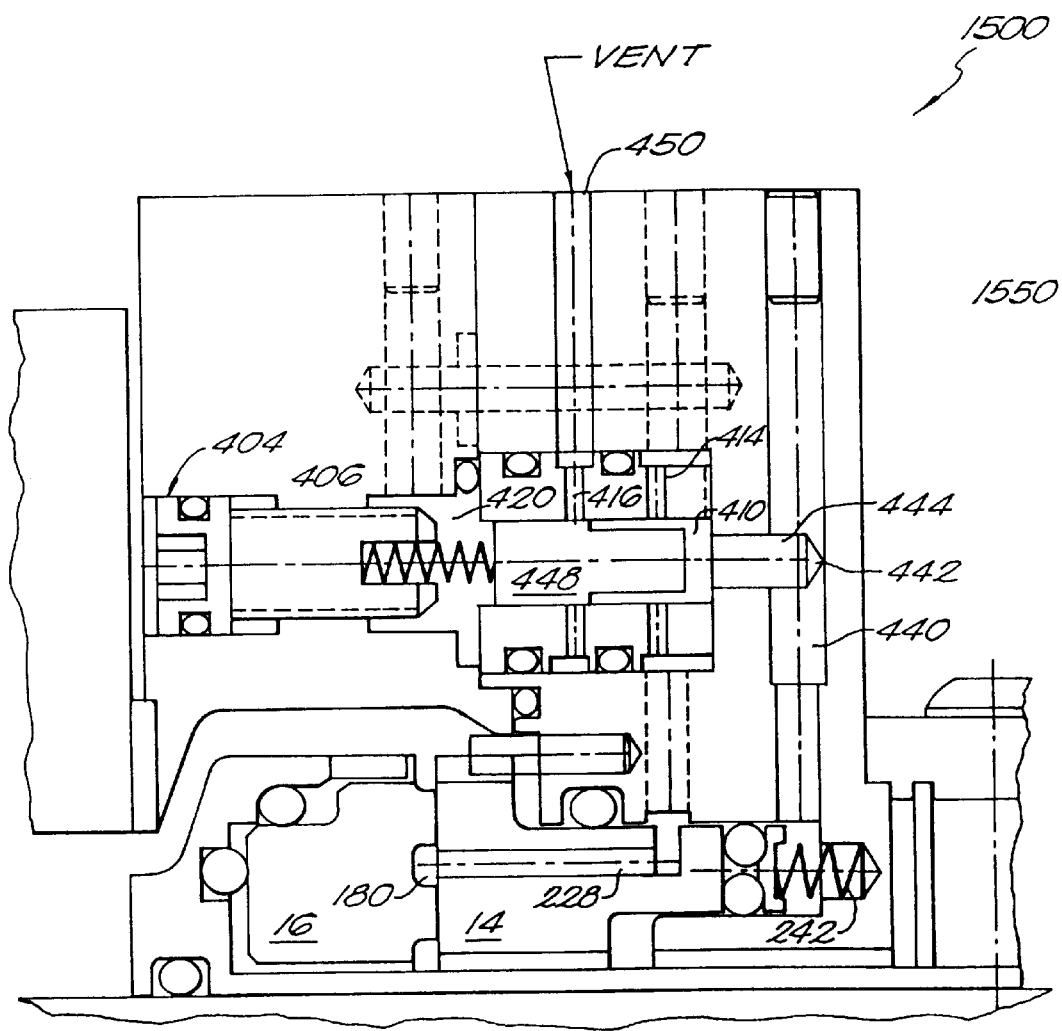
FIG. 9C is a schematic view of one subsystem of another embodiment of the pressure fluidic feedback system of the invention for maintaining the closing force fluid at a selected pressure relative to the barrier fluid pressure, by selectively exhausting fluid through a vent.

FIGS. 9A, 9B, and 9C represent alternate embodiments of the three pressure feedback subsystems 501, 510 and 520 described above, and which further utilizes the screw in an inboard or limited access location. Specifically, FIG. 9A discloses subsystem 1530, an alternate embodiment of subsystem 500 in FIG. 4; FIG. 9B discloses subsystem 1540, an alternate embodiment of subsystem 510 in FIG. 5; and FIG. 9C discloses subsystem 1550, an alternate embodiment of subsystem 520 in FIGS. 6A and 6B. The illustrated subsystems 1530, 1540, and 1550 employ an adjustment screw 406 that is mounted in a limited access area between the housing 11 and gland 30. Like numbers identify like components in these Figures. The illustrated feedback system can also be employed with any suitable mechanical seal, in addition to the seal type and arrangement shown in FIGS. 9A through 9C.

FIG. 9A illustrates a first subsystem 1530 for maintaining the barrier fluid pressure at a selected level relative to the process fluid pressure. The illustrated subsystem employs a movable differential pressure valve 408 disposed within an appropriately sized chamber formed within the gland 30. The chamber 407 mounts an annular fluid manifold 441 that is bored in a selected manner to allow communication between the various pressure passages and bores of the fluidic feedback pressure regulation system.

The illustrated fluid manifold 441 is identical to that described in relation to FIGS. 4, 7 and 8, and has a central bore that seats the movable valve 408. The bore is sized equal to or slightly larger than the outermost diameter of the movable valve to allow relatively free axial sliding movement of the valve within the bore between open and closed positions, while minimizing or preventing leakage about the valve when in the manifold. The fluid manifold 441 includes a number of radially extending fluid bores 414 and 416 to allow the manifold to selectively communicate a particular pressurized fluid to the gland chamber. Sealing structures such as O-rings 426 and 428 are mounted within corresponding grooves formed in the outer surface of the manifold to form a pressure and fluid seal between the inner walls of the chamber 407 and selected portions of the fluid manifold 441.

The movable valve 408 divides the chamber into an input fluid chamber 420 and an output fluid chamber 410, with an intermediate chamber 412 formed between the flanged end portions of the valve. The valve 408 is coupled to an adjustable spring 406, one end of which is attached to a manually adjustable screw 404. The illustrated adjustable screw 404 is mounted in a limited access location to prevent or inhibit personnel from tampering with or adjusting the spring tension from a factory pre-set setting. The system operator can adjust the tension applied by the spring by turning the screw in a selected manner. The screw 404 and the spring 406 thus act in combination to define the initial or set point pressures in the illustrated pressure regulation subsystem 1530.

The screw 404 and spring 406 extend into the input fluid chamber 420 from an interior surface of the gland 30. The input fluid chamber 420 communicates with a process fluid distribution network to allow the process fluid of the seal to communicate with the input regulation chamber 420, as designated. The process fluid distribution network of the fluidic feedback pressure regulation system of the invention includes, among other structure, appropriate process fluid chambers formed within or about the mechanical seal, such as process fluid chamber 300 and process fluid bore 421 that communicates the process fluid from the chamber 300 to the input fluid chamber 420. Those of ordinary skill will recognize that the process fluid distribution network can include that collection of internal bores and passages formed within the gland 30 to enable the process fluid to communicate, if desired, with the movable valve 408 in a selected manner. The regulation system can also employ couplings external of the gland to communicate system fluids with particular portions or components of the system 1500. For example, external fluid conduits can be connected to the gland to transfer the process fluid from the fluid housing to the input process fluid bore 421.

With further reference to FIG. 9A, the fluidic feedback pressure regulation system 1500 of the invention can also include a barrier fluid distribution network that communicates barrier fluid from a barrier fluid supply (not shown) to the fluid manifold 441. The barrier fluid distribution network is preferably the same or similar to that previously described in relation to FIGS. 4 through 6B. The barrier fluid distribution network can include appropriate barrier fluid passages that communicate the barrier fluid from the gland chamber 407 to a separate portion of the seal, including to the barrier fluid biasing system, i.e., axial bore 228 and groove 180, to other feedback systems that can be mounted within the gland, and to other fluid passages/bores such as the input barrier supply passage 415. In particular, the barrier fluid distribution network includes any suitable and appropriate bores and/or chambers formed within the gland, such as input barrier passage 416 formed in the manifold 441, the output barrier pressure bore 414 and barrier conduit 234, and the barrier fluid passage 402 that connects the output chamber 410 with the barrier fluid biasing system of the mechanical seal. The distribution network, of course, can also include the components of the barrier fluid biasing system, such as the axial fluid bore 228 formed in the stationary seal ring and the groove 180.

With further reference to FIG. 9A, the movable valve 408 defines an intermediate chamber or channel 412 which communicates with the barrier fluid supply via the barrier fluid supply passage 415, the fluid supply chamber 424, and the fluid supply conduit 416. The intermediate chamber 412 is also selectively disposed in fluid communication with the barrier fluid distribution network, such as the output barrier bore 414, the barrier chamber 422, and the output barrier fluid bore 234, which conveys the barrier fluid to subsystem 1540.

Similar to the fluidic feedback pressure regulation system 500, the pressure regulation system 1500 of the invention is also completely mounted within the gland and is a purely dynamic fluid system that adjusts selected system pressures as described further below. The fluidic feedback system is thus a compact regulation system that regulates one or more system pressures while concomitantly mounting within the gland of the mechanical seal.

During operation, the process fluid from the fluid housing 11 communicates with the input chamber 420 through the process fluid distribution network. According to a preferred practice, the process fluid is directed from the process fluid chamber 300 to the input chamber 420 through the input process pressure bore 421 or any other appropriately formed passageway within the seal and/or gland that enables the process fluid to enter the input chamber 420. The process fluid is at a given operating pressure. The process fluid in the input fluid chamber 420 exerts a pressure on the input side, e.g., the left side, of the movable valve 408. In addition, the adjustable spring 406 exerts a pressure on the movable valve 408. The combination of these two forces or pressures forms the input pressure, which exerts an initial input axial force that biases the movable valve 408 towards the outboard side of the seal, e.g., to the right.

The barrier fluid source introduces barrier fluid to the pressure regulating subsystem 1530 and to the mechanical seal by the barrier fluid distribution network. According to one practice, the barrier fluid from the barrier fluid source is selectively introduced through the input supply passage 234 to the input supply chamber 424 and the input barrier bore 416, and hence into the intermediate chamber 412. The barrier fluid is then selectively introduced to the output chamber 410 and the barrier fluid distribution network by selectively biasing the movable valve 408 between closed and open positions. The valve 408 is illustrated in the closed position. Specifically, the valve 408 is positioned so as to occlude the output barrier fluid bore 414, thus disconnecting the intermediate chamber 412 from the output chamber 410.

The process fluid in the input fluid chamber 420 exerts a pressure on the input side of the movable valve 408. In addition, the adjustable spring 406 exerts a pressure on the movable valve 408. The combination of these two pressures forms the input pressure, which exerts an initial input axial force that biases the movable valve 408 towards the right and thus from the closed to the open position.

When the valve is disposed in the open position, the barrier fluid from the intermediate chamber 412 passes through the output closing fluid bore 414 and into the output chambers 424 and 410. The barrier fluid exerts an opposite or axially outward pressure against the right side of the differential pressure valve 408 to form an output pressure in the output chamber 410. When the output pressure exerted by the barrier fluid in the output chamber 410 is greater than the sum of the process fluid pressure and the adjustable spring pressure in the input chamber 420, the differential pressure valve 408 moves to the valve back into the illustrated closed position. Specifically, as the barrier fluid distribution network fills with barrier fluid from the supply source, the barrier fluid pressure in the output fluid chamber 410 increasingly exerts a pressure in that chamber. When the barrier fluid pressure within the output chamber 410 equals or exceeds the sum of the pressures exerted by the process fluid and the adjustable spring 406, the differential pressure valve is moved into the illustrated closed position to disconnect the barrier fluid supply from the output barrier passage 234. The barrier fluid within the fluidic feedback pressure regulation system is thus pressurized to a level equal to about the sum of the pressures exerted by the process pressure and the variable pressure of the spring 406. Those of ordinary skill will readily recognize that other pressure arrangements can be used including pressurizing the barrier fluid distribution network to a pressure less than the process fluid pressure and/or spring pressure. The movement between the closed and open positions enables the intermediate chamber 412 and the output chamber 410 to communicate with the barrier fluid supply, hence forming a fluid pathway between the barrier fluid supply and the output barrier fluid bore 414. The barrier fluid then passes through the output barrier passage to the remainder of the barrier fluid distribution network and the pressure system 1500.

The fluidic feedback pressure regulation system 1500 can further include subsystems for introducing a closing fluid to or venting a closing fluid from a closing fluid distribution network. These subsystem include most of the same components as the illustrated subsystem 1530, except for the process fluid bore 421 and the barrier fluid bore 415. The three subsystems can thus be utilized together or in any combination to control a particular fluid pressure that acts upon, either directly or indirectly, the seal faces 18 and 20.

FIGS. 9B and 9C illustrate subsystems 1540 and 1550 that either add, closing fluid pressure to or vent closing fluid pressure from the mechanical seal. Like numbers represent like elements throughout the Figures. The subsystem 1540 selectively connects a closing fluid supply (not shown) to the closing fluid biasing system of the seal. The biasing system applies a closing force to the backside of the stationary seal as a function of the pressure within the barrier fluid distribution network and/or the barrier fluid biasing system, e.g., the axial bore 228 and groove 180.

The illustrated subsystem 1540 also includes a movable differential pressure valve 408 disposed within a fluid manifold 441 mounted in an appropriately sized chamber within the gland 30. The movable valve 408 divides the chamber into an input fluid chamber 420 and an output fluid chamber 410, with an intermediate chamber 412 formed therebetween. The valve 408 is coupled to an adjustable spring 406, one end of which is attached to a manually adjustable screw 404. The illustrated screw 404 and spring 406 are identical to those previously described.

The illustrated subsystem 1540 further includes a closing fluid distribution network a source of closing fluid, which can be a barrier or closing fluid, or some other fluid, to the stationary seal ring 14. The closing fluid distribution system exerts a closing axial biasing force on the stationary seal ring to adjust or regulate the separation between the stationary and rotary seal rings 14 and 16. The closing force distribution network can include any suitable arrangement and number of fluid conduits and bores that introduces the closing fluid to at least one of the seal rings to adjust the separation therebetween. In particular, the illustrated network can include one or more of the input closing fluid passage 460, the input closing fluid bore 416, the intermediate chamber 412, the output closing fluid bore 414, the transverse closing fluid bore 444, the closing fluid junction, the passage connectors 442 and 440, and the closing fluid biasing chamber 242.

The subsystem 1540 also includes a barrier fluid distribution network for communicating the barrier fluid from the subsystem 1530 to the input chamber 420 and to the groove 180. The distribution network can be similar to that described above in connection with the subsystem 1530. The barrier fluid distribution network can therefore include appropriate barrier fluid passages that communicate the barrier fluid from the subsystem 1530 to the input chamber 420 and to the barrier fluid biasing system, i.e., axial bore 228 and groove 180. In particular, the barrier fluid distribution network includes any suitable and appropriate bores and/or chambers formed within the gland, including the barrier fluid passage 446 that connects the barrier fluid with the axial fluid bore 228 formed in the stationary seal ring and the groove 180.

With reference again to FIG. 9B, the movable valve 408 is alternately disposable between open and closed positions by the fluids within the input chamber 420 and the output chamber 410. For example, upon operation of the seal, the barrier fluid is pressurized from the subsystem 1530 and fills the input chamber 420. The barrier fluid in combination with the spring 406 exert a pressure on one side of the movable valve 408 to force the valve into one of the positions. This force is offset by the closing force that is introduced into the output chamber 410 when the valve is disposed in the open position.

When the pressure within the input chamber 420 exceeds the pressure within the output chamber 410, the pressure differential biases the valve 408 to the right from the illustrated closed position into the open position. The closing fluid from the supply passes through the closing fluid input passage 460, chamber 422 and input closing fluid bore 416 and into the intermediate chamber 412. From there, the closing fluid passes through the output closing fluid bore 414 into the transverse closing fluid bore 444, passage junction 442, and into the closing fluid output passage 440 and the closing fluid chamber 242. The closing fluid chamber is disposed on the backside of the stationary seal ring 14 to act upon the stationary seal ring in a selected manner. For example, the closing fluid pressure in the axial chamber 242 can be adjusted to regulate the separation between the seal faces 18, 20 of the seal rings. The system 1500 therefore can regulate seal leakage based upon one or more seal fluid pressures.

During operation, the input chamber 420 fills with barrier fluid pressurized by subsystem 1530. The barrier fluid and the adjustable spring exert a pressure on the left side of the valve 408 to from the input pressure. When the pressure in the input chamber 420 exceeds the pressure on the output chamber 410, the valve 408 is biased into the open position. When placed in this open position, the valve fluidly connects the closing fluid supply with the output fluid bore 414 and the intermediate chamber 412. The closing force is then communicated to the closing fluid chamber 242 to act upon the stationary seal ring in a selected manner. Concomitantly, the closing fluid in the intermediate chamber 412 fills the output closing fluid chamber 410 and exerts a pressure against the other side, e.g., the right side, of the movable valve 408. The force applied by the closing fluid counteracts the forces applied by the barrier fluid and the spring 406 and biases the movable valve back into the closed position, thereby disconnecting the closing fluid supply from the output closing fluid bore 414. Specifically, the flanged end of the valve 408 occludes the bore 414 to prevent or inhibit the passage of closing fluid from the intermediate chamber 412 to the remainder of the closing fluid distribution network. Consequently, the illustrated subsystem 1540 establishes a closing fluid pressure that is a function of the combined spring and barrier fluid pressures.

The illustrated subsystem 1540 is preferably employed to adjust, i.e., increase, the closing fluid pressure as a function of the barrier and process fluid pressures. The fluidic feedback pressure regulation system thereby regulates the gap thickness and leakage at the seal faces. This subsystem 1540 can be used in connection with the first subsystem 1530 to form a completely fluidic, dynamic pressure regulating system that regulates the closing force pressure as a function of the barrier fluid pressure. The subsystem 1530 sets the barrier fluid pressure at a selected level relative to the process fluid pressure and the spring pressure, and is manually adjustable.

With reference to FIG. 9C, a venting subsystem 1550 of the fluidic feedback pressure regulation system of the invention is shown. The subsystem 1550 is adapted to vent closing fluid pressure from the regulation system as a function of the barrier fluid pressure. Like reference numerals correspond to like parts throughout the Figure. The illustrated subsystem includes a movable valve 448 disposed within the gland chamber. The chamber mounts the annular fluid manifold 441 that is bored in a selected manner to allow communication between the pressure passages and bores of the fluidic feedback pressure regulation system and the mechanical seal. The valve 448 is coupled to adjustable spring 406, one end of which is attached to a manually adjustable screw 404.

The illustrated subsystem 1550 also includes a barrier fluid distribution network which communicates or transfers barrier fluid to the input chamber 420, and a closing fluid distribution network which is disposed in fluid communication with the output fluid chamber 410. The barrier fluid distribution network is similar to that previously described. The closing fluid distribution network further includes a vent passage 450 that is disposed in selective fluid communication with the output chamber 410. The vent aperture allows the illustrated feedback subsystem 1550 to vent closing fluid pressure from the subsystem as a function of barrier fluid pressure.

The movable valve 448 is alternately disposable between open and closed positions by the barrier fluid pressure within the input chamber 420 and the closing fluid pressure within the output chamber 410. For example, upon operation of the seal, the barrier fluid distribution network is pressurized by the subsystem 1530, FIG. 9A, and fills the input barrier fluid chamber 420. The barrier fluid and the spring 406 exert a pressure on one side of the movable valve 448 to force the valve into one of the valve positions. The sum of these two pressures forms the input pressure within the chamber 420. Concomitantly, the closing fluid distribution network houses closing fluid at a given pressure. The closing fluid from the closing fluid supply enters the output closing fluid chamber 410 and exerts a pressure on the other side, e.g., the right side, of the valve 448 to form the output pressure in the chamber 410. When the closing fluid pressure within the output chamber 410 is less than the combined pressure in the input chamber 420, the movable valve is biased into the illustrated closed position. This pressure arrangement prevents the purging of closing fluid pressure from the closing fluid distribution network. Consequently, the regulation system does not reduce the amount of closing force pressure by venting it through the vent passage 450.

When the pressure exerted by the closing fluid in the output chamber 410 is greater than the sum of the pressures of the barrier fluid and the adjustable spring 406, the pressure differential biases the valve 448 from the closed position to the right into the open position. This allows the closing fluid distribution network to communicate closing fluid with the vent passage 450 formed in the gland 30. The closing fluid network vents closing fluid contained in the closing fluid chamber 242 and the output chamber 410 from the seal. Specifically, the subsystem 1550 transfers the closing fluid disposed in the closing fluid passages 440, 442 and 444 to the output chamber 410. The placement of the movable valve 448 into the open position allows the closing fluid housed within the chamber 410 to pass through the venting passage 450. This venting of closing fluid by the fluidic feedback pressure regulation system enables it to adjust the closing force applied to the stationary seal. According to one practice, if barrier fluid pressure decreases, which can correspond to decreased process pressure, the closing fluid pressure may need to be adjusted to prevent the closing fluid biasing network from forcing the seal faces into contact with each other.

As the system 1550 removes closing fluid, the closing fluid pressure within the chamber 410 decreases until it generally equals the sum of the barrier fluid pressure and the adjustable spring pressure. When this occurs, the system pressures bias the movable valve 448 into the closed position to discontinue fluid communication between the vent passage 450 and the remainder of the closing fluid distribution network.

The foregoing subsystems 1530, 1540, and 1550 are preferably utilized together and mounted within the gland 30 of the mechanical seal. In combination, the subsystems form a completely fluidic pressure feedback system 1500 that regulates one or more pressures of the mechanical seal as a function of one or more seal pressures.

Figure 14A:
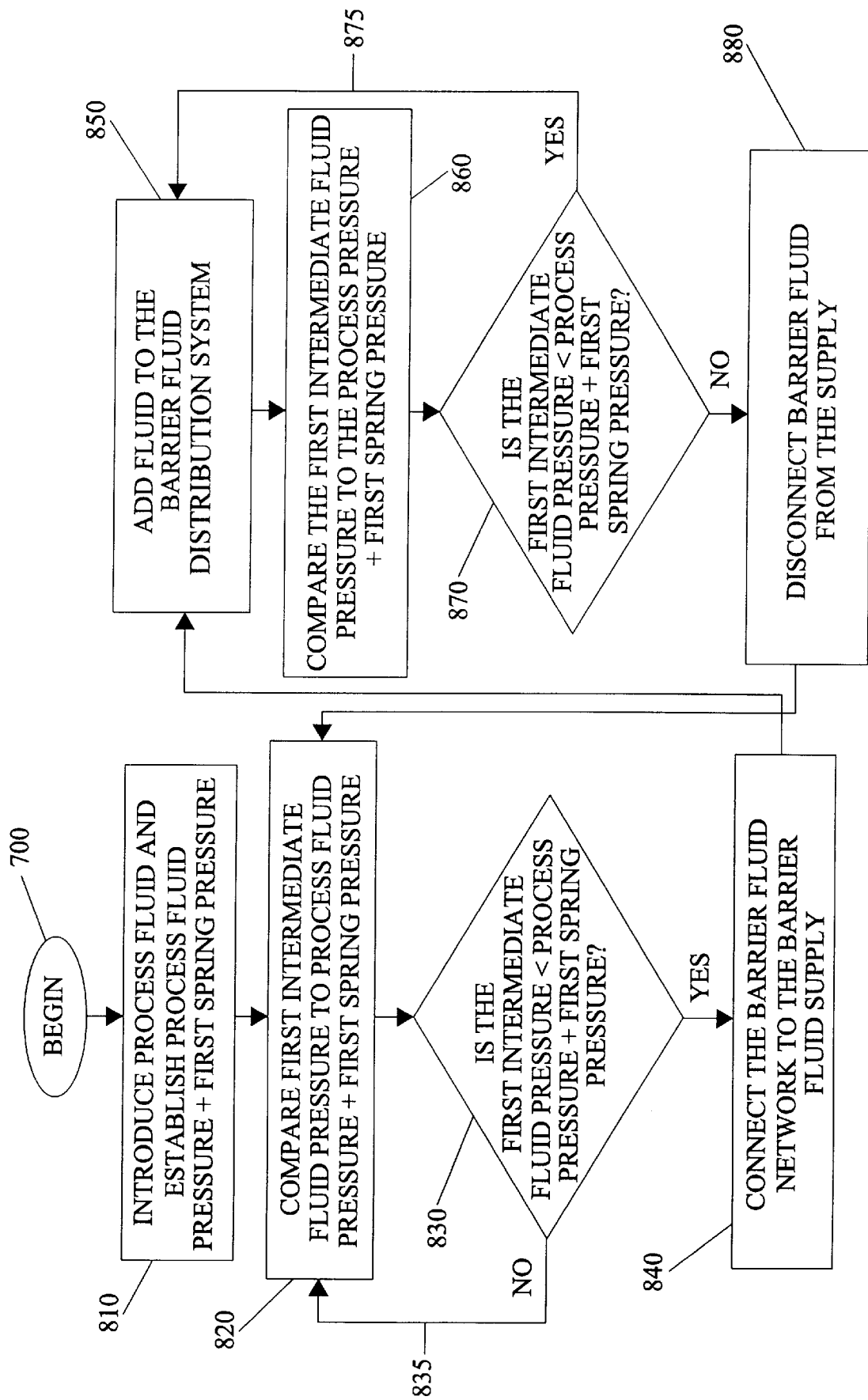
FIG. 14A is a schematic flow chart diagram of the method for maintaining the barrier fluid pressure at a level relative to the process pressure.
Figure 14B:
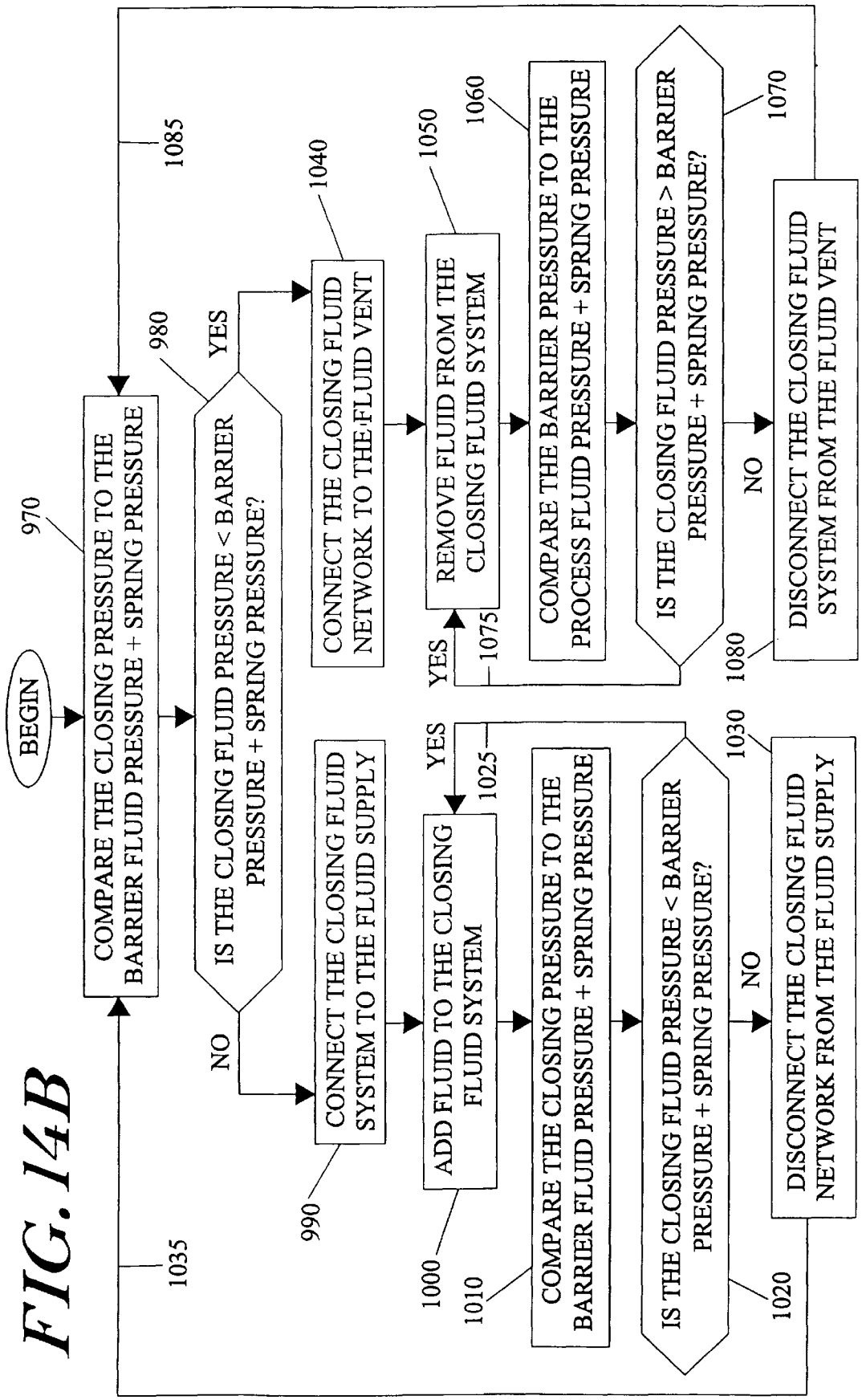
FIG. 14B is a schematic flow chart diagram of the method for maintaining the closing force fluid pressure at a level where the barrier fluid pressure is greater than the process pressure and less than a set upper value using both a high pressure fluid supply and an exhaust vent.

FIGS. 14A and 14B are schematic flow chart diagrams of the operation methodology of the subsystems 1530, 1540, and 1550 of FIGS. 9A through 9C. The three processes described in these Figures are all continuous processes and can be performed in parallel, contemporaneously or simultaneously with each other.

FIG. 14A illustrates the method of setting or establishing a first intermediate fluid pressure to a level relative to the process pressure. In step 810, the process fluid is introduced into the process fluid distribution network. Specifically, process fluid is introduced to the input chamber 420 from the process fluid chamber through the process fluid passage 421.

The process fluid pressure within the input chamber 420 in combination with the force generated by the adjustable spring 406 forms the input pressure of the subsystem 1530. The barrier fluid supply introduces barrier fluid into the seal and establishes the selected intermediate fluid pressure in the output fluid chamber 410. In steps 820 and 830, the input pressure is compared to the intermediate fluid pressure in the output fluid chamber 410. If the intermediate fluid pressure is greater than or equal to the pressure in the input chamber 420, then the pressure regulation subsystem places or maintains the valve in the closed position and continues to monitor the fluidic system for changes in this pressure balance. This is illustrated by feedback step 835. If the intermediate fluid pressure is less than the sum of the process fluid pressure and the adjustable spring pressure in chamber 420, then in step 840, the movable valve 408 is biased into the open position to fluidly connect the barrier fluid supply with the barrier fluid distribution network. The supply introduces barrier fluid to the barrier fluid distribution network, as described in step 850. Specifically, the supply introduces the barrier fluid to the output chamber through the input barrier fluid bore 416, and to the axial bore 228 and groove 180 through the output barrier passage 402.

In steps 860 and 870, the intermediate barrier fluid pressure in the output chamber 410 is again compared to the fluid pressure within the input chamber 420. If the fluid pressure in the output chamber 410 is less than the pressure within the input chamber 420 then the valve is maintained or biased into the open position and barrier fluid is continually introduced to the barrier fluid network. This is illustrated in feedback step 875. If the intermediate barrier fluid pressure is greater than the pressure in the input chamber 420, then the movable valve 408 is biased into the closed position to disconnect the barrier fluid distribution network from the fluid supply.

FIG. 14B illustrates the method of setting the closing fluid to a selected level relative to the pressure differential between the barrier fluid pressure and the process fluid pressure, as described above in relation to subsystem 1530. This is achieved by either adding closing fluid to or venting closing fluid from the closing fluid distribution network. In the illustrated embodiment, the closing fluid supply is the same as the barrier fluid supply. The illustrated flow chart encompasses the operation of subsystems 1540 and 1550 of the fluidic feedback pressure regulation system 1500.

In steps 970 and 980, the barrier fluid pressure and spring pressure within the input chamber 420 are compared to the closing fluid pressure within the output chamber 410. If the closing fluid pressure within the output chamber 410 is less than the sum of the barrier fluid pressure and the spring pressure, then the valve is biased to the right into the open position to connect the closing fluid supply with the closing fluid distribution network, as shown in step 990. Specifically, the closing fluid introduced to the system passes from the intermediate chamber 412 to the output closing fluid bore 414, the transverse passage 444, the passage junction 442, the closing fluid passage 440 and into the closing fluid chamber 242. In step 1000, fluid is added to the closing fluid distribution network, and in step 1010, the closing fluid pressure is compared to the pressure within the input chamber 420. If the closing fluid pressure is less than the input pressure, closing fluid is continually added to the closing force fluid distribution network, as shown by feedback step 1025. If the closing fluid pressure is greater than or equal to the barrier fluid pressure and the second spring pressure, then as shown in step 1030, the movable valve 408 is biased to the left into the illustrated closed position to disconnect the closing fluid distribution network from the closing fluid supply. The system then reverts to monitoring the system pressures of step 970, as shown in feedback step 1035.

Again referring to step 980, if the closing fluid pressure within the input chamber 420 is greater than the sum of the process fluid pressure and the spring pressure, the fluidic feedback system employs subsystem 1550 to selectively vent closing fluid from the system. In particular, as described in step 1040, the movable valve 448 is biased into the open position to connect the closing fluid distribution network to the closing fluid exhaust vent 450. This occurs since the pressure within the input chamber 420 is less than the pressure within the output chamber. The resultant pressure differential biases the valve 448 from the closed position into the open position. The system vents closing fluid from the system 1500 to avoid forcing the seal faces within a selected distance from each other, and in particular from forcing the seal faces into contact with each other.

In step 1050, closing fluid is removed from the closing fluid distribution network, and in step 1060, the barrier fluid pressure within the input chamber 420 is compared to the pressure in the output chamber 410. If the closing fluid pressure within the output chamber 410 is greater than the sum of the barrier fluid pressure and the second spring pressure, then fluid continues to be removed from the closing fluid distribution network, as illustrated by feedback step 1075. If the closing fluid pressure within the output chamber 410 is less than or equal to the total input pressure, then as shown in step 1080, the movable valve 448 is biased into the closed position to disconnect the closing fluid vent from the closing fluid distribution network. The system then reverts to monitoring the system pressures of step 970, as shown in feedback step 1085.

Those of ordinary skill will recognize that the spring tension can be set to provide for selected degree of responsiveness during operation. In particular, the set points for the subsystems 1540 and 1550 can be set a selected amount apart to establish a zone or range where no action (e.g., valve movement) occurs. For example, the set point for adding closing fluid to the system is lower than the set point for either preventing introduction of the closing fluid or venting the closing fluid from the system. Hence, so long as the process fluid pressure is stabile, the set point range is established so that nothing happens.

Figure 10A:
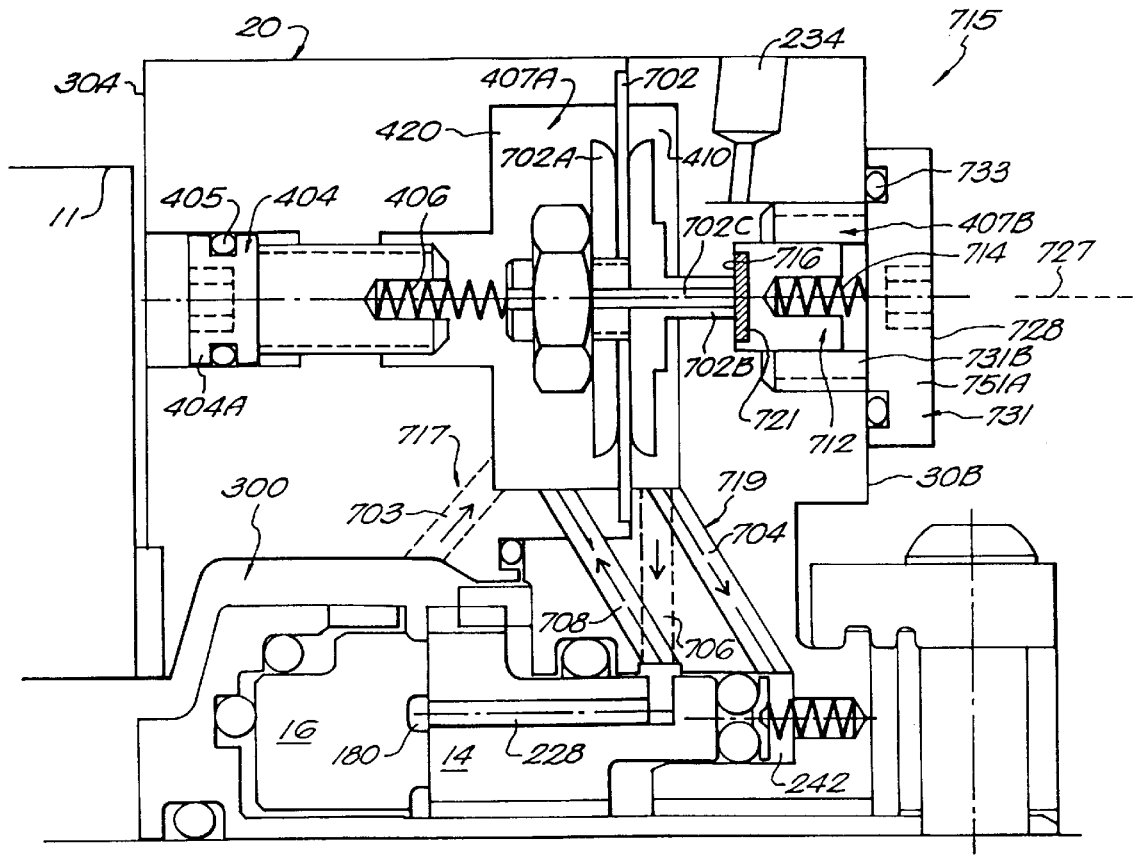
FIG. 10A is a schematic view of still another embodiment of the pressure fluidic feedback system of the present invention employing a diaphragm as the differential pressure valve.
Figure 10B:
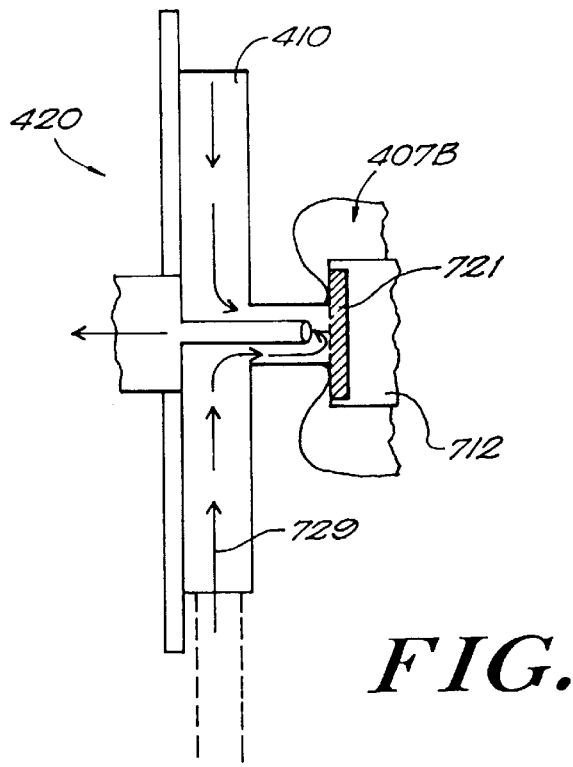
FIG. 10B is a partial schematic illustration of the diaphragm of FIG. 10A disposed in a position to allow the input and output chambers to communicate.

FIGS. 10A and 10B illustrate still another embodiment of the fluidic feedback pressure regulation system of the present invention. The illustrated regulation system 715 employs a diaphragm 702 as the movable valve. The system also preferably employs two subsystems, subsystem 717 which utilizes passages 703 and 706 shown in phantom, and subsystem 719 which utilizes passages 704 and 708. The subsystem 717 preferably establishes the input barrier fluid pressure at a selected level relative to the process fluid pressure by a selected amount corresponding to the spring 406. The subsystem 719 preferably operates to either add closing fluid to or vent closing fluid from the system. The operation and function of the illustrated pressure regulation system 715 is similar the feedback regulation system embodiments of FIGS. 4 through 6B and 9A through 9C. Like reference numerals refer to similar parts in the Figures.

The gland 30 is bored to form a pair of chambers 407A and 407B that are axially spaced along axis 727 from each other. The chambers are selectively disposed in fluid communication with each other. The diaphragm 702 is sized and dimensioned to mount within the chamber 407A and divides the chamber into an input fluid chamber 420 and an output fluid chamber 410. The diaphragm 700 has a bellows portion 702A and an axially extending spindle portion 702B that has a central bore 702C which is open at both ends.

The illustrated diaphragm 702 is coupled to a spring 406, one end of which is attached to a manually adjustable screw 404. The screw 404 includes a head portion 404A which is mounted along the inner surface of the gland at a limited access location. An annular O-ring 405 mounts about the head 404A in a groove to provide a fluid seal between the external environment and the chamber 407A. The screw variably adjusts the tension of the spring to either increase or decrease the tension and therefore the resultant pressure of the spring, while concomitantly adjusting the pressure within the input chamber 420. The screw 404 and the spring 406 thus act in combination to define the initial or set point pressures in the illustrated pressure regulation system 715. The limited access location of the screw inhibits or prevents a system operator from adjusting the spring tension, which can be pre-set to a selected tension at the factory. Those of ordinary skill will also recognize that the manually adjustable screw 404 can be mounted along the outer surface of the gland.

The screw 404 and spring 406 extend into the input fluid chamber 420 from the inner surface of the gland 30. The input fluid chamber 420 communicates with a process fluid distribution network to allow the process fluid of the seal to communicate therewith. The process fluid distribution network of the fluidic feedback pressure regulation system can include appropriate process fluid chambers formed within or about the mechanical seal, such as process fluid chamber 300, and input process fluid passage 703 that communicates the process fluid from the chamber 300 to the input fluid chamber 420. Those of ordinary skill will recognize that the process fluid distribution network can include that collection of internal bores and passages formed within the gland to enable the process fluid to communicate with the movable valve in a selected manner. The regulation system can also employ couplings external of the gland to communicate system fluids with particular portions or components of the system. For example, external fluid conduits can be connected to the gland to transfer the process fluid from the fluid housing to the input process fluid bore 703. In an alternate embodiment, the gland can be internally bored to allow the process fluid to communicate with the process fluid bore completely within the gland without the use of external fluid couplers.

Referring again to FIG. 10A, the gland chamber 407B is formed axially forward of the chamber 407A along axis 727, and preferably opens onto the outer surface 30B of the gland. The chamber further communicates on one side with the input fluid supply passage 234. The chamber 407B mounts a screw and spring assembly 728. The illustrated assembly 728 includes a screw 731 that covers the chamber opening and seats against the gland outer surface. The screw has a head portion 731A and an axially inwardly extending body portion 731B. The underside of the head 731A mounts an O-ring 733 in a corresponding groove to form a fluid seal between the screw and the chamber 407B. The body portion 731B of the screw has a bore that seats one end of a spring 714, the other end of which is coupled to an axially inwardly mounted intermediate plate 712. Specifically, the spring end opposite the screw head mounts within an aperture formed in the plate. The opposite or backside of the plate 712 seats an elastomeric member 721 that selectively engages and mounts about a seat 716 formed between the chambers 407A and 407B. The plate 712 is alternately disposable between open and closed positions by selected fluid and mechanical forces. When the assembly 728 is disposed in the illustrated closed position, the elastomeric member 721 engages the mounting seat 716 to disconnect chamber 407B with the output chamber 410. When the assembly 728 is disposed in the open position, the elastomeric member 721 disengages from the seat 716 to allow the fluid from the supply to pass through chamber 407B into the output chamber 410.

With further reference to FIG. 10B, the axial spindle 702B has an outer end that seats, in a closed position, against the elastomeric member 721. When disposed in an open position, the spindle disengages from the member 721, thus allowing the output chamber 410 to communicate with the input chamber 420 through the central bore 702C of the spindle.

In the first illustrated subsystem 717, the input fluid chamber 420 is fluidly connected to the process fluid distribution network, and in particular, is coupled to the process fluid chamber 300 through the process fluid bore 703. The output fluid chamber 410 is fluidly connected to the barrier fluid distribution network via barrier fluid bore 706 and bore 228 and groove 180. The fluidic feedback pressure regulating system of the invention includes a barrier fluid distribution network that communicates barrier fluid from a barrier fluid supply to the diaphragm and/or to the barrier fluid biasing network. The barrier fluid distribution network preferably includes any appropriate bores and/or chambers formed within the gland which are adapted to carry barrier fluid from the fluid supply to the mechanical seal, similar to the distribution networks previously described. According to a preferred embodiment, the fluid distribution network includes the barrier fluid input passage 234, chamber 407B, the passage formed about spindle 702B, the output chamber 410, and the output barrier fluid passage 706, and optionally the components of the barrier fluid biasing system of the mechanical seal. For example, the barrier fluid biasing system includes the axial fluid bore 228 formed in the stationary seal ring and the groove 180.

During operation, the process fluid from the fluid housing communicates with the input chamber 407 through the input process pressure passage 703 and any other appropriately formed passageway within the seal and/or gland that enables the process fluid to enter the input chamber 420. The process fluid is at a given operating pressure. The process fluid in the input fluid chamber 420 exerts a pressure on the input side, e.g., the left side, of the diaphragm 702. In addition, the adjustable spring 406 exerts a pressure on the diaphragm 702. The combination of these two forces or pressures forms the input pressure, which exerts an initial input axial force that operates to bias the diaphragm towards the right.

The barrier fluid from the barrier fluid source (not shown) is introduced to the regulation system 715 and to the mechanical seal by the barrier fluid distribution network. According to one practice, the barrier fluid from the barrier fluid source is selectively introduced to the input supply passage 234 and into the chamber 407B. The position of the plate 712 and the elastomeric member 721 determines whether barrier fluid is introduced to the output chamber 410. The barrier fluid once housed in the output fluid chamber 410 exerts an opposite and an axially inward pressure against the right side of the diaphragm 702 to form the output pressure.

When the input pressure exerted by the process fluid and the spring 406 is greater than the barrier fluid pressure within the output chamber 410, the diaphragm 702 moves to the right, and the spindle 702B engages the elastomeric member 721. If the pressure differential between the input and output chambers is great enough, the spindle pushes the elastomeric member 721 from the seat 716. This moves the plate 712 into an open position to connect the fluid supply and the chamber 407B with the input chamber 410. The barrier fluid then passes therefrom to the output barrier passage 706 and into the axial bore 228 and groove 180.

As the barrier fluid distribution network fills with barrier fluid from the supply source, the barrier fluid pressure in the output fluid chamber 410 increasingly exerts a pressure on the diaphragm 702 to force it in the opposite direction. When the barrier fluid pressure within the output chamber 410 exceeds the sum of the pressures exerted by the process fluid and the adjustable spring 406, the diaphragm 702 is forced to the left. The spring 714 and the plate 712, in combination with the barrier fluid pressure within the output chamber 410, forces the elastomeric member 721 back onto the seat 716. This moves the collar back into a closed position to disconnect the fluid supply from the output chamber 410. The barrier fluid within the fluidic feedback pressure regulation system 715 is thus pressurized to a level equal to about the sum of the pressures exerted by the process pressure and the selectable pressure of the spring 406. Hence, the barrier fluid within the output chamber 410 is pressurized to a level above the process fluid by an amount corresponding to the tension or pressure of the spring 406. Additionally, the need to increase the barrier fluid pressure within the output chamber 410 is generally indicative of low barrier pressure at the seal faces, and thus of impending seal face contact. The addition of barrier fluid to the seal faces through the axial bore 228 and the groove 180 pressurizes the gap at the seal faces to separate the seal faces.

As shown in FIG. 10B, if the pressure within the input chamber 420 decreases such that the pressure within the input chamber 420 is less than the pressure within the output chamber 410, the system compensates by equalizing the pressure within the two chambers. Specifically, the higher pressure within the output chamber creates a pressure differential that biases the diaphragm 702 to the left. This movement can separate the spindle 702B from its mating engagement with the elastomeric member 721, thus fluidly connecting the output chamber 410 with the input chamber 420 through spindle bore 702C. The higher pressure barrier fluid within the output chamber 410 forces fluid from the output chamber through the bore and into the input chamber 420, as illustrated by solid arrows 729. This occurs until the pressures within the two chambers are such that the spindle 702B again engages the elastomeric member 721 to disconnect the fluid communication between the input and output chambers.

With reference again to FIG. 10A, in the second subsystem 719, the input chamber 420 is fluidly connected to the barrier fluid distribution network, and in the illustrated embodiment, is connected to the axial bore 228 and the groove 180 by the input fluid bore 708. The output fluid chamber 410 is fluidly connected to the closing fluid distribution network by the output closing fluid passage 704. The subsystem 719 can be a separate system mounted within the gland, but is shown herein superimposed over subsystem 717 for purposes of clarity. The remaining components and operation of the subsystem 719 are substantially the same as that described above in connection with subsystem 717.

During operation, barrier fluid from the barrier fluid distribution network fills the input chamber 420 and exerts a pressure against the diaphragm 702 from the left side of the diaphragm. The adjustable spring 406 also exerts a pressure against the left side of the diaphragm 702 and the sum of these two pressures defines the input chamber pressure of the subsystem 719. The closing fluid distribution network pressurizes the output chamber 410 with closing fluid from a closing fluid supply (not shown), and is in fluid communication with the stationary seal ring 14 through output closing fluid passage 704 and closing fluid chamber 242. The closing fluid distribution network exerts a pressure against the right side of the diaphragm 702, thus defining in connection with the screw and spring assembly 728 the output pressure of the subsystem 719. The closing fluid distribution network biases the stationary seal ring relative to the rotary seal ring to adjust the separation between the seal faces.

When the barrier fluid pressure in the input chamber 420 is greater than the pressure within the output chamber 410, the spindle 702B unseats the elastomeric member 721 from the seating surface 716, fluidly connecting the chamber 407B with the output chamber 410. The closing fluid source introduces fluid to the chambers 407B and 410, which then passes into the output closing fluid passage 704 and into the closing fluid chamber 242. The movement of closing fluid from the output chamber 410 into the closing fluid chamber 242 increases the axial closing force exerted on the backside of the stationary seal ring. The increased closing force biases the stator towards the rotor to decrease the gap size between the seal faces, and hence reduce seal leakage.

As the closing fluid pressure within the output chamber 410 increases, the diaphragm 702 is displaced to the left and the elastomeric member 721 of plate 712 engages the seating surface 716 to prevent further fluid communication between the chamber 407B and the output fluid chamber 410. When the pressure within the output chamber 410 exceeds the pressure within the input chamber 420, the closing fluid pressure within the output chamber 410 moves the diaphragm 702 to the left. This movement separates the spindle 702B from the elastomeric member 721 to fluidly, connect the output chamber 410 with the input chamber 420 through spindle bore 702C. The higher pressure closing fluid within the output chamber 410 forces fluid from the output chamber through the bore and into the input chamber 420. This occurs until the pressures within the two chambers equalizes and the spindle 702B again engages the elastomeric member 721.

Figure 15A:
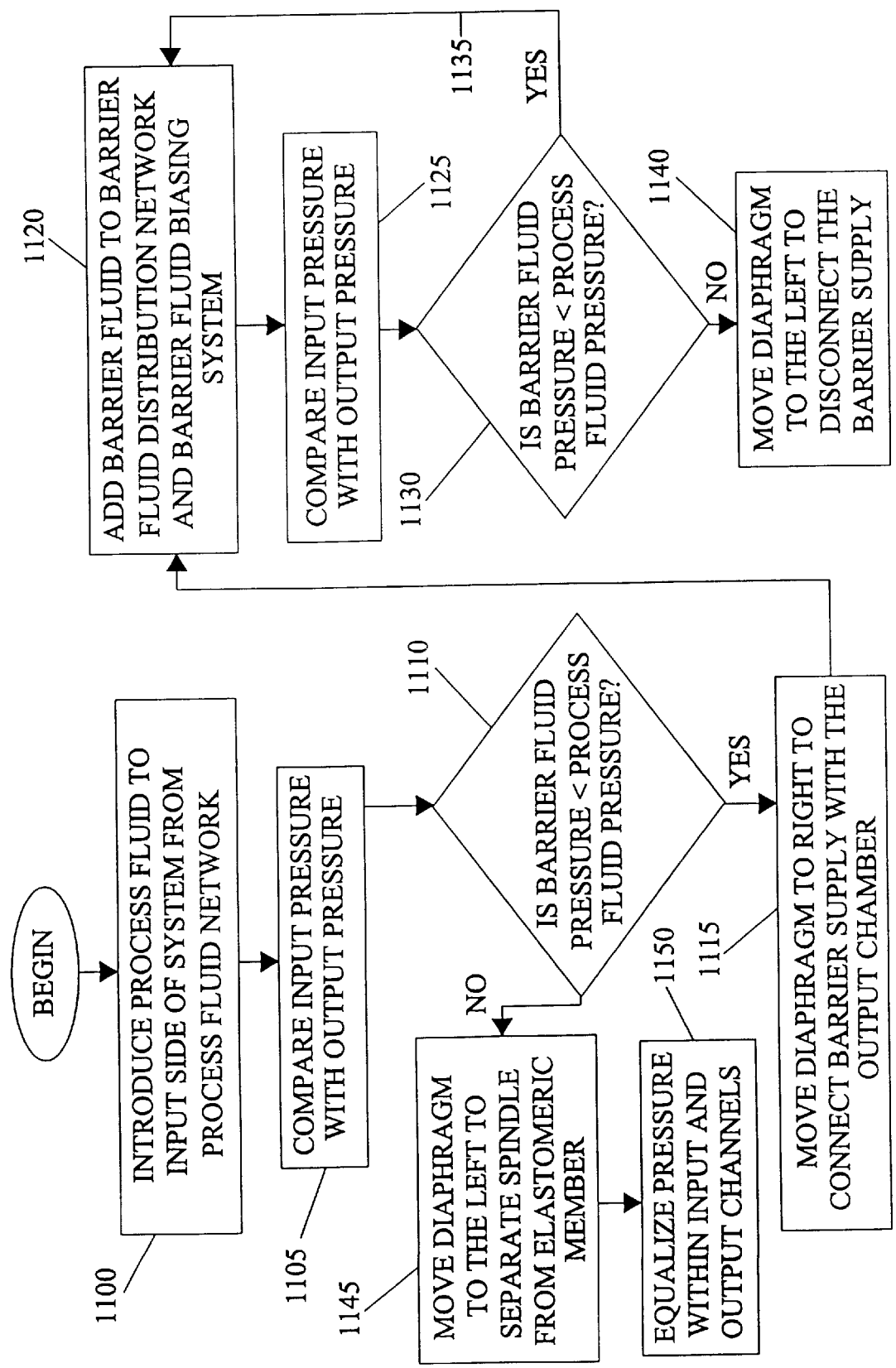
FIGS. 15A and 15B are schematic flow chart diagrams of the method for maintaining the closing force fluid pressure at a level greater than the barrier fluid pressure using both a high pressure fluid supply and an exhaust vent.
Figure 15B:
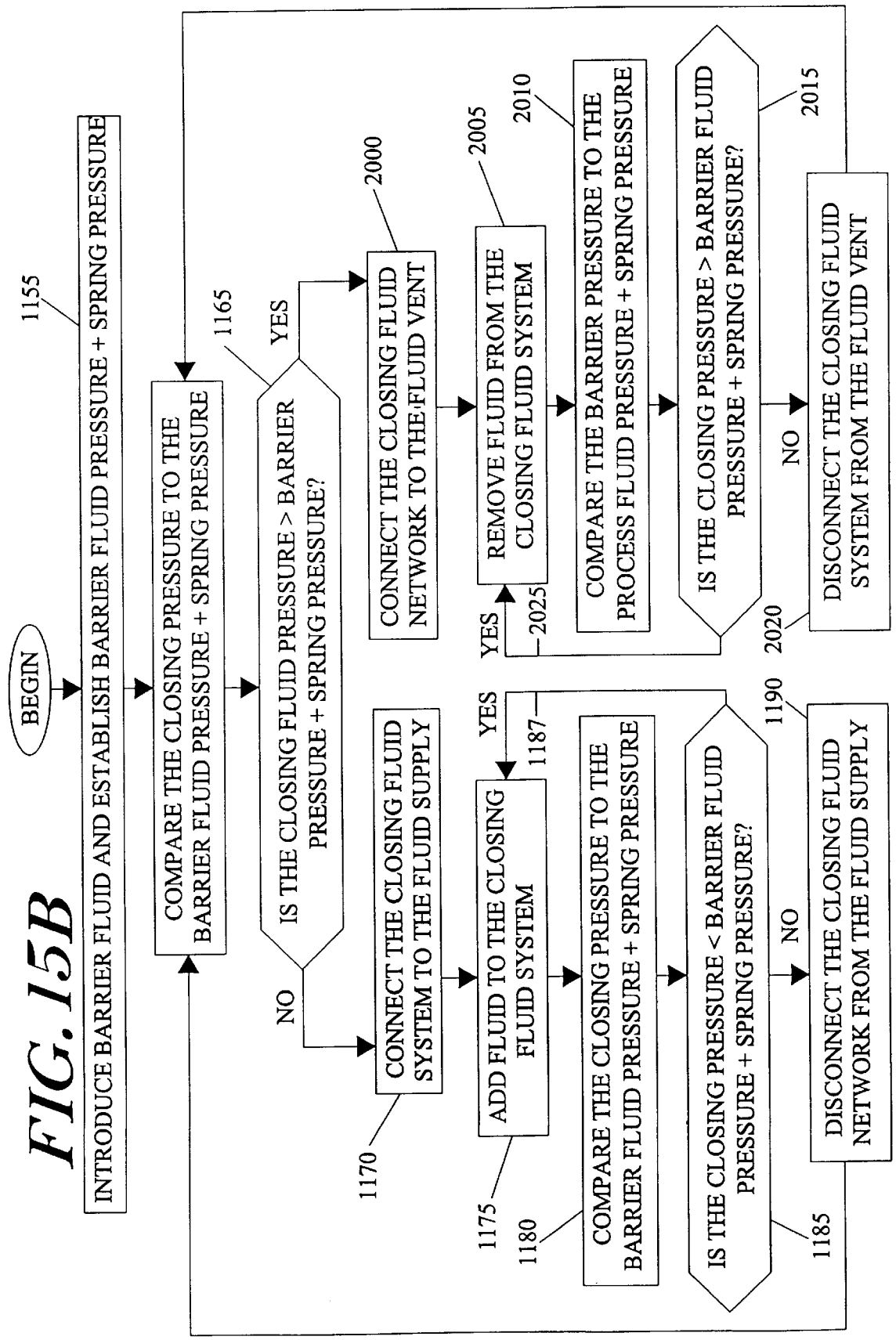

FIGS. 15A and 15B describe the method for pressurizing the system and for maintaining fluid pressure within a selected chamber at a selected level relative to the pressure within the input chamber. In step 1100, the process fluid distribution network introduces process fluid to the input chamber 420, and in combination with the pressure exerted by the spring 406, forms the input pressure of the subsystem 717. The output chamber 410 is then pressurized with barrier fluid that communicates with the barrier fluid biasing system, as previously described. The pressure generated by the process fluid and the spring in the input chamber 420 is then compared to the pressure of the barrier fluid within the output chamber 410. If the barrier fluid pressure is less than the pressure within the input chamber 420, which occurs, for example, when the seal faces are relatively close to each other, the diaphragm 702 moves to the right. The spindle 702B pushes the plate 712 rightwards, which places the barrier supply 234 and the chamber 407B in fluid communication with the output chamber 410. The barrier fluid then passes from the output chamber 410 through the output barrier fluid passage 706 and into the axial bore 228 and the groove 180. The barrier fluid pressurizes the bore and groove and operates to selectively separate the seal faces from each other. This is illustrated in steps 1100 through 1120.

As set forth in steps 1130 through 1140, the system 715 then compares the input pressure with the output pressure and if the barrier fluid pressure is still less than the pressure within the input chamber 420, then the system continues to introduce barrier fluid thereto. If the barrier fluid pressure is generally equal to or above the input pressure, then the diaphragm moves to the left. The spring and plate assembly mounted within the chamber 407B then biases the elastomeric member 721 onto the seating surface 716 to disconnect the barrier fluid supply from the output chamber 410.

Referring again to step 1100, if the barrier fluid pressure is greater than the input pressure, the diaphragm 702 moves to the left. In steps 1145 and 1150, the spindle 702B separates from the plate and the seating surface and exposes the central bore 702C to the input pressure at one end and to the output pressure at the other end. The higher pressure barrier fluid within the output chamber 410 passes through the central bore 702C into the input chamber 420. This process continues until the pressures in the two chambers are generally equal. The diaphragm 702 then moves to the right and the spindle mates with the elastomeric member 721 to discontinue the fluid communication between the two chambers 410, 420.

FIG. 15B sets forth the method of operation of subsystem 719 of system 715. After the barrier fluid is introduced to the barrier fluid distribution network, the subsystem 719 introduces the barrier fluid to the network. The barrier fluid biasing system then introduces barrier fluid to the input chamber 420 through input chamber passage 708. The barrier fluid fills the chamber and in combination with the spring 406 defines an input pressure on the input side of the diaphragm 702, as shown in step 1155. The closing fluid is introduced to the closing force fluid distribution network from a closing fluid supply. In the illustrated subsystem 719, the barrier fluid source also operates as the closing fluid source. The closing fluid disposed within the output chamber 410 defines the output chamber pressure.

In step 1160, the closing fluid or output pressure within the output chamber 410 is compared to the input pressure, and if the closing force fluid pressure is less than the sum of the barrier fluid pressure and the adjustable spring, as described in step 1165, then the diaphragm 702 moves to the right. The spindle 702B displaces the plate from the seat 716. The closing fluid source is placed in fluid communication with the output chamber 410. As described in steps 1170 and 1175, closing fluid is added to the closing force fluid distribution network, and in particular to the output chamber 410 and to the chamber 242. The closing fluid within the two chambers biases the stator towards the rotor to adjust or regulate the width of the gap between the seal faces.

In steps 1185 and 1187, if the closing fluid pressure is less than the sum of the barrier fluid pressure and the adjustable spring pressure, the diaphragm is maintained in a position that connects the closing fluid distribution network to the closing fluid supply. If the output pressure is greater than the input pressure, then, as shown in step 1190, the diaphragm 702 is moved to the left to disconnect the closing force fluid distribution network from the closing force fluid supply.

Referring again to step 1165, if the output or closing fluid pressure is greater than the input pressure, then in step 2000, the diaphragm is moved to the left. The spindle 702B separates from the plate 712 to fluidly connect the output chamber 410 with the input chamber through a venting aperture, such as the diaphragm central bore 702C. The closing fluid is removed from the closing fluid distribution network, as described in steps 2005 and 2010, and the output pressure in the output chamber is again compared to the input pressure. The removal of closing fluid from the closing fluid network reduces the axial biasing closing force applied to the stator. The stator can thus be maintained in a selected position or the gap width widened to accommodate particular seal operating requirements. Specifically, if the seal leakage is low, the system will adjust or maintain the closing fluid pressure within the system to prevent or avoid forcing the seal faces into contact with each other.

In steps 2015 and 2025, if the closing fluid pressure is greater than the sum of the barrier fluid pressure and the adjustable spring pressure, the diaphragm continues to connect the closing fluid distribution network to the fluid exhaust vent. If the output pressure is less than the input pressure, then, as shown in step 2020, the diaphragm 702 is forced to the right and the spindle once again mates with the plate 712. This mating arrangement disconnects the closing force fluid distribution network from the fluid exhaust vent.

The illustrated embodiment 715 operates such that when there is an increase in the process or barrier fluid pressure the closing pressure increases. Specifically, increased process pressure moves the diaphragm to the right, to introduce additional barrier fluid to the system. The increased barrier fluid pressure produces an increase in the input pressure in subsystem 719, which biases the diaphragm in that subsystem to the right. This connects the closing fluids supply with the closing fluid distribution network, thus increasing the closing force applied to the stator.

Conversely, when the process or barrier fluid pressure decreases, the barrier fluid in the output chamber of subsystem 717 is vented into the input chamber. The barrier fluid pressure within the output chamber 410 of subsystem 719 correspondingly falls. The input pressure falls below the output pressure, forcing the diaphragm to the left. The closing fluid within the closing fluid system vents through the center bore 702C and into the input chamber 420. This results in a decrease in the closing fluid pressure within closing fluid chamber 242, and a corresponding decrease in the axial closing force applied to the stator. The gap width is then either widened or maintained at a selected position.

A significant advantage of the illustrated fluidic feedback pressure regulating system is that a substantially completely dynamic fluid feedback system can be used to control or regulate the pressures of one or more seal fluids, in a selected manner, to control the gap width between seal rings, and therefore to control leakage. The fluidic feedback pressure regulation system of the invention thus utilizes a system pressure to control seal face leakage. This dynamic system allows the seal to operate under a wide range of operating conditions while concomitantly employing a feedback system that is compact, and preferably completely mounted within the gland of the mechanical seal.

Figure 16:
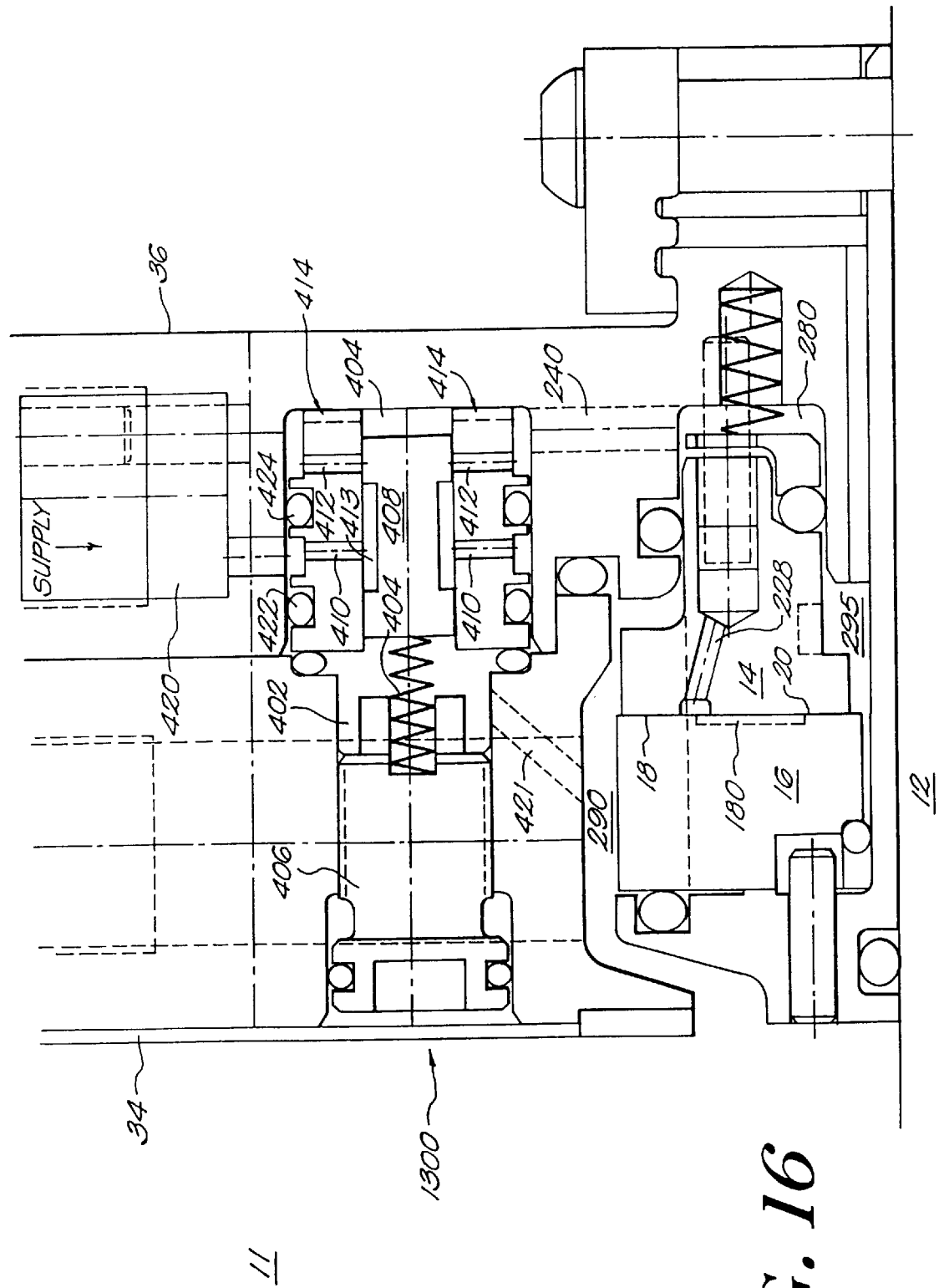
FIG. 16 is a schematic view of another embodiment of the fluidic feedback pressure regulation system of the invention suitable for use with a dual concentric seal.

FIG. 16 illustrates another embodiment of a fluidic feedback pressure regulation system 1300 suitable for use with the illustrated concentric seal. This seal type is fully described in co-pending patent application U.S. application Ser. No. 09/013,698, filed Jan. 26, 1998, entitled NON-CONTACTING MECHANICAL FACE SEAL INCLUDING FLUID CONTROL SYSTEM, assigned to the assignee hereof, the contents of which are herein incorporated by reference. Many of the seal components are similar to those previously described herein and thus have been assigned similar reference numerals. Hence, like parts are designated with like reference numerals throughout FIGS. 16 and 17.

The illustrated feedback system 1300 is preferably employed to regulate a system fluid based on the pressure of another system fluid. According to one practice, the system initially sets the barrier fluid pressure at a selected level relative to the process pressure by a selected amount corresponding to a spring pressure. The barrier pressure is then employed as a system output regulated fluid that operates as a system fluid sensor to selectively add a closing fluid to the system 400. The regulated closing fluid corresponds to the closing fluid contained in the closing fluid biasing system discussed above.

The illustrated feedback system 1300 is preferably sized and dimensioned for mounting within the inner and outer gland plates 34 and 36. The system is coupled to the illustrated seal. The stationary seal ring 14 includes axial bore 228 that communicates at one end with stationary seal face 18 and at the other end with a barrier fluid source. The rotary seal ring 16 has a pumping groove 180 formed therein and which is positioned to directly fluidly communicate with the axial bore 228. The groove and axial bore operate to channel a barrier fluid directly to the seal faces, between which a hydrodynamic lifting force is created that separates the faces to form a gap therebetween.

The fluidic feedback pressure regulation system 1300 employs a movable differential pressure valve 408 disposed within an appropriately sized chamber formed within the glands 34 and 36. The movable valve 408 can also include a number of different valves including, but not limited to, spool or shuttle valves, poppet valves, needle valves, diaphragms, bellows, and other like movable valves that are capable of conveying or being acted upon by a pressurized fluid. The chamber mounts an annular fluid manifold 414 that is bored in a selected manner to allow communication between the various pressure passages and bores of the fluidic feedback pressure regulating system. The illustrated fluid manifold 414 has a central bore that seats the movable valve 408. The bore is sized slightly larger than the outermost diameter of the movable valve to allow relatively free axial movement of the valve within the bore between open and closed positions. The fluid manifold 414 includes a number of radially extending fluid bores 410 and 412 to allow the manifold to selectively communicate a particular pressurized fluid to the gland chamber. Sealing structures such as O-rings 422 and 424 are mounted within corresponding grooves formed in the outer surface of the manifold to form a pressure and fluid seal between the inner walls of the chamber and selected portions of the fluid manifold 414.

The movable valve 408 divides the chamber into an input fluid chamber 402 and an output fluid chamber 404, with an intermediate chamber 413 formed between the flanged end portions of the valve. The valve 408 is coupled to an adjustable spring 404, one end of which is attached to a manually adjustable screw 406. The illustrated adjustable screw 406 is mounted in a limited access location to prevent or inhibit personnel from tampering with or adjusting the spring tension from a factory pre-set setting. If necessary, the system operator can adjust the spring tension by accessing and then turning the screw in a selected manner. The screw 406 and the spring 404 thus act in combination to help define an initial or set point pressure for the illustrated pressure regulation subsystem 400.

The screw 406 and spring 404 extend into the input fluid chamber 402 from the interior surface of the gland The input fluid chamber 402 can communicate with a process fluid distribution network to allow the process fluid of the seal to communicate with the input regulation chamber 402, as designated. The process fluid distribution network of the fluidic feedback pressure regulation system 400 can include, among other structure, appropriate process fluid chambers formed within or about the mechanical seal, such as process fluid chamber 290 and process fluid bore 421 (shown in phantom) that communicates the process fluid from the chamber 290 to the input fluid chamber 402. Those of ordinary skill will recognize that the process fluid distribution network can include that collection of internal bores and passages formed within the gland to enable the process fluid to communicate, if desired, with the movable valve 408 in a selected manner. The regulation system can also employ couplings external of the gland to communicate system fluids with particular portions or components of the system. For example, external fluid conduits can be connected to the gland to transfer the process fluid from the fluid housing to the input process fluid bore 421.

With further reference to FIG. 16, the fluidic feedback pressure regulation system 1300 can also include a barrier fluid distribution network that communicates barrier fluid from a high pressure barrier fluid supply (not shown) to the fluid manifold 414. The barrier fluid distribution network can include appropriate barrier fluid passages that communicate the barrier fluid from the gland chamber to a separate portion of the seal, including to the barrier fluid biasing system, i.e., axial bore 228 and groove 180, to other feedback systems that can be mounted within the gland, and to other fluid passages/bores such as fluid supply 420 and barrier passage 430. The movable valve 408 defines an intermediate chamber or channel 413 which can communicate with a barrier fluid source through input supply bore 420 and input chamber bore 410. The intermediate chamber 413 is also selectively disposed in fluid communication with the barrier fluid distribution network by way of output barrier bores 412 and 240.

During operation, the process fluid from the housing 11 communicates with the input chamber 402 through the process fluid distribution network. According to one practice, the process fluid is directed from the process chamber 290 to the input chamber 402 through the input process pressure bore 421. The process fluid is at a given operating pressure. The process fluid in the input fluid chamber 402 exerts a pressure on the input side, e.g., the left side, of the movable valve 408. In addition, the adjustable spring 404 exerts a pressure on the movable valve 408. The combination of these two forces or pressures forms the input pressure, which exerts an initial input axial force that biases the movable valve 408 to the right.

The barrier fluid source introduces the barrier fluid to the fluidic feedback pressure regulating system and to the mechanical seal by the barrier fluid distribution network. The barrier fluid from the barrier fluid source is selectively introduced through the input supply passage 420 to the input barrier bore 410 and into the intermediate chamber 413. The barrier fluid is then selectively introduced to the output chamber 404 by selectively biasing the movable valve 408 between open and closed positions. The valve 408 is illustrated in the closed position.

The barrier fluid housed in the output fluid chamber 404 exerts an opposite or axially inward pressure against the right side of the movable valve 408 to form an output pressure. When the output pressure exerted by the barrier fluid is less than the sum of the process fluid pressure and the adjustable spring pressure, the differential pressure valve 408 moves to the right into the open position. This enables the intermediate chamber 413 to communicate with the output barrier bore 412 to provide a fluid pathway from the barrier fluid supply through the fluid supply conduit to the output fluid conduit 412. The barrier fluid then passes through the passage 240 into the axial bore 228, and hence to the remainder of the barrier fluid distribution network. The passage 240 further pressurizes the closing chamber 280.

As the barrier fluid distribution network fills with barrier fluid from the supply source, the barrier fluid pressure in the output fluid chamber 404 increases until the pressure equals or exceeds the sum of the pressures exerted by the process fluid and the adjustable spring 404. When this occurs, the valve 408 is biased into the illustrated closed position to disconnect the barrier fluid supply from the output barrier passage 240. The barrier fluid within the fluidic feedback pressure regulation system is thus pressurized to a level equal to about the sum of the pressures exerted by the process pressure and the variable pressure of the spring 406.

The illustrated system 1300 can further include a subsystem for venting the closing fluid from the closing fluid network. The subsystem can include most of the same components as the illustrated subsystem 400, except for the process fluid bore 421 and the barrier fluid bore 240. The subsystems can thus be utilized together or in any combination to control a particular fluid pressure that acts upon, either directly or indirectly, the seal faces 18 and 20. The illustrated subsystem 400 can also be employed to selectively connect a closing fluid supply (not shown) to the closing force biasing system of the seal independent of the barrier fluid system. The closing fluid system applies a closing force to the backside of the stationary seal as a function of the pressure within the barrier fluid distribution network and/or the barrier fluid biasing system, e.g., the axial bore 228 and groove 180.

The closing fluid distribution network of the subsystem connects the source of closing fluid to the stationary seal ring 14. The closing fluid network exerts a closing axial biasing force on the seal ring 14 to adjust or regulate the separation between the stationary and rotary seal rings 14, 16. The closing fluid distribution network can include any suitable arrangement and number of fluid conduits and bores that introduces the fluid to at least one of the seal rings to adjust the separation therebetween. In particular, the illustrated network can include one or more of the input closing force supply passage 420, the input closing fluid bore 410, the intermediate chamber 413, the output closing fluid bore 412, the closing fluid passage 240, and the closing fluid chamber 280. In the illustrated system 1300, the barrier fluid system and the closing fluid distribution network share many of the same passages/bores. Consequently, a discrete and dedicated series of fluidly connected passages can be employed to simultaneously pressurize the barrier fluid system and closing fluid network. According to a preferred practice, the closing fluid can be any suitable barrier fluid.

Figure 17:
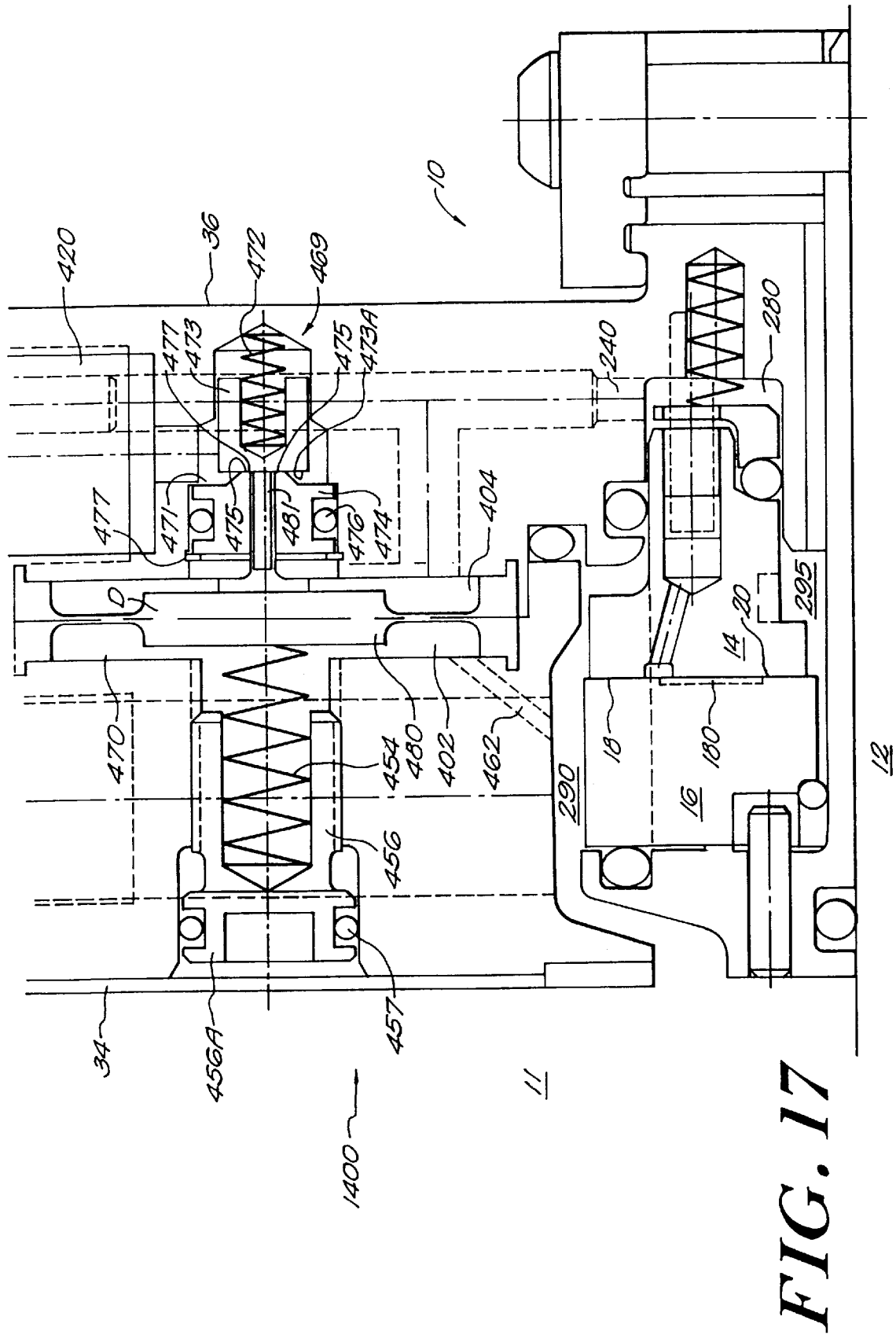
FIG. 17 is a schematic view of an alternate embodiment of the fluidic feedback pressure regulation system of FIG. 16 suitable for use with a dual concentric seal.

FIG. 17 illustrates an alternate embodiment of the fluidic feedback pressure regulation system 1300 of FIG. 16. The illustrated system 1400 employs a diaphragm D as the movable valve. According to one practice, the system 401 preferably disposes the input barrier fluid pressure at a selected level relative to the process fluid pressure and the pressure provided by the spring 454, while concomitantly adding a closing fluid to the system. The operation and function of the illustrated system 401 is similar to the operation of the feedback regulating system 1300 of FIG. 16. Like reference numerals also refer to similar parts in the Figures.

The gland plates 34 and 36 are bored to form a pair of chambers 470 and 471 that are axially spaced from each other. The chambers are selectively disposed in fluid communication with each other. The diaphragm D is sized and dimensioned to mount within the chamber 470 and divides the chamber into an input fluid chamber 402 and an output fluid chamber 404. The diaphragm D has a bellows portion 480 and an axially extending spindle portion 481 that has a central bore which is open at both ends. The illustrated diaphragm D is coupled to a spring 454, one end of which is attached to a manually adjustable screw 456. The screw 456 includes a head portion 456A which is mounted along the inner surface of the gland at a limited access location. An annular O-ring 457 mounts about the head 456A in a groove to provide a fluid seal between the external environment and the chamber 470. The screw variably adjusts the tension of the spring to either increase or decrease the tension and therefore the pressure of the spring, while concomitantly increasing the pressure within the input chamber 402. The screw 456 and the spring 454 thus act in combination to define the initial or set point pressures in the illustrated pressure regulation subsystem 401. The limited access location of the screw inhibits or prevents a system operator from adjusting the spring tension, which can be pre-set to a selected tension at the factory. Those of ordinary skill will also recognize that the manually adjustable screw 456 can be mounted along the outer surface of the gland.

The screw 456 and spring 454 extend into the input fluid chamber 402 from the axial inner surface of the inner gland plate 34. The input fluid chamber 402 communicates with a process fluid distribution network to allow the process fluid of the seal to communicate with the input chamber 402. The process fluid distribution network of the fluidic feedback pressure regulation system can include appropriate process fluid chambers formed within or about the mechanical seal, such as process fluid chamber 290, and input process fluid passage 462 (shown in phantom) that communicates the process fluid from the chamber 290 to the input fluid chamber 402. Those of ordinary skill will recognize that the process fluid distribution network can include any suitable collection of internal bores and passages formed within the gland that enables the process fluid to communicate with the diaphragm in a selected manner. The regulation system can also employ couplings external of the gland to communicate system fluids with particular portions or components of the system. For example, external fluid conduits can be connected to the gland to transfer the process fluid from the fluid housing to the input process fluid bore 462. In an alternate embodiment, the gland can be internally bored to allow the process fluid to communicate with the process fluid bore completely within the gland without the use of external fluid couplers.

The chamber 471 is formed axially outward relative to the chamber 470. The chamber 471 further communicates on one side with the input fluid supply passage 420. The chamber 471 mounts a spring biasing assembly 469 having a spring 472, an intermediate plate 473 having a U-shaped cross-section, and a fixed annular sealing plug 474. One end of the spring 472 seats at the axially outermost portion of the chamber 471, the other end of which seats within a recess formed in the plate 473. The intermediate plate 473 has a sealing surface 473A that abuts a seating surface 475 formed on one end of the sealing plug 474. The sealing plug 474 has an annular groove that mounts an O-ring 476 that provides a fluid seal between chambers 470 and 471. The plug preferably has a shoulder portion 477 that seats in a mating groove formed in the chamber wall to rigidly and fixedly seat the plug 474 in place. The plug has a central bore 477 that is sized to slidingly seat the spindle portion 481 of the diaphragm D. The plug operates to prevent fluid supplied to the chamber 471 from the fluid passage 420 from communicating with the output chamber 404 when the plate is in intimate facing contact with the seat 475.

The illustrated intermediate plate 473 is alternately disposable between open and closed positions by selected fluid and mechanical forces. When the spring biasing assembly 469 is disposed in the illustrated closed position, the sealing surface 473A contacts in a sealing relation with the seat surface 475 of the plug 474. This position prevents fluid contained in the chamber 471 from communicating with the output chamber 404. When the assembly 469 is disposed in the open position, the plate 473 is axially spaced from the plug 474 to allow the fluid within chamber 471 to pass through the central bore 477 into the output chamber 404.

With further reference to FIG. 17, the axial spindle 481 has an outer end that seats, in a closed position, against the sealing surface 473A of the intermediate plate 473. When disposed in an open position, the spindle disengages from the sealing surface 473A, thus allowing fluid in the output chamber 404 to communicate with the chamber 402 through the spindle's central bore.

In the illustrated system 1400, the input fluid chamber 402 is fluidly connected to the process fluid chamber 290 via process fluid bore 462. The output fluid chamber 404 is fluidly connected to the barrier fluid distribution network and the closing fluid network via fluid bore 240. The fluidic feedback pressure regulating system of the invention includes a barrier fluid distribution network that communicates barrier fluid from a high pressure barrier fluid supply to the diaphragm and/or to the barrier fluid biasing network. Further, the system includes a closing fluid network that communicates a closing fluid, such as barrier fluid, to the closing fluid chamber 280.

During operation, the process fluid from the fluid housing communicates with the input chamber 402 through the input process pressure passage 462 and any other appropriately formed passageway within the seal and/or gland that enables the process fluid to enter the input chamber 402. The process fluid is at a given operating pressure. The process fluid in the input fluid chamber 402 exerts a pressure on the input side, e.g., the left side, of the diaphragm D. In addition, the adjustable spring 454 exerts a pressure on the diaphragm D. The combination of these two forces or pressures forms the input pressure, which exerts an initial input axial force that biases the diaphragm towards the right.

The barrier fluid from the barrier/closing fluid supply (not shown) is introduced to the regulation system 401 and to the mechanical seal 16 by the barrier fluid distribution network. According to one practice, the barrier fluid from the barrier fluid supply is selectively introduced to the feedback system, and in particular to the output chamber 404 through supply bore 420. Consequently, the position of the intermediate plate 473 determines whether barrier fluid is introduced to the output chamber 404. The barrier fluid housed in the output fluid chamber 404 exerts an opposite or axially inwardly pressure against the right side of the diaphragm D to form the output pressure.

When the input pressure exerted by the process fluid and the spring 406 is greater than the output pressure within the output chamber 404, the diaphragm D moves to the right, and the spindle 481 separates the plate surface 473A from the seat surface 475. The fluid supply introduces barrier fluid to the chamber 471, which then passes through the central bore 477 of the plug 474 to the output chamber 404. The barrier fluid then passes therefrom to the output passage 240 and into the axial bore 228 and the chamber 280.

Referring again to FIG. 17, as the barrier fluid distribution network fills with barrier fluid from the supply, the barrier fluid pressure in the output fluid chamber 404 increasingly exerts a pressure on the diaphragm D to force it in the opposite direction, e.g., to the left. When the barrier fluid pressure within the output chamber 404 generally equals the sum of the pressures exerted by the process fluid and the adjustable spring 454, the diaphragm D is forced to the left. The spring 472 and the intermediate plate 473, in combination with the barrier fluid pressure within the chamber 471, forces the plate sealing surface 473A back into contact with the seat 475, thereby disconnecting the fluid supply from the output chamber 404. The barrier fluid within the fluidic feedback pressure regulation system 1400 is thus pressurized to a level equal to about the sum of the pressures exerted by the process pressure and the selectable pressure of the spring 454. Hence, the barrier fluid within the output chamber 404 is pressurized to a level above the process fluid by an amount corresponding to the tension or pressure of the spring 454. Those of ordinary skill will recognize that the increase in barrier fluid pressure within the output chamber 404 is indicative of low barrier pressure at the seal faces, and thus of impending seal face contact. The addition of barrier fluid to the seal faces through the axial bore 228 and the groove 180 pressurizes the gap at the seal faces to separate the seal faces.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by letters patent is:

1. A mechanical face seal for providing fluid sealing between a fluid housing and a rotatable shaft, the seal comprising
   a first seal ring having a first seal face and a second seal ring having a second seal face, the first and second seal faces being opposed to each other when assembled, one of the first seal ring and the second seal ring being adapted to rotate with the shaft, the other of the first and second seal rings being restrained from rotating,
   a gland sized for mounting about at least one of the seal rings and being mechanically coupled to the fluid housing, the gland having a bore formed therein, and
   a generally fluidic pressure feedback network sized and dimensioned for mounting generally primarily within the bore in the gland, the fluidic pressure feedback network being adapted to regulate a selected pressure within the seal during operation, said fluidic pressure feedback network having a movable valve sized and dimensioned for seating within the bore in the gland.

2. The mechanical seal of claim 1, wherein the fluidic pressure feedback network comprises
   a barrier fluid distribution network formed within the gland for introducing a barrier fluid to the seal faces, and
   a closing fluid distribution network formed within the gland for introducing a closing fluid to a backside of one of the seal rings to bias the seal ring in a selected direction.

3. The mechanical seal of claim 2, further comprising a barrier fluid biasing network including
   a fluid passage formed within the second seal ring, the passage opening onto the second seal face at one end and being selectively disposed in fluid communication with a fluid source at another end, and
   a groove formed in the first seal face of the first seal ring, the groove being disposed in fluid communication with the fluid passage during operation.

4. The mechanical seal of claim 3, further comprising a fluid control system for controlling the separation of the seal faces by adjusting the pressure of a fluid introduced to said groove.

5. The mechanical seal of claim 2, wherein the barrier fluid distribution network comprises
   a first fluid passage formed within the gland and adapted to introduce a first fluid to a chamber defined by the bore.

6. The mechanical seal of claim 5, wherein the barrier fluid distribution network further comprises an output fluid passage formed within the gland and disposed to communicate with the chamber for selectively delivering the first fluid to another portion of the seal.

7. The mechanical seal of claim 2, wherein the fluid housing includes a process fluid,
   wherein the movable valve separates the chamber into an input chamber and an output chamber, the mechanical seal further comprising
   a process fluid passage formed within the gland and positioned to communicate the process fluid from the fluid housing to the input chamber located at one side of the movable valve.

8. The mechanical seal of claim 2, wherein the closing fluid distribution network comprises
   a closing fluid chamber formed within the gland, and
   a plurality of bores formed within the gland and adapted for selectively conveying a closing fluid to or from the closing fluid chamber in respond to a difference in pressure of selected seal fluids.

9. The mechanical seal of claim 1, wherein the fluidic pressure feedback network comprises
   a first fluid passage formed within the gland for introducing a first fluid to the chamber, and a second fluid passage formed within the gland and adapted to communicate with the chamber and with one of the first and second seal rings for delivering the first fluid thereto, wherein the valve is movable between an open position for allowing the first fluid to be introduced to the chamber through the first fluid passage and a closed position for preventing fluid from entering the chamber through the first fluid passage.

10. The mechanical seal of claim 9, further comprising a cylindrical fluid manifold mounted within the chamber and about the movable valve for manifolding the first fluid to the seal.

11. The mechanical seal of claim 10, wherein the fluid manifold comprises first and second fluid bores formed therein, one of which is disposed to fluidly communicate with the first fluid passage.

12. The mechanical seal of claim 11, wherein the other of said fluid bores is disposed to fluidly communicate with a third passage adapted to deliver the first fluid to another portion of said seal.

13. The mechanical seal of claim 1, wherein said movable valve seats within a chamber defined by the bore formed within the gland, said movable valve separating said chamber into an input chamber and an output chamber, wherein said fluidic pressure feedback network comprises
   a process fluid passage formed within the gland and adapted to introduce a process fluid from the fluid housing to the input chamber,
   a first barrier fluid passage formed within the gland and disposed in fluid communication with said output chamber for introducing a barrier fluid thereto, and
   a second barrier fluid passage formed within the gland and disposed in fluid communication with said gland chamber for selectively transferring the barrier fluid therefrom during operation to another portion of the mechanical seal.

14. The mechanical seal of claim 13, wherein said movable valve further defines an intermediate chamber between said input chamber and said output chamber, and said second barrier fluid passage selectively communicates with said intermediate chamber,
   wherein said movable valve is alternately disposable between a closed position for preventing barrier fluid from being introduced to said second barrier fluid passage, and an open position for introducing a barrier fluid through said intermediate chamber into said second barrier fluid passage.

15. The mechanical seal of claim 14, wherein the process pressure in said input chamber defines an input pressure and the barrier fluid in said output chamber defines an output pressure, and wherein the difference between the input and output pressures dispose the movable valve in one of said open and closed positions.

16. The mechanical seal of claim 15, wherein when said input pressure is greater than said output pressure said difference in pressure disposes said valve in said closed position, and when said input pressure is less than said output pressure said difference in pressure disposes said valve in said open position.

17. The mechanical seal of claim 14, further comprising a third barrier fluid passage formed within the second seal ring, the third fluid passage opening onto the second seal face at one end and being disposed in fluid communication with said output chamber at the other end, said barrier fluid passage in combination with the barrier fluid being operatively employed to dispose said seal faces at a selected distance from each other to form a gap therebetween.

18. The mechanical seal of claim 17, further comprising means for selectively regulating said gap width as a function of a difference in pressure between the input chamber and the output chamber.

19. The mechanical seal of claim 13, further comprising
   a closing fluid chamber formed within the gland and disposed in fluid communication with said second barrier fluid passage.

20. The mechanical seal of claim 19, wherein said closing fluid distribution network further comprises
   a second movable valve seated within the closing fluid chamber, said second movable valve separating said closing fluid chamber into an input chamber and an output chamber with an intermediate chamber formed therebetween,
   a first closing fluid passage formed within the gland and disposed in fluid communication with said intermediate chamber of said closing fluid chamber for introducing a closing fluid thereto from a fluid supply, and
   a second closing fluid passage formed within the gland and disposed in fluid communication with said closing fluid chamber for selectively transferring the closing fluid therefrom during operation of said seal.

21. The mechanical seal of claim 20, wherein said closing fluid distribution network further comprises a second closing fluid chamber disposed at a backside of one of said first and second seal rings, and wherein said second closing fluid passage is positioned within said gland to communicate with said intermediate chamber and said second closing fluid chamber to convey the closing fluid therebetween.

22. The mechanical seal of claim 21, wherein said second movable valve is alternately disposable between a closed position for preventing the closing fluid from being introduced to said second closing fluid passage, and an open position for introducing the closing fluid through said intermediate chamber into said second closing fluid passage.

23. The mechanical seal of claim 22, wherein said barrier fluid from said second barrier fluid passage pressurizes said input chamber of said closing fluid chamber to define an input pressure, and the closing fluid in said output chamber of said closing fluid chamber defines an output pressure, and wherein the difference between the input and output pressures dispose said second movable valve in one of said open and closed positions.

24. The mechanical seal of claim 23, wherein when said input pressure in said input chamber is greater than said output pressure in said output chamber, the difference in pressure between said chambers disposes said valve in said closed position, thereby disconnecting said first closing fluid passage from said intermediate chamber and thus from said second closing fluid chamber.

25. The mechanical seal of claim 24, wherein when said input pressure in said input chamber is less than said output pressure said difference in pressure disposes said valve in said open position, thereby connecting the fluid supply with said intermediate passage and said second closing fluid passage to introduce the closing fluid to the second closing fluid chamber.

26. The mechanical seal of claim 22, further comprising means for forming a gap between the seal faces of said first and second rings.

27. The mechanical seal of claim 26, further comprising regulation means for regulating said gap to control leakage at said seal faces.

28. The mechanical seal of claim 27, wherein said regulation means further comprises means for moving said second movable valve between said open and closed positions, wherein said second movable valve when disposed in said closed position disconnects said first closing fluid passage from said intermediate chamber and thus from said second closing fluid chamber to prevent closing fluid from being introduced to said second closing fluid chamber, and wherein said second movable valve when disposed in said open position connects the fluid supply with said intermediate chamber and said second closing fluid passage to introduce the closing fluid to the second closing fluid chamber, said closing fluid in said second closing fluid chamber being regulated to apply varying forces on the backside of said second seal ring to adjust the gap between the seal faces.

29. The mechanical seal of claim 22, further comprising means for moving said second movable valve between said open and closed positions.

30. The mechanical seal of claim 13, wherein said closing fluid distribution network comprises a second chamber formed within the gland for selectively transfering closing fluid to said closing fluid distribution network.

31. The mechanical seal of claim 30, wherein said closing fluid distribution network further comprises
 a second movable valve seated within said second chamber, said second movable valve separating said second chamber into an input chamber and an output chamber with an intermediate chamber formed therebetween,
 a first closing fluid passage formed within the gland and disposed in fluid communication with said intermediate chamber of said second chamber for introducing a closing fluid thereto, and
 a second closing fluid passage formed within the gland and disposed in fluid communication with said second chamber for selectively removing the closing fluid therefrom during operation of said seal.

32. The mechanical seal of claim 31, wherein said closing fluid distribution network further comprises a second closing fluid chamber disposed at a backside of one of said first and second seal rings, and wherein said second closing fluid passage is positioned within said gland to selectively communicate with said intermediate chamber and said second closing fluid chamber.

33. The mechanical seal of claim 32, wherein said second movable valve is alternately disposable between a closed position for preventing the closing fluid from being introduced to said second closing fluid passage, and an open position for introducing the closing fluid from said second chamber through said intermediate chamber to said second closing fluid passage to remove closing fluid therefrom.

34. The mechanical seal of claim 33, wherein said input chamber of said second chamber is pressurized to define an input pressure, and the closing fluid in said output chamber defines an output pressure, and wherein the difference between the input and output pressures dispose said second movable valve in one of said open and closed positions.

35. The mechanical seal of claim 34, wherein when said input pressure in said input chamber of said second chamber is greater than said output pressure in said output chamber of said second chamber, the difference in pressure between said input and output chambers disposes said second movable valve in said closed position, thereby disconnecting said first closing fluid passage from said intermediate chamber and thus from said second closing fluid chamber.

36. The mechanical seal of claim 34, wherein when said input pressure in said input chamber is less than said output pressure, said difference in pressure disposes said second movable valve in said open position, thereby connecting the second closing fluid chamber with said intermediate chamber and said second closing fluid passage to remove closing fluid from said closing fluid distribution network.

37. The mechanical seal of claim 31, further comprising means for forming a gap between the seal faces of said first and second seal rings.

38. The mechanical seal of claim 37, further comprising regulation means for regulating said gap to control leakage at said seal faces.

39. The mechanical seal of claim 38, wherein said regulation means further comprises means for moving said second movable valve between an open position to remove closing fluid from said second closing fluid chamber, and a closed position for preventing removal of closing fluid from said second closing fluid chamber.

40. The mechanical seal of claim 31, further comprising means for moving said second movable valve between said open and closed positions.

41. The mechanical seal of claim 1, wherein said fluidic pressure feedback network comprises
 regulation means for regulating a first fluid having a first pressure within a first fluid distribution network formed with the gland, the first fluid distribution network having a plurality of bores within the gland, wherein said regulation means is responsive to a second fluid having a second pressure within a second fluid distribution network formed within the gland, the second fluid distribution network having a plurality of bores within the gland.

42. The mechanical seal of claim 41, wherein said regulation means comprises means for selectively adjusting a pressure of the second fluid within the second fluid distribution network as a function of the pressure within the first distribution network.

43. The mechanical seal of claim 42, wherein said second fluid is disposed at a pressure higher than the pressure of the first fluid pressure by a selected amount to form a regulated output pressure, said regulated output pressure being employed to regulate a gap formed between the seal faces of the seal rings.

44. The mechanical seal of claim 41, wherein said regulation means comprises,
   a chamber formed within the gland,
   a moveable valve disposed within said chamber, said moveable valve dividing the chamber into an input chamber and an output chamber,
   an input fluid conduit formed within the gland and communicating with said chamber for establishing a fluid pathway between the input chamber and the second fluid distribution network,
   an output fluid conduit formed within the gland and communicating with said chamber for establishing a fluid pathway between the output chamber and the first fluid distribution network, and
   a fluid supply conduit formed within the gland for establishing a fluid pathway between the movable valve and a fluid supply.

45. The mechanical seal of claim 44, wherein said movable valve is responsive to a pressure difference between said first and second fluid pressures, said pressure differential selectively moving said valve into one position for establishing a fluid pathway between the input fluid conduit and the output fluid conduit to introduce fluid from the fluid supply to the first fluid distribution network, thereby increasing the fluid pressure of the first fluid in said first fluid distribution network.

46. The mechanical seal of claim 44, wherein the first fluid comprises a barrier fluid and the second fluid comprises a process fluid.

47. The mechanical seal of claim 44, wherein the first fluid is a closing force fluid and the second fluid is a barrier fluid.

48. The mechanical seal of claim 47, wherein said seal includes barrier fluid having a first pressure and the fluid housing includes process fluid having a selected pressure, wherein said fluidic pressure feedback network comprises
   means for establishing a barrier fluid pressure at a second pressure level above the process fluid pressure by a predetermined amount.

49. The mechanical seal of claim 48, wherein said fluidic pressure feedback network further comprises means for introducing said barrier fluid at said second pressure to another portion of said network, said barrier fluid pressure defining a regulated input pressure.

50. The mechanical seal of claim 49, wherein said fluidic pressure feedback network further comprises a closing fluid distribution network formed within said gland for introducing a closing fluid to a backside of one of said seal rings and for establishing a selected pressure at said backside to exert an axial biasing force thereon to force said seal faces of said seal rings toward one another.

51. The mechanical seal of claim 50, wherein said fluidic pressure feedback network further comprises regulation means for regulating pressure of said closing fluid as a function of said regulated input pressure to selectively regulate the closing fluid pressure.

52. The mechanical seal of claim 49, wherein said regulation means further comprises at least one of
   means for removing said closing fluid pressure from said network when said regulated input pressure increases, and
   means for increasing said closing fluid pressure in said network when said regulated input pressure decreases.

53. The mechanical seal of claim 1, wherein the fluidic pressure feedback network comprises is sized and configured for solely and generally completely mounting within the gland of the seal.

54. The mechanical seal of claim 1, wherein said movable valve seats within a chamber defined by the bore formed within the gland, said movable valve separating said chamber into an input chamber and an output chamber, wherein said fluidic pressure feedback network comprises
   a process fluid passage formed within the gland and adapted to introduce a process fluid from the fluid housing to the input chamber, and
   a barrier fluid passage formed within the gland and disposed in fluid communication with said output chamber for introducing a barrier fluid thereto,
   wherein said barrier fluid in said output chamber is disposed at a pressure different than the pressure of the process fluid in said input chamber by an amount corresponding to a second selected pressure.

55. The mechanical seal of claim 54, wherein said second selected pressure is formed by a spring mounted in said input chamber, such that said pressure of said barrier fluid is generally equal to said pressure of said process fluid and said spring.

56. The mechanical seal of claim 54, wherein an increase in said barrier fluid pressure corresponds to an increase in said process fluid pressure.

57. The mechanical seal of claim 54, wherein said movable valve is alternately disposable between a closed position for preventing barrier fluid from being introduced to said output chamber, and an open position for introducing a barrier fluid into said output chamber.

58. The mechanical seal of claim 1, further comprising a plurality of movable valves, each said valve mounted within a separate chamber formed within the gland.

59. The mechanical seal of claim 1, wherein the fluidic pressure feedback network comprises
   a barrier fluid distribution network formed within the gland for introducing a barrier fluid to the seal faces, and
   a closing fluid distribution network formed within the gland for introducing a closing fluid to a backside of one of the seal rings to bias the seal ring in a selected direction,
   wherein the fluidic pressure feedback network is configured for communicating with a process fluid within the fluid housing, wherein an increase in process fluid in the fluidic pressure feedback network corresponds to an introduction of barrier fluid into the seal by said barrier fluid distribution network and an introduction of closing fluid into the seal by the closing fluid distribution network.

60. The mechanical seal of claim 1, wherein the fluidic pressure feedback network comprises a barrier fluid distribution network formed within the gland for introducing a barrier fluid to the seal faces, and a closing fluid distribution network formed within the gland for introducing a closing fluid to a backside of one of the seal rings to bias the seal ring in a selected direction, wherein the fluidic pressure feedback network is configured for communicating with a process fluid within the fluid housing, wherein a decrease in process fluid pressure in the fluidic pressure feedback network corresponds to a decrease in the pressure of the barrier fluid applied by the barrier fluid distribution network and a decrease in closing fluid pressure in the seal applied by the closing fluid distribution network.

61. A mechanical face seal for providing fluid sealing between a fluid housing and a rotatable shaft, the seal comprising a first seal ring having a first seal face and a second seal ring having a second seal face, the first and second seal faces being opposed to each other when assembled, one of the first seal ring and the second seal ring being adapted to rotate with the shaft, the other of the first and second seal rings being restrained from rotating, a gland sized for mounting about at least one of the seal rings and being mechanically coupled to the fluid housing, the gland having a bore formed therein, and a generally fluidic pressure feedback network sized and dimensioned for mounting within the bore in the gland, the fluidic pressure feedback network being adapted to regulate a selected pressure within the seal during operation, wherein said fluidic pressure feedback network includes
a movable valve sized and dimensioned for seating within the bore in the gland, said movable valve separating said chamber into an input chamber and an output chamber, a process fluid passage formed within the gland and adapted to introduce a process fluid from the fluid housing to the input chamber, a first barrier fluid passage formed within the gland and disposed in fluid communication with said output chamber for introducing a barrier fluid thereto, and a second barrier fluid passage formed within the gland and disposed in fluid communication with said gland chamber for selectively transferring the barrier fluid therefrom during operation to another portion of the mechanical seal, wherein said movable valve is alternately disposable between a closed position for preventing barrier fluid from being introduced to said second barrier fluid passage, and an open position for introducing a barrier fluid into said second barrier fluid passage.

62. A mechanical face seal for providing fluid sealing between a fluid housing and a rotatable shaft, the seal comprising a first seal ring having a first seal face and a second seal ring having a second seal face, the first and second seal faces being opposed to each other when assembled, one of the first seal ring and the second seal ring being adapted to rotate with the shaft, the other of the first and second seal rings being restrained from rotating, a gland sized for mounting about at least one of the seal rings and being mechanically coupled to the fluid housing, the gland having a bore formed therein, and a generally fluidic pressure feedback network sized and dimensioned for mounting within the bore in the gland, the fluidic pressure feedback network being adapted to regulate a selected pressure within the seal during operation, wherein said fluidic pressure feedback network includes
a first movable valve sized and dimensioned for seating within the bore in the gland, said movable valve separating said chamber into an input chamber and an output chamber, a process fluid passage formed within the gland and adapted to introduce a process fluid from the fluid housing to the input chamber, a first barrier fluid passage formed within the gland and disposed in fluid communication with said output chamber for introducing a barrier fluid thereto, a second movable valve seated within a closing fluid chamber formed in the gland, a first closing fluid passage formed within the gland and disposed in fluid communication with said closing fluid chamber for introducing a closing fluid thereto from a fluid supply, and a second closing fluid passage formed within the gland and disposed in fluid communication with said closing fluid chamber for selectively transferring the closing fluid therefrom during operation of said seal.

* * * * *